(12) United States Patent
Glean et al.

(10) Patent No.: US 11,162,884 B2
(45) Date of Patent: Nov. 2, 2021

(54) DEVICES AND METHODS FOR DETERMINING THE DENSITY OF INSULATION

(71) Applicant: CertainTeed LLC, Malvern, PA (US)

(72) Inventors: Aldo Glean, Framingham, MA (US); David Knutson, Lunenburg, MA (US); Jean-Philippe Ndobo-Epoy, Westboro, MA (US); Phillip Evans, Littleton, MA (US); Timothy Briggs, Clinton, MA (US); Jonathan Wilson, Northboro, MA (US); Brice Dubost, Newton, MA (US)

(73) Assignee: CertainTeed LLC, Malvern, PA (US)

(*) Notice: Subject to any disclaimer, the term of this patent is extended or adjusted under 35 U.S.C. 154(b) by 0 days.

(21) Appl. No.: 16/286,478

(22) Filed: Feb. 26, 2019

(65) Prior Publication Data

US 2019/0265143 A1 Aug. 29, 2019

Related U.S. Application Data

(60) Provisional application No. 62/635,521, filed on Feb. 26, 2018, provisional application No. 62/688,238, filed on Jun. 21, 2018.

(51) Int. Cl.
*G01N 9/02* (2006.01)
*E04B 1/76* (2006.01)
*E04G 23/00* (2006.01)

(52) U.S. Cl.
CPC ............ *G01N 9/02* (2013.01); *E04B 1/7604* (2013.01); *E04G 23/00* (2013.01); *E04B 1/7658* (2013.01);
(Continued)

(58) Field of Classification Search
None
See application file for complete search history.

(56) References Cited

U.S. PATENT DOCUMENTS 4,481,820 A * 11/1984 Thomann ............. D01G 31/006
73/160
4,672,851 A * 6/1987 Blessing .............. G01N 29/075
73/597
(Continued)

FOREIGN PATENT DOCUMENTS

GB 2103695 A 2/1983
WO WO 2007/058903 A2 5/2007
(Continued)

OTHER PUBLICATIONS

International Search Report issued in co-pending International Application No. PCT/US2019/019666, (ISA/KR) Korean Patent Office, dated Jun. 13, 2019, 4 pages.
(Continued)

*Primary Examiner* — Paul M. West
*Assistant Examiner* — Mark A Shabman
(74) *Attorney, Agent, or Firm* — McDonnell Boehnen Hulbert & Berghoff LLP

(57) ABSTRACT

The present disclosure relates to devices and methods for determining the density of insulation. For example, one aspect of the disclosure is a device that includes a sound generator and one or more sound sensors configured to detect sound that is generated by the sound generator and transmitted through the insulation to the one or more sound sensors. The device also includes a control system configured to cause the sound generator to generate the sound and use the sound detected by the one or more sound sensors to generate output that represents the density of the insulation.

(Continued)

Another aspect of the disclosure is a method for using the device to determine the density of insulation.

25 Claims, 31 Drawing Sheets

(52) U.S. Cl.
CPC .............. *G01N 2009/022* (2013.01); *G01N 2203/0284* (2013.01)

(56) References Cited

U.S. PATENT DOCUMENTS

| | | | |
|---|---|---|---|
| 4,838,085 A * | 6/1989 | Pellerin | G01N 29/045 73/597 |
| 5,804,727 A * | 9/1998 | Lu | G01H 5/00 73/159 |
| 6,055,856 A | 5/2000 | Senne | |
| 6,928,859 B2 | 8/2005 | O'Leary et al. | |
| 6,968,740 B2 | 11/2005 | Tinianov et al. | |
| 7,055,370 B2 | 6/2006 | Tinianov et al. | |
| 7,055,371 B2 | 6/2006 | Babineau et al. | |
| 7,059,173 B2 | 6/2006 | Babineau et al. | |
| 7,254,987 B2 * | 8/2007 | Tinianov | G01N 9/002 73/32 A |
| 7,743,644 B2 | 6/2010 | O'Leary | |
| 7,752,889 B2 | 7/2010 | O'Leary et al. | |
| 2005/0102971 A1 | 5/2005 | O'Leary et al. | |
| 2005/0160820 A1 | 7/2005 | Tinianov et al. | |
| 2006/0150715 A1 * | 7/2006 | Tinianov | G01N 29/2462 73/32 A |
| 2019/0250028 A1 | 8/2019 | Dubost et al. | |

FOREIGN PATENT DOCUMENTS

| | | | |
|---|---|---|---|
| WO | WO 2016/204735 A1 | 12/2016 | |
| WO | WO-2016204735 A1 * | 12/2016 | ........... G01N 29/043 |

OTHER PUBLICATIONS

Written Opinion issued in co-pending International Application No. PCT/US2019/019666, (ISA/KR) Korean Patent Office, dated Jun. 13, 2019, 6 pages.

D.R. Flynn et al., "Acoustical Technique for Evaluation of Thermal Insulation," NIST Report NISTIR-8813882 (Apr. 1989).

* cited by examiner

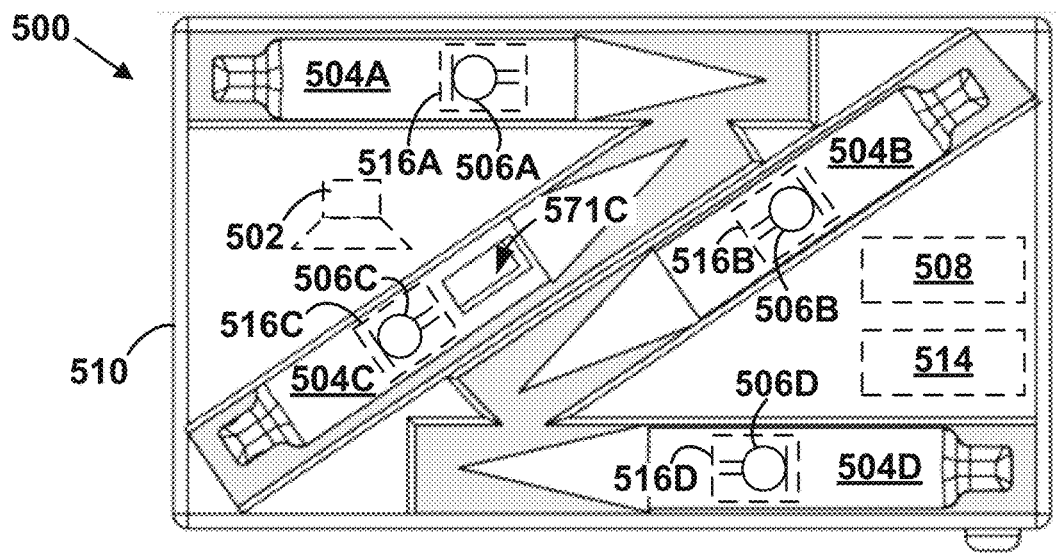
FIG. 10A
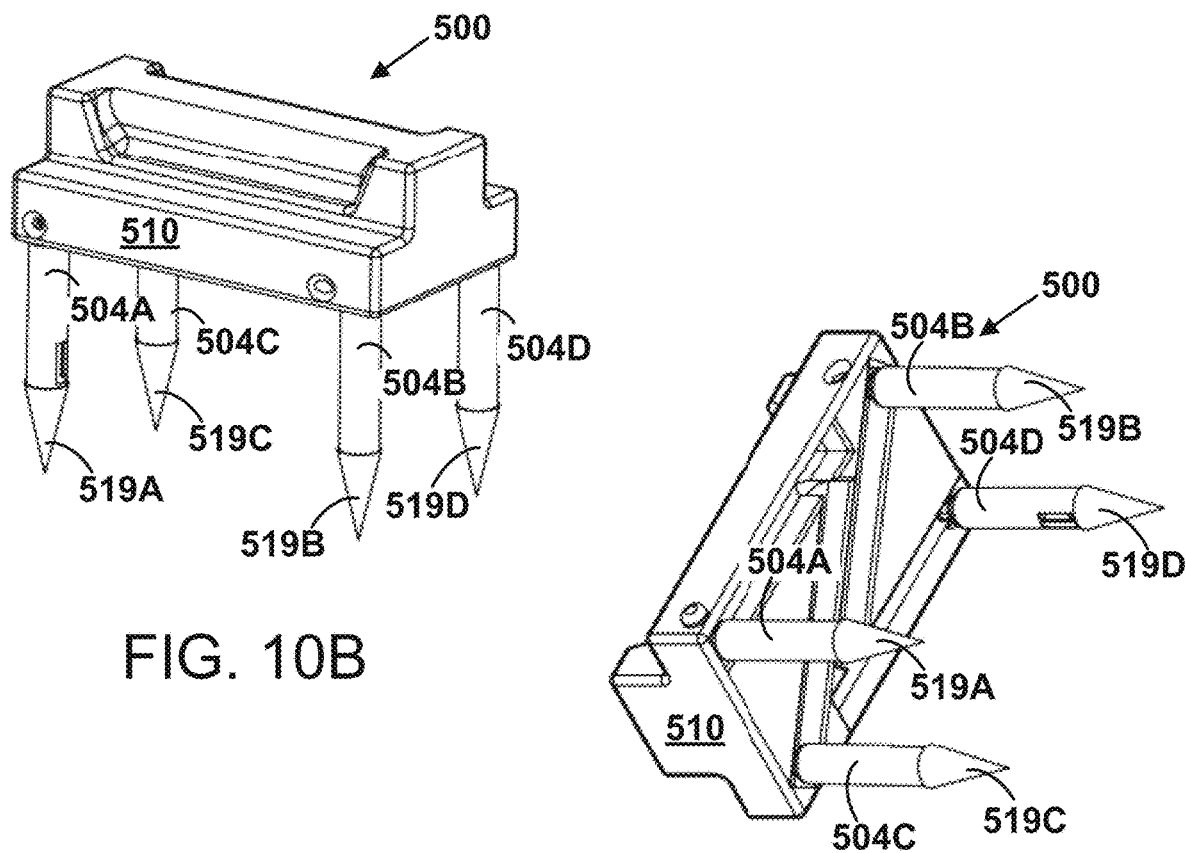
FIG. 10B
FIG. 10C

DEVICES AND METHODS FOR DETERMINING THE DENSITY OF INSULATION

CROSS-REFERENCE TO RELATED APPLICATIONS

This application claims the benefit of priority of U.S. Provisional Patent Application No. 62/635,521, filed Feb. 26, 2018, and U.S. Provisional Patent Application No. 62/688,238, filed Jun. 21, 2018, each of which is hereby incorporated by reference herein in its entirety.

BACKGROUND OF THE DISCLOSURE

1. Field of the Disclosure

The present disclosure relates generally to devices and methods for determining the density of insulation, for example, to determine the degree of fill of insulation within a cavity.

2. Technical Background

Insulation materials such as fiberglass batts, rolls, blankets, or blown-in insulation are typically used to reduce the rate of heat transfer between two areas separated by a boundary. For example, in an attic, insulation material can be applied to the interior surface of the roof deck to slow the transfer of heat through the roof deck, that is, from the exterior of the house to the attic or vice versa. In another application, insulation material is applied to exterior walls (e.g., between wood studs) and covered with wallboards to slow the rate of heat transfer through the exterior wall and the wallboard. Insulation material can also prevent undesirable air movement (e.g., convection drafts) and resultant movement of moisture from one space to another.

In some instances, it is useful to determine the degree of fill (e.g., density) of insulation material within a cavity. For example, in a retrofit application, a technician might determine the degree of fill of insulation within an existing cavity to determine what changes, if any, need to be made to make the insulation conform to a degree of fill required by an updated building code. In another example, the technician uses a blower to blow loose insulation material into a cavity. In this case, the technician might keep track of the quantity (e.g., weight or volume) of the insulation blown into the cavity and compare that to the volume of the cavity to determine the density of the blown-in insulation. This technique relies on the assumption that the insulation blown into the cavity has a uniform density, which might not be the case.

There are other ways of measuring the fill of a cavity with loose insulation, including the method of the Cubic Foot Density Test (Blow-In-Blanket@ Contractors Association—2008) and the Densi-Checker™ offered by Johns Manville for their Jet Spray insulation. However, these methods are destructive in nature, requiring that the area of test be repaired after sampling. It also is less practical to test multiple locations, because of the time involved and the multiple repairs that are required. Off-site testing may be performed as described in "Standard Practice for Determination of Thermal Resistance of Loose-Fill Building Insulation in Side Wall Applications" by ASTM Task Group for Sidewall R-value Loose Fill (ATS-4). This technique suffers from the time required for testing, and that the results from the sample may not necessarily be representative of the product as installed in the field.

Accordingly, what are needed are improved methods and devices for determining the density and/or degree of fill of insulation.

SUMMARY OF THE DISCLOSURE

One aspect of the disclosure is a device for determining the density of insulation, the device including
  a sound generator;
  one or more sound sensors configured to detect sound that is generated by the sound generator and transmitted through the insulation to the one or more sound sensors; and
  a control system configured to:
    cause the sound generator to generate the sound; and
    use the sound detected by the one or more sound sensors to generate output that represents the density of the insulation.

Another aspect of the disclosure is a method for determining the density of insulation, the method comprising:
  generating a sound and causing it to travel through the insulation;
  detecting the sound after the sound travels through the insulation; and
  using the detected sound to generate output that represents the density of the insulation.

The methods can be performed, for example, using the devices described herein.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure and together with the description serve to explain the principles and operation of the disclosure.

FIG. 10A is a front view of a device for determining the density of insulation, according to one embodiment of the disclosure.

FIG. 10B is a perspective view of a device for determining the density of insulation, according to one embodiment of the disclosure.

FIG. 10C is a perspective view of a device for determining the density of insulation, according to one embodiment of the disclosure.

DETAILED DESCRIPTION

Figure 1:
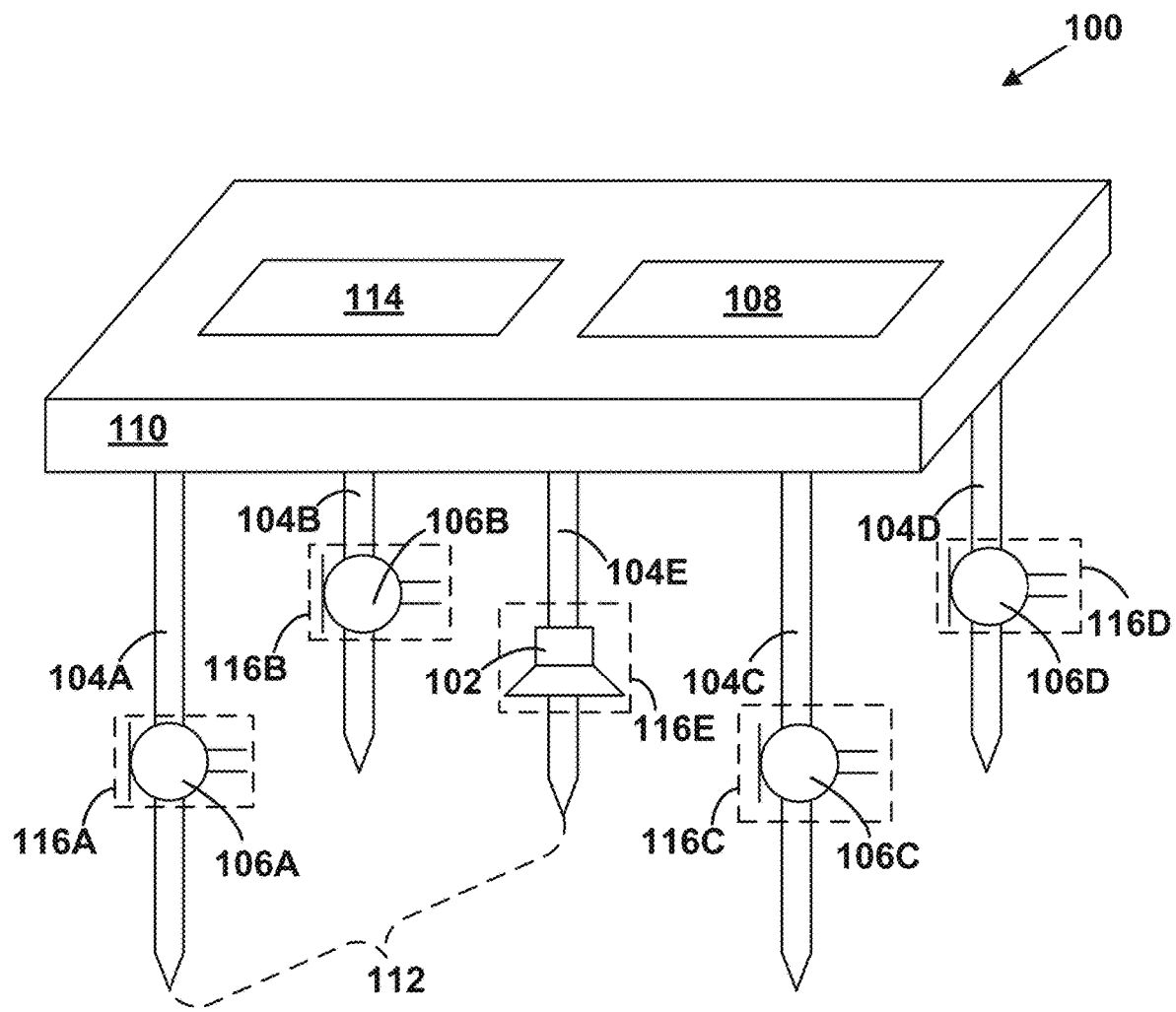
FIG. 1 is a perspective view of a device for determining the density of insulation, according to one embodiment of the disclosure.

As noted above, the present inventors have noted disadvantages of existing processes for determining the density of insulation, for example, for determining the degree of fill of blown-in insulation in an open or closed cavity.

Accordingly, one aspect of the disclosure is a device for determining the density of insulation. The device includes a sound generator (e.g., a speaker) and one or more sound sensors (e.g., microphones or other similar vibration sensors or air pressure sensors) configured to detect sound that is generated by the sound generator and transmitted through the insulation to the one or more sound sensors. The device also includes a control system (e.g., a microprocessor, microcontroller, and/or purpose-specific electronic hardware) configured to cause the sound generator to generate the sound and use the sound detected by the one or more sound sensors to generate output that represents the density of the insulation.

Another aspect of the disclosure is a method for determining the density of insulation, the method comprising: providing a device as described herein, causing, via the control system, the sound generator to generate sound, detecting, via the one or more sound sensors, the sound after the sound travels through the insulation, and using, via the control system, the detected sound to generate output that represents the density of the insulation.

As described in more detail herein, a variety of characteristics of the transmission of sound through the insulation can be used to generate the output, for example, the effective speed of sound within the insulation.

When compared to other devices and methods for determining the density of insulation, the disclosed devices and methods can be advantaged in that, in certain embodiments, they can be used determine the density without assuming that a known quantity of insulation has been blown into a cavity or another area with a uniform density. The disclosed devices and methods can also, in certain embodiments, be used in the field with little or no repair time required after testing, as they do not require the removal of a body of insulation from a cavity for weight or other measurement. Additionally, the disclosed devices and methods can be configured, for example, to perform measurements of the density of insulation over an area or a volume of the insulation, to yield more complete information about insulation.

In certain particular embodiments as otherwise described herein, the sound generator is configured to generate sound having frequencies (or a single frequency) at least within the range of 10 Hz to 100 kHz, e.g., within the range of 10 Hz to 50 kHz, or 10 Hz to 10 kHz, or 10 Hz to 5 kHz, or 10 Hz to 1 kHz, or 10 Hz to 500 Hz, or 50 Hz to 100 kHz, or 50 Hz to 50 kHz, or 50 Hz to 10 kHz, or 50 Hz to 5 kHz, or 50 Hz to 1 kHz, or 50 Hz to 500 Hz, or 100 Hz to 100 kHz, or 100 Hz to 50 kHz, or 100 Hz to 10 kHz, or 100 Hz to 5 kHz, or 100 Hz to 1 kHz, or 100 Hz to 500 Hz, or 500 Hz to 100 kHz, or 500 Hz to 50 kHz, or 500 Hz to 10 kHz, or 500 Hz to 5 kHz. or 1 kHz to 100 kHz, or 1 kHz to 50 kHz, or 1 kHz to 10 kHz. or 5 kHz to 100 kHz, or 5 kHz to 50 KHz, or 10 kHz to 100 kHz. In certain embodiments, the sound generator is configured to generate sound having frequencies (or a single frequency) at least within the range of 1 kHz to 6 kHz, within the range of 2 kHz to 6 kHz, within the range of 4 kHz to 5.5 kHz, or within the range of 4.8 kHz to 5.2 kHz. The generated sound can in some embodiments be at least 90%, at least 95%, or even at least 99% within the stated range (i.e., as a fraction of total power).

The sound generator can be configured, for example, to generate sound having a variety of durations. For example, in certain embodiments, the sound generator is configured to generate sound having a duration within a range of 0.25 seconds to 3 seconds (e.g., less than 2 seconds). In other embodiments, especially when a broad band of frequencies is desired, the sound generator can be configured to generate sound having a duration less than 1 second, for example, in the range of 1 ms to 500 ms (e.g., 1 ms to 200 ms, or 1 ms to 100 ms, or 10 ms to 500 ms, or 10 ms to 200 ms, or 10 ms to 100 ms). Such short-duration sounds are referred to herein as an "impulse."

The sound generator can be configured to generate white noise (e.g. maximum length sequence), brown noise, red noise, or pink noise. The sound generator can be configured to generate sound in the form of broadband noise (e.g., over a frequency band spanning at least 1 kHz or even at least 5 kHz), chirps, sweeps (e.g., a sine sweep), or single tone frequencies, for example. "Chirps" or "sweeps" can include any sound having a single frequency or frequency range that varies (e.g., increases or decreases) during the duration of the sound.

The sound generator can take a variety of forms. For example, in certain embodiments, the sound generator is a speaker. In other embodiments, the sound generator is a rod or plate that is caused to vibrate at high frequency, e.g., by a driver. In various embodiments, the sound generator is coupled to its own structural member (e.g., needle) of the device (e.g., separate from structural members that might bear sound sensors). The sound generator can be housed within a receptacle of the structural member, for example. The device can be configured, for example, such that in operation the sound generator is disposed within the insulation, for example, by being disposed at the end of a structural member such as a needle that is pushed into the insulation. However, in other embodiments, during operation the sound generator is outside the insulation, e.g., outside a cavity in which the insulation is disposed. In such cases, the device can be configured to position the sound generator in close proximity, e.g., within 1 cm, within 0.5 cm or even within 0.2 cm of the insulation. For example, in certain embodiments, the sound generator is disposed on or adjacent a plate that is held against the cavity, as described in more detail below.

In certain embodiments, the device includes a base that positions the sound generator with respect to the two or more sound sensors such that the two or more sound sensors of the device are held by the two or more structural members to have a substantially fixed spacing between the sound generator and the respective two or more sound sensors.

In certain specific embodiments, the device includes a base that positions (e.g., loosely or indirectly) two or more structural members of the device with respect to each other such that two or more sound sensors of the device are held by the two or more structural members to have a substantially fixed spacing between the sound generator and the respective two or more sound sensors. The two or more structural members can each include a receptacle within the structural member that is configured to hold a respective sound sensor of the two or more sound sensors.

As such, in certain embodiments of the disclosure as otherwise described herein, each of the one or more sound sensors can be separated from the sound generator by a distance within a range of 2.5 inches to 8 inches, e.g., within a range of 2 inches to 6 inches, or within a range of 3 inches to 6 inches, or within a range of 3 inches to 5 inches, within a range of 3.8 inches to 4.8 inches, or within a range of 4.2 inches to 4.8 inches. In a certain embodiments in which two or more sound sensors are present, a first sound sensor of the two or more sensors is on a first side of the sound generator and a second sensor of the two or more sensors is on a second opposing side of the sound generator. In embodiments in which structural members configured to be inserted into a cavity are present, each of two or more structural members can extend beyond (e.g., at least 0.5 inch, at least 1 inch, or at least 1.5 inches beyond) any sound generators or sound sensors that are coupled to the structural member, to guide the sound generator or sensor into the insulation during insertion. By further example in embodiments in which structural members configured to be inserted into a cavity are present, the base can be at least 1.5 inches away from any sound generators or sensors of the device.

In various embodiments, at least one sound generator and/or at least one sound sensor is coupled to some or all of the insertable structural members of the device. Such embodiments facilitate generating sound of different frequencies at different locations and/or different depths within the insulation and facilitate detecting such sound at different locations and/or depths and/or from different directions within the insulation. As such, the control system might be able to generate output that represents the density of insulation over an area or over a volume (e.g., a density gradient). The control system may, in certain embodiments, also be able to generate output representing a degree of variability of the insulation density over such an area or volume.

In some embodiments, the control system is configured to generate output that represents the density of the insulation using known characteristics of the insulation. For example, the control system can receive input, from a user interface of the device, representing the known characteristics of the insulation, and use the received input to generate output that represents the density of the insulation. In other embodiments, the control system can use a lookup table to relate measured values with an identified type of insulation to correlate the measured values to a density.

In certain embodiments, the device includes one or more support members that are respectively configured to be positioned against two (e.g., vertical) structures (e.g., studs) to position the device against a cavity that contains the insulation while the device is in operation. The structures will often take the form of studs or joists, and can be, e.g., separated from one another by in the range of 16-28 inches (on center), e.g., 16-24 inches. 16 inches on center and 24 inches on center are typical values. In operation, as described below, the support members can be positionable against such structures (e.g. studs or joists) to position a base of the device such that it holds the sound generator and sound sensor(s) in an appropriate position for the desired measurement, e.g., by properly inserting structural members bearing a sound generator or sound sensors into the cavity, or by properly position a sound generator and/or sound sensors with respect to a cavity. The one or more support members can be retractable and/or extendable. That is, the one or more support members have adjustable respective lengths that correspond to varying stud spacings that might be encountered in the field. As such, the one or more support members can respectively span a distance within a range of 16 inches to 28 inches, e.g., within a range of 16 inches to 26 inches, or within a range of 16 inches to 24 inches. They can take the form, for example, of bars of metal or plastic. In particular embodiments, the device includes one or more handles that respectively span between two support members of the one or more support members.

In some embodiments, the device includes a base that houses the sound generator and the one or more sound sensors. Additionally, the device can include a structural member that is configured to be inserted into the insulation and collect the sound for detection by the one or more sound sensors in the base. But in other embodiments, no such structural member is present; the sound sensors are configured to detect sound from the cavity without a separate structural member conducting it thereto.

In certain embodiments, each of the one or more sound sensors is separated from the sound generator by a distance within a range of 3.5 inches to 5.5 inches, e.g., within a range of 3.8 inches to 4.2 inches.

In some embodiments, the base includes a region that surrounds the one or more sound sensors, the region having a radial width of at least 2 inches. This geometry of the base helps ensure that sound that is reflected from structures within the cavity will travel through at least some of the insulation before being detected by the one or more sound sensors. In this way, one can be sure that the detected sound can be used to infer some characteristics (e.g., density) of the insulation.

In particular embodiments, the device includes a structural member that is configured to be inserted into the insulation, where two or more sound sensors are coupled to the structural member at different depths along the structural member. In this particular embodiment, a sound damping material can be disposed within the structural member between the two or more sound sensors so that the sound sensors primarily detect sound that travels through the insulation and not through the structural member. Additionally, the sound generator can be positioned within the structural member between the two or more sound sensors, with the sound damping material being disposed between the sound generator and the respective two or more sound sensors. Accordingly, the structural member can include apertures corresponding respectively to the sound generator and the two or more sound sensors.

In some embodiments, the device includes at least one structural member that is configured to be stored within the base of the device. For example, the at least one structural member can be configured to pivot with respect to the base (e.g., into the base) such that the at least one structural member is stored within the base. To prepare for use of the device, the at least one structural member can also pivot with respect to the base (e.g., away from the base) such that the at least one structural member extends from the base.

In certain embodiments, the one or more sound sensors are positioned closer to respective distal ends of one or more structural members of the device than the base of the device. This may particularly be the case when the one or more sound sensors are housed within the respective one or more structural members and are configured to be inserted into the insulation during operation of the device.

In some embodiments, methods include inserting a structural member of the device into the insulation and collecting, via the structural member of the device (e.g., through an aperture of the structural member), the sound after the sound travels through the insulation.

In this context, using the detected sound to generate the output includes using the collected sound to generate the output. In some embodiments, a sound sensor is proximate to the aperture, but in other embodiments sound is transferred along the length of the structural member to a sound sensor that is housed within the base of the device.

In certain embodiments as otherwise described herein, the control system is configured to determine a first duration that elapses between sound being generated by the sound generator into the insulation and the sound being detected by a sound sensor of the one or more sound sensors within the insulation. The first duration or the results of the comparison can be used to generate the output. Such measurements can be made, for example, as a time delay (e.g., as a "time-of-flight", or as a phase delay, each of which the person of ordinary skill in the art will understand depends upon the speed of sound in a medium. Other measures of the speed of sound in the medium can similarly be used.

In certain embodiments, the control system is configured to determine the amplitude and/or degree of attenuation of the sound at each sound sensor of the device, and correlate the measured amplitudes and/or degrees of attenuation with a density. As the person of ordinary skill in the art will appreciate, a change in density is related to a change in the attenuation of sound between two points (e.g., increased insulation density generally corresponds with increased attenuation). In certain embodiments, measurements can be taken using sound sensors at multiple distances from the sound generator, so as to normalize systemic losses. In other embodiments, the control system can perform a comparison with a value measured in air to determine a degree of attenuation of the detected sound as it travels from the sound generator to a sensor of the one or more sound sensors. Each measured amplitude can be used itself, or in other embodiments compared to a second reference amplitude that corresponds to a reference amplitude that relates to sound being emitted by the sound generator and transmitted through open air or through the device and being detected by the sound sensor, and thus provide a measure of signal attenuation. Accordingly, unless otherwise indicated, use of a measured amplitude as described herein is also understood to apply to use of a determined signal attenuation, and use of a determined signal attenuation as described herein is also understood to apply to use of a measured amplitude.

As the person of ordinary skill in the art will appreciate, the methods and devices described herein can be especially useful when used with loose-fill insulation. Moreover, they can be used with insulation in a variety of configurations, e.g., in a closed cavity such as to determine fill level in a blow-in-blanket system, or in an open cavity such as disposed between joists on an attic floor.

Figure 4:
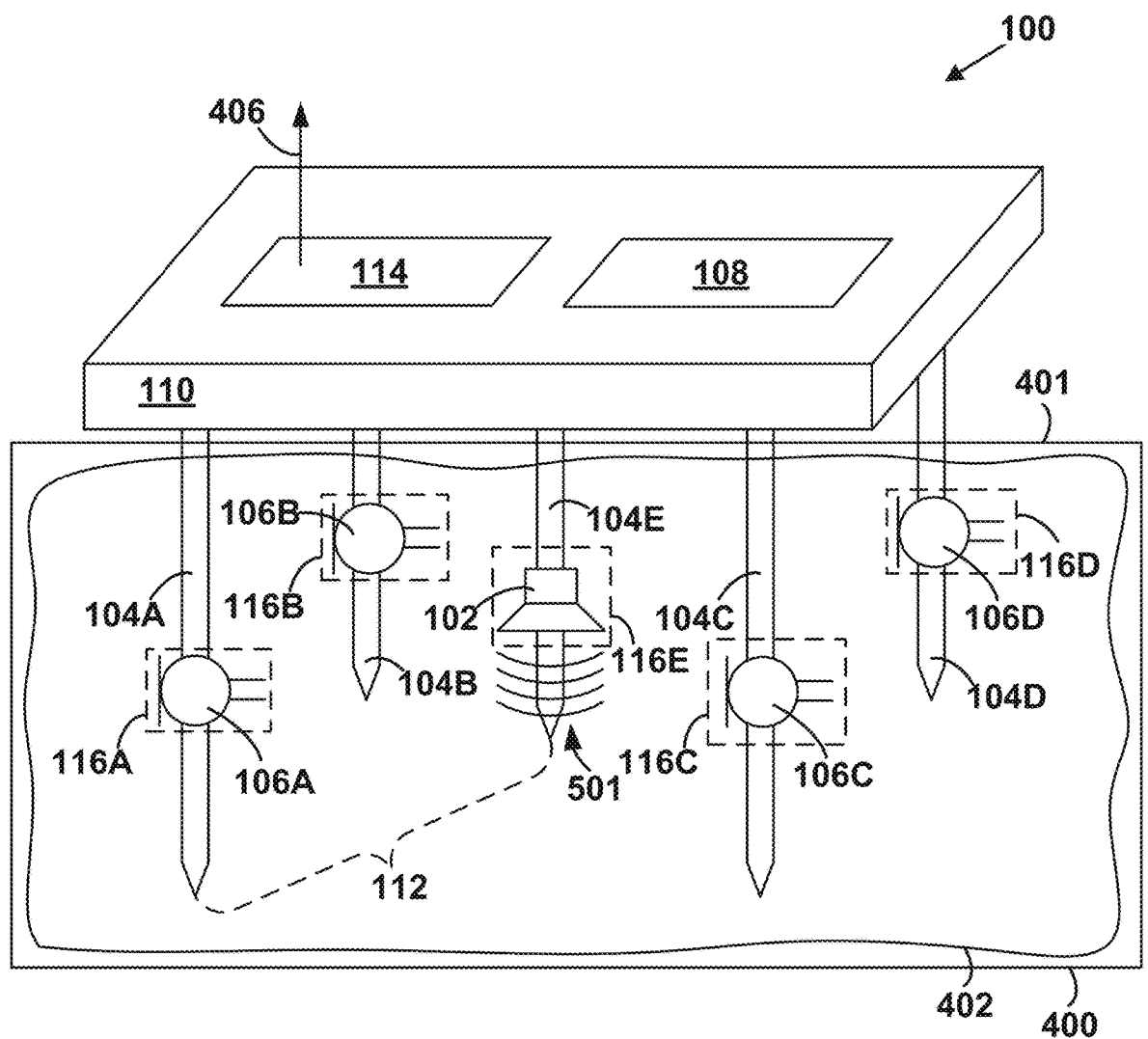
FIG. 4 depicts the use of a device for determining the density of insulation, according to one embodiment of the disclosure.

Referring now to the drawings, FIG. 1 is a perspective view of a device 100 for determining the density of insulation (e.g., in a cavity) (see FIG. 4). The device 100 includes a sound generator 102, one or more structural members 104A, 104B, 104C, and 104D, and one or more sound sensors 106A, 106B, 106C, and 106D. The one or more sound sensors 106A-D are coupled respectively to the one or more structural members 104A-D. The one or more structural members 104A-D are configured to be inserted into insulation (e.g., a cavity containing insulation) such that the one or more sound sensors 106A-D are positioned within the insulation to detect sound that is generated by the sound generator 102 and transmitted through the insulation to the one or more sound sensors 106A-D. The device 100 also includes a control system 108 configured to cause the sound generator 102 to generate the sound and use the sound detected by the one or more sound sensors 106A-D to generate output that represents the density of the insulation.

The device 100 can be powered electrically via a battery (not shown) or via standard 120 volt AC service. More generally, the device 100 can be powered by any electrical source that is known to one skilled in the art. One skilled in the art will appreciate that other power sources, such as USB ports, 9 or 12 volt car adapters, generators or solar panels can also be employed to bring power to or to recharge the batteries of the device at point of use or for preparation of use.

Electrical connections between a user interface 114, the control system 108, the sound sensors 106A-D. and the sound generator 102 are omitted from the drawings for the purpose of clarity.

In some examples, the sound generator 102 takes the form of a speaker (e.g., a woofer and/or a tweeter). The person of ordinary skill in the art will appreciate that other configurations are possible, e.g., rod or plate that is configured to be vibrated at high frequency by a driver.

The sound generator 102 is configured to generate sound having frequencies within a range as otherwise described herein, for example within the range of 10 Hz to 10 kHz, e.g., within the range of 1 kHz to 6 kHz, within the range of 2 kHz to 6 kHz, within the range of 4 kHz to 5.5 kHz, or within the range of 4.8 kHz to 5.2 kHz, among other possible frequencies. The sound generator 102 is generally powered by the control system 108. In certain embodiments, the sound generator (or a plurality of sound generators) is operated at a plurality of frequencies, with measurements taken at each, to provide frequency-dependent data for use in correlating with insulation density.

The one or more structural members 104A-D may take the form of stiff needles, but other examples are possible. As shown in FIG. 1, the device 100 includes an additional structural member 104E. The sound generator 102 is coupled to the structural member 104E and the structural member 104E is configured to be inserted into the insulation such that the sound generator 102 is positioned within the insulation (see FIG. 4). As shown schematically in FIG. 1, the structural members 104A-E include respective receptacles 116A, 116B, 116C, 116D, and 116E. Generally, receptacles within the structural members 104A-E take the form of a hole or a void from which and into which the sensors 106A-D and the sound generator 102 can be removed and inserted.

In other embodiments, the structural members themselves participate in sound generation, e.g., by being vibrated at the desired frequency by a driver such as a piezoelectric.

The sound sensors 106A-D may take the form of respective microphones, but any devices configured to sense sound may be used (e.g., piezoelectric sensors). The device 100 is configured such the sensors 106A-D are located on different sides (e.g., quadrants) with respect to the sound generator 102. But in other embodiments, multiple sensors can be on the same side of the sound generator, e.g., at different distances to measure amplitudes or signal attenuations at each, e.g., to provide a determination of amplitude or signal attenuation as a function of distance.

The control system 108 may be implemented via any combination of hardware and/or software to implement the functionality described herein. For example, the control system 108 can include one or more processors (e.g., general purpose processors, digital signal processors, special purpose processors) and a memory (e.g., volatile, nonvolatile, removable, non-removable, magnetic, optical, or flash storage) storing instructions that, when executed by the one or more processors, cause the device 100 to perform any of the functions described herein. In another example, the control system 108 may include special purpose hardware that is hard-wired to perform the functions described herein. Other examples are possible.

The device 100 further includes a base 110 that couples the one or more structural members 104A-D to each other such that the one or more sound sensors 106A-D are held by the one or more structural members 104A-D to have a substantially fixed spacing between the sound generator 102 and the respective one or more sound sensors 106A-D. For example, a distance 112 may separate the sensor 106A from the sound generator 102. The distance 112 can be, for example, within a range of 2.5 inches to 8 inches, e.g., within a range of 2 inches to 6 inches, or within a range of 3 inches to 6 inches, or within a range of 3 inches to 5 inches, within a range of 3.8 inches to 4.8 inches, or within a range of 4.2 inches to 4.8 inches. The base 110 can take the form of a rigid plastic or metal plate, but other examples are possible. The structural members 104A-E are mechanically coupled to the base 110 via welded joints, fasteners, or other mechanical means.

In some embodiments, the structural members 104A-E have retractable shields for their tips. For example, retractable shields might surround the respective structural members 104A-E, such that when the structural members 104A-E are pushed through a barrier into insulation material, the retractable shields retract (e.g., by being collapsed or by being pushed into the device) so that the structural members 104A-E extend beyond the retractable shields into the insulation. In other examples, the structural members 104A-E have respective (e.g., plastic) caps that cover the tips of the structural members 104A-E when the device 100 is not in use.

In some embodiments, a device similar to the device 100 can be configured (e.g., sized) such that the sound generator 102 can be outside the insulation while the one or more sound sensors 106A-D are within the insulation. However, the device 100 is configured such that the sound generator 102 can be within the insulation while the one or more sound sensors 106A-D are also within the insulation.

The user interface 114 enables interaction between a user (if applicable) and the device 100. As such, the user interface 114 may include input devices such as a keyboard, a keypad, a mouse, a touch-sensitive panel, a microphone, push buttons, and/or a camera. The user interface 114 may also include output devices such as a display screen (which, for example, may be combined with a touch-sensitive panel), an audio speaker, a haptic feedback system, a voltmeter, an analog-to-digital converter, and/or an oscilloscope. The user interface 114 is electrically coupled to and controlled by the control system 108. The control system 108 is configured to generate output (e.g., visual or audio output) that represents the density of the insulation (e.g., using known characteristics of the insulation.) For example, the control system 108 can be configured to receive input, from the user interface 114, representing the known characteristics of the insulation, and use the received input to generate output that represents the density of the insulation.

Figure 2:
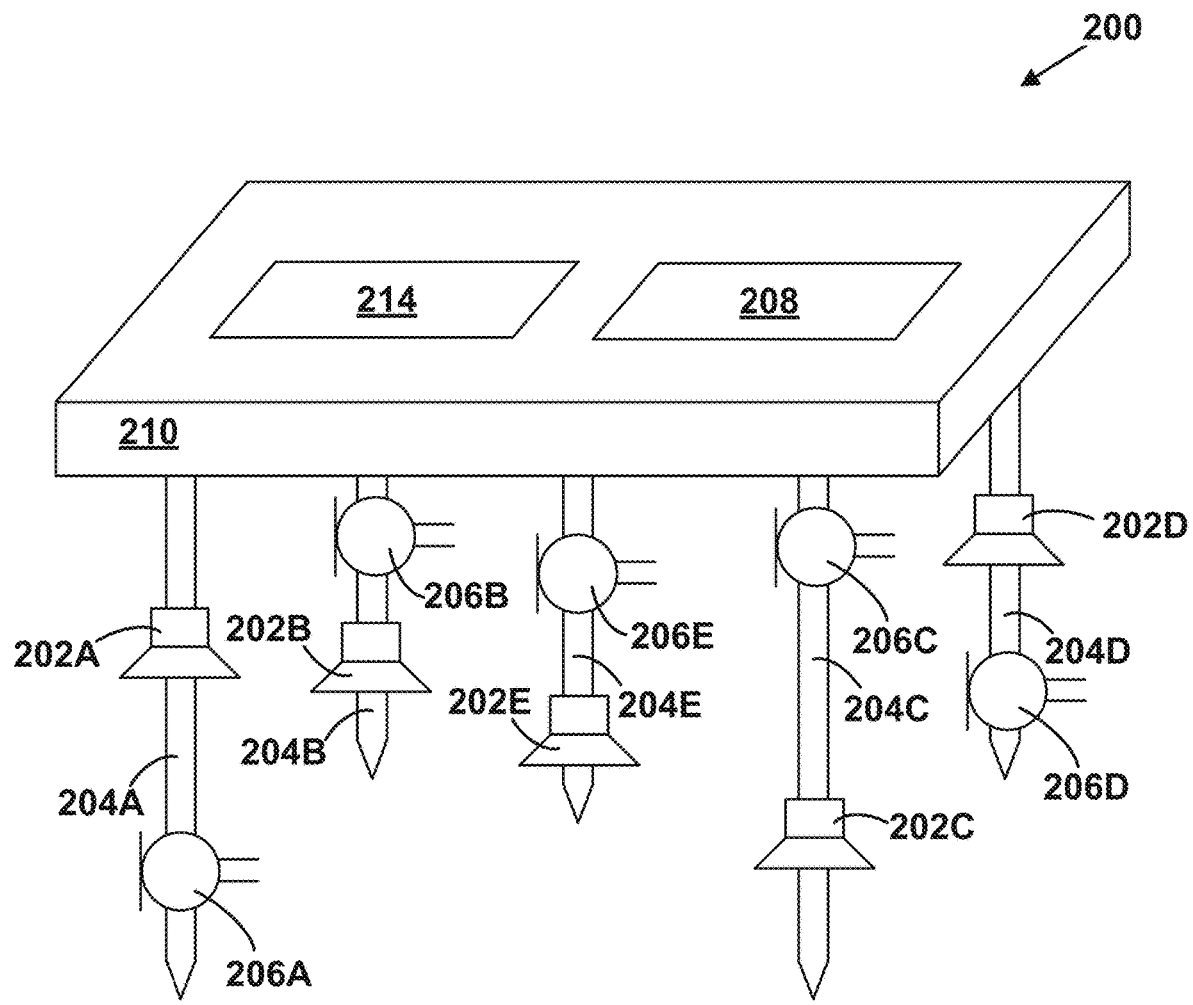
FIG. 2 is a perspective view of a device for determining the density of insulation, according to one embodiment of the disclosure.

FIG. 2 depicts a device 200 that can have any of the features of the device 100 described above, with differences as described below. The device 200 includes structural members 204A, 204B, 204C, 204D, and 204E having the same features as the structural members 104A-E.

The device 200 also includes sound sensors 206A, 206B, 206C, 206D, and 206E that have the same features as the sensors 106A-D. The sensors 206A-E are coupled respectively to the structural members 204A-E. As shown in FIG. 2, the sound sensors 206A-E are coupled to the respective structural members 204A-E at different depths along the structural members 204A-E, which corresponds to different depths within insulation (e.g., in a cavity) when the structural members 204A-E are inserted into the insulation.

The device 200 includes sound generators 202A, 202B, 202C, 202D, and 202E each having the same features as the sound generator 102. The sound generators 202A-E are coupled respectively to the structural members 204A-E. As shown in FIG. 2, the sound generators 202A-E are coupled to the respective structural members 204A-E at different depths along the structural members 204A-E, which corresponds to different depths within insulation when the structural members 204A-E are inserted into the insulation. The device 200 also includes a base 210, a control system 208, and a user interface 214 that are structurally similar and function similarly to the base 110, the control system 108, and the user interface 114, respectively.

Figure 3:
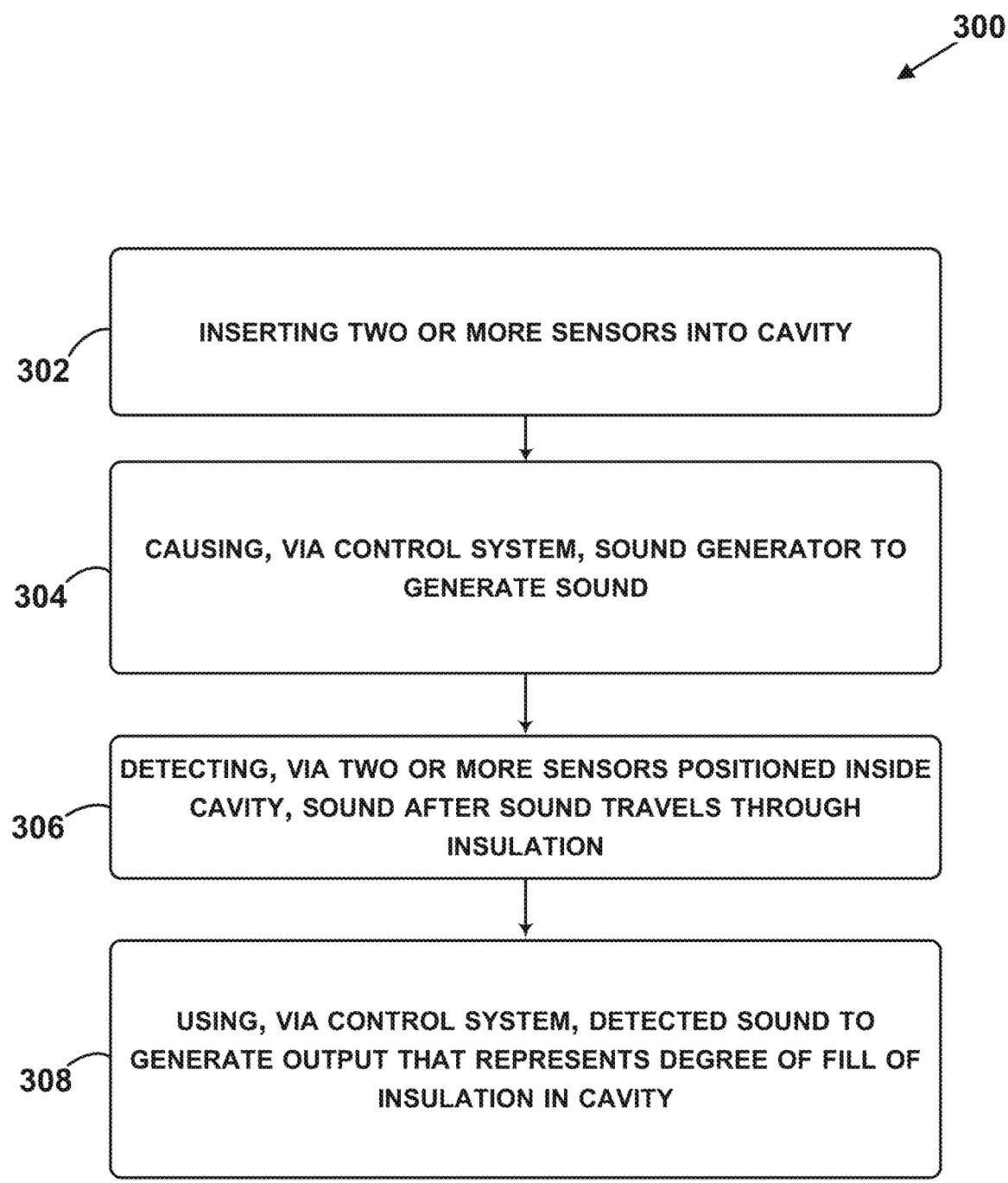
FIG. 3 is a block diagram of a method for determining the density of insulation, according to one embodiment of the disclosure.
Figure 5:
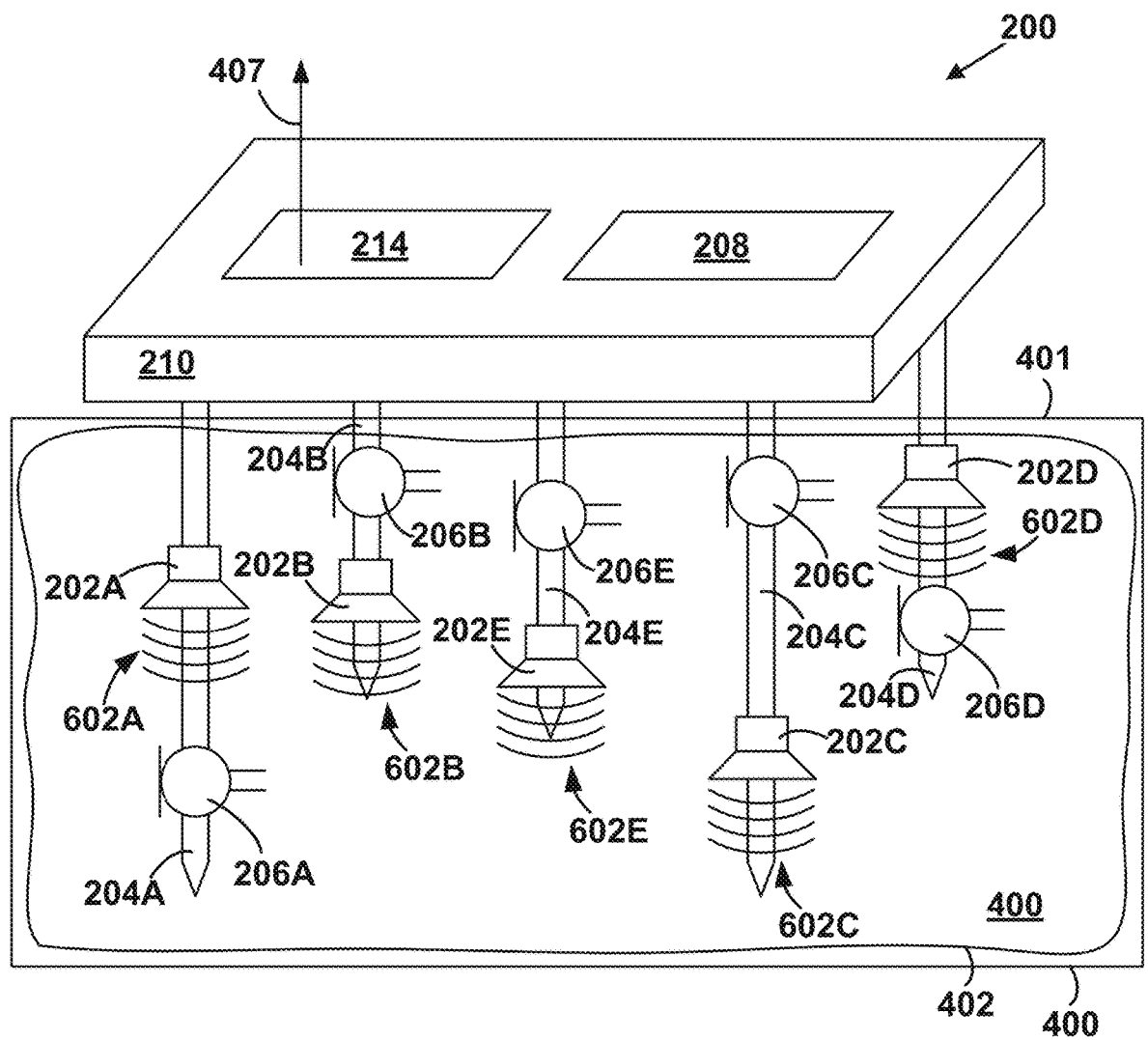
FIG. 5 depicts the use of a device for determining the density of insulation, according to one embodiment of the disclosure.

FIG. 3 is a block diagram of a method 300 for determining the density of insulation (e.g., in a cavity) according to one embodiment of the disclosure. The method 300 can be performed using the device 100 or the device 200 to determine the density of insulation 402 in the cavity 400, as shown in FIGS. 4 and 5. FIGS. 4 and 5 are schematic perspective views from above, depicting the use of the device 100 and the device 200, respectively.

At block 302, the method 300 includes inserting the one or more sound sensors into the insulation. For example, an installer may grasp the device 100 (e.g., at the base 110) and insert or push structural members 104A-E (e.g., through a vapor barrier, netting, or wallboard 401) into the cavity 400 until the sound sensors 106A-D and the sound generator 102 are within the cavity 400 (e.g., surrounded by insulation 402 within the cavity 400). In other examples, the device can be structured such that a sound generator of the device is positioned outside of the insulation while sensors of the device are within the insulation. Inserting the one or more sound sensors might involve inserting the one or more sound sensors such that the one or more sound sensors are at least 1.5 inches away from any wall studs or holes in a netting or vapor barrier that defines a cavity, for example.

An installer may similarly grasp the device 200 (e.g., at the base 210) and insert or push structural members 204A-E (e.g., through the vapor barrier, netting or wallboard 401) into the cavity 400 until the sound sensors 206A-E and the sound generators 202A-E are within the cavity 400 (e.g., surrounded by the insulation 402 within the cavity 400).

The cavity 400 may take the form of a space between wood studs of a wall. In this case, the insulation 402 may be exposed or may be concealed behind a wallboard or a vapor barrier (e.g., paper). In another example, the cavity 400 is concealed behind a netting that is attached to a roof deck, thereby defining the cavity 400. Other examples are possible. The insulation 402 may be composed of fiberglass or other fibrous material.

At block 304, the method 300 includes causing, via the control system, a sound generator to generate sound. For example, the control system 108 may operate, via the user interface 114, to cause the control system 108 to cause the sound generator 102 to generate sound 501. Similarly, the control system 208 may operate, via the user interface 214, to cause the control system 208 to cause one or more of the sound generators 202A-E to generate one or more of the respective sounds 602A-E. The control systems 108 and 208 generally cause the sound generators 102 and 202A-E to generate sound by providing respective control signals to the respective sound generators 102 and 202A-E.

In some embodiments, this process involves the sound generator 102 or one or more of the sound generators 202A-E generating sound having a single frequency. For example, the sound generators 202A-E can all generate sound having a common single frequency or the sound generators 202A-E can generate respective sounds having single frequencies that differ from each other. In various embodiments, the sound generators 102 and 202A-E can generate sounds having, e.g., frequencies within the range of 10 Hz to 10 kHz, e.g., within the range of 1 kHz to 6 kHz, within the range of 2 kHz to 6 kHz, within the range of 4 kHz to 5.5 kHz, or within the range of 4.8 kHz to 5.2 kHz. Additionally, the sound generators 102 and 202A-E can generate respective sounds having, for example, a duration within the range of 0.25 seconds to 3 seconds (e.g., less than 2 seconds).

As shown in FIGS. 4 and 5, the sound generators 102 and 202A-E can generate sound while the respective sound generators 102 and 202A-E are within the insulation 402 in the cavity 400. Alternatively, some devices contemplated herein can operate (e.g., are sized) such that sound generators generate sound while the sound generators are outside of the cavity.

At block 306, the method 300 includes detecting, via the one or more sound sensors positioned within the insulation, the sound after the sound travels through the insulation. For example, one or more of the sensors 106A-D can detect the sound 501 emitted by the sound generator 102. Also, one or more of the sensors 206A-E can detect one or more of the sounds 602A-E emitted by the sound generators 202A-E. In FIGS. 4 and 5, the sounds 502 and 602A-E are depicted as traveling into the wall, but in actuality the sounds may radiate somewhat omnidirectionally from the respective sound generators 102 and 202A-E. The sensors 106A-D and 206A-E may take the form of microphones, piezoelectric sensors, or any component configured to generate a signal that represents the detected sound.

At block 308, the method 300 includes using, via the control system, the detected sound to generate output that represents the density of the insulation. Before generating the output, the control system 108 and the control system 208 generally receive signals from one or more of the sensors 106A-D or 206A-E representing the respective sounds detected by the sensors 106A-D or 206A-E (e.g., sounds generated by the sound generators 102 and 202A-E). The control system 108 and the control system 208 then generally process the received signals to generate the output that represents the density of the insulation 402 in the cavity 400. For example, the control system 108 or control system 208 may use multiple signals to calculate an average density of the insulation 402 over an area or volume.

In some embodiments, using the detected sound to generate the output comprises using one or more signals that represent the detected sound to perform a coherence measurement, derive a transfer function (e.g., an H1 transfer function), or derive an impulse response. An impulse response can be calculated, for example, using a correlation method.

It is generally assumed that generation and detection of sound using the devices disclosed herein can be modeled somewhat accurately as a linear time invariant (LTI) system. This allows an output (detected sound) signal generated by the device to be equated with a convolution between the sound generated by the sound generator(s) and the impulse response (IR) of the system (e.g., the insulation). Convolution in the time domain (equation 1 below) is equivalent to multiplication in the frequency domain (equation 2 below), allowing for calculation of the frequency response of the system.

$$y(t)=x(t)*h(t)=\int_{-\infty}^{\infty}x(\tau)h(t-\tau)d\tau \quad (1)$$

In equation (1), y(t) is the signal representing the time-dependent amplitude of the sound generated by the sound generator(s) after the sound has traveled through the insulation. x(t) is the signal representing the time-dependent amplitude of the sound generated by the sound generator(s) before the sound has traveled through the insulation. h(t) represents the impulse response of the insulation.

$$Y(f) = X(f)H(f) \rightarrow H(f) = \frac{Y(f)}{X(f)} \quad (2)$$

In equation (2), Y(f) represents the frequency-dependent amplitude of the sound generated by the sound generator(s) after the sound has traveled through the insulation. X(f) represents the frequency-dependent amplitude of the sound generated by the sound generator(s) before the sound has traveled through the insulation. H(f) represents the frequency response (e.g., transfer function) of the insulation.

The above transfer function H(f) can be modified to compensate for the presence of extraneous noise on the input and/or output signals. For example, an H1 transfer function is used when the input signal is free from extraneous noise as opposed to the output signal, and is the ratio of the cross power spectrum to the auto power spectrum (shown in equation 3 below).

$$\hat{H}_1 = \frac{\hat{G}_{yx}}{G_{xx}} \quad (3)$$

Using the calculated transfer function from measurement of insulation at various densities, the amplitude and area under the curves within narrow or broad band frequency ranges can be correlated to the actual insulation density.

Broad band white noise used to excite the system has a unique property in that its autocorrelation is a good approximation of an impulse (e.g., a delta function). Therefore, by calculating the cross correlation between the input and output signals the impulse response of the system (cavity with insulation) can be indirectly calculated. The correlation between two signals is given by equation (4) (time domain) and equation (5) (frequency domain) below.

$$h(t)=x(t)*y(-t)=\int_{-\infty}^{\infty}x(\tau)y(t+\tau)d\tau \quad (4)$$

$$H(f)=X(f)Y^*(f) \quad (5)$$

The impulse response can be calculated by taking the inverse Fourier transform of equation (5). Calculating the impulse response in this manner (cross correlation) as opposed to the deconvolution method is preferred. The cross correlation method offers the potential advantage of improving the signal to noise ratio and avoiding computation issues associated with deconvolution.

The impulse response can be used as a metric to differentiate between different insulation densities. This metric is developed as a combination of changes to the impulse response related to energy dissipation (amplitude of impulse response), dispersion which is propagation speed of different frequencies (peak width of impulse response) and group/phase delay of the response (peak location of the impulse response).

Given the various properties of the impulse response which makes up the aforementioned metric, a correlation of impulse response to insulation density can be described using the model of equation (6), for example.

$$\rho_{cavity}=Ax^l+Bx^m+Cx^n \quad (6)$$

Coefficients A, B, and C and exponents l, m, n can be quantified through calibration curves produced from multiple cavity measurements and can vary based on insulation type.

Some examples include using multiple sound generators to generate respective orthogonal sound signals, which can boost signal to noise ratio as well as better measure density variation. In some examples, multiple sound sensors can be used to detect the orthogonal sound signals after they travel through insulation, but a single sound sensor could be used as well.

Once data is obtained in the form of a determined density of the insulation 402 (e.g., $g/cm^3$), the data can be displayed in numeric form on a display screen of the user interface 114 or the user interface 214. Alternatively, a signal can be provided directly in the form of output to possible output devices of the user interface 114 or 214 such as an oscilloscope, a voltmeter, or an analog-to-digital converter.

It will be appreciated by one of skill in the art that a variety of devices can receive the output, and that the output could also be transmitted by non-direct means, such as to a smart phone, computer, or tablet device by wireless means. Such means could include Bluetooth, WiFi, or radio frequency transmission to devices capable of receiving such signals.

The ability of such signals to be analyzed by devices that prospective users might already own (such as a cell phone, smart phone, tablet, or computer) could mean that the cost of a measurement device could be considerably less expensive than if the output device was integrated into the measurement device directly. Likewise, providing the display or data analysis in an external device can reduce the weight and size of the measurement device, improving its usability and durability in the field.

In various examples, the control system 108 or the control system 208 might compare respective amplitudes and/or degrees of attenuation of one or more of the sounds detected by the sound sensors 106A-D or 206A-E to one or more known amplitudes and/or degrees of attenuation of the sound generated by the sound generators 102 or 202A-E. In another example, the control system 108 or the control system 208 might compare respective amplitudes and/or degrees of attenuation of one or more of the sounds detected by the sound sensors 106A-D or 206A-E to one or more reference amplitudes and/or degrees of attenuation of sound that would be expected for detection if the device 100 or the device 200 was not inserted into the insulation 402. In yet another example, the control system 108 or the control system 208 might determine a duration of time that passes between sound being generated by one or more of the sound generators 102 or 202A-E and detection, and compare that duration to a duration that would be expected if the device 100 or the device 200 was not inserted into the insulation 402.

One way the control system 108 or the control system 208 may determine the density of the insulation is by using a mathematical function that maps (a) time delay (e.g., determined as a time-of flight"), amplitude and/or signal attenuation of the sound moving through the insulation (e.g., insertion loss) to (b) density of the insulation. The function may be determined experimentally via regression analysis, for example. In other examples, the control system 108 or the control system 208 may use a look up table that includes experimental data. Increased time delay between sound generation and sound detection generally correlates with insulation density. Higher sound attenuation (e.g., insertion loss) and lower amplitude generally correlate with insulation density as well.

In yet other examples, the control system 108 or the control system 208 can obtain multiple amplitude, degree of attenuation and/or time delay measurements using multiple sound generators and/or multiple sensors as discussed below, determine a degree of variability among the measurements, and use the determined degree of variability to generate the output. The present inventors have discovered that increased variability of these measurements correlate positively with increased density of insulation, at least in the particular insulation systems tested here.

Figure 24:
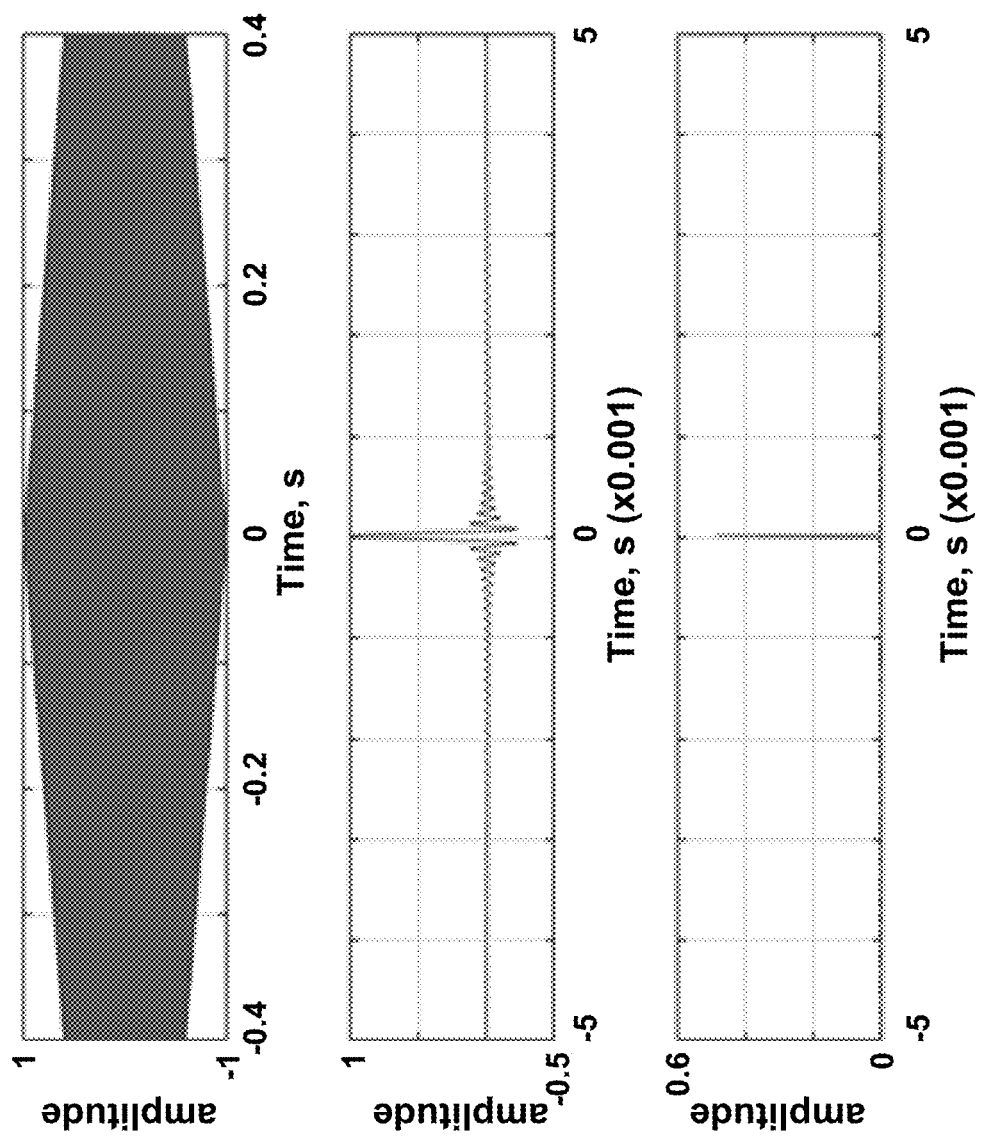
FIG. 24 shows the cross-correlations of a sinewave, linear chirp, and pseudorandom noise.

In yet other examples, the control system 108 or the control system 208 can obtain multiple amplitude, degree of attenuation and/or time delay measurements using multiple sound generators and/or multiple sensors as discussed below to determine a spatial gradient of the density of insulation, and use the determined spatial gradient to generate the output (e.g., that indicates the gradient). FIG. 24, described below, provides an example of correlations between amplitude/degree of attenuation and time delay and insulation density.

The control system 108 or the control system 208 can cause the respective user interfaces 114 and 214 to generate respective outputs 406 and 407. The outputs 406 and 407 can take the form of displayed output and/or audio output, for example. The outputs 406 and 407 might represent the density of the insulation 402 as an "R-value," a mass density, or as an attenuation metric (e.g., an insertion loss, a transmission loss) that characterizes how much one or more of the sounds 502 or 602A-E are attenuated from a known intensity (e.g., amplitude) level after they travel to one or more of the sensors 106A-D or 206A-E.

In particular embodiments, the control system 108 or the control system 208 can use known characteristics of the insulation (e.g., material composition) to generate the output. For example, the user interface 114 or the user interface 214 can receive input representing the known characteristics of the insulation and provide the input the control system 108 or the control system 208. The control system 108 or the control system 208 can then use the received input to generate the output (e.g., use the known characteristics of the insulation to calculate an output).

In particular embodiments, the control system 108 causes the sensor 106A to detect a first portion of the sound 501 traveling in a first direction and causes the sensor 106D to detect a second portion of the sound 501 traveling in a second direction that is different from the first direction. As such, the control system 108 is able to collect data representing density conditions along two different paths within the insulation 402. If the control system 108 collects enough data, the control system 108 can generate output reliably representing the density of the insulation 402 over an area.

In some embodiments, the control system 208 causes the sensor 206A to detect a first portion of the sound 602E traveling in a first direction and causes the sensor 206C to detect a second portion of the sound 602E traveling in a second direction that is different from the first direction (e.g., with respect to two independent axes). As such, the control system 208 is able to collect data representing density conditions along two different paths (at different depths) within the insulation 402. If the control system 208 collects enough data, the control system 208 can generate output reliably representing the density of the insulation 402 over a volume. As one of skill in the art will understand in the context of this disclosure, any one or more sound sensors at different locations could be used to detect a common sound to yield data that reflects density of insulation over an area (or within a volume if the sensors are located at different depths).

In some embodiments, it may be advantageous to generate sounds at multiple locations and/or depths within the insulation for detection. Accordingly, the control system 208 can cause the sound generator 202A to produce the sound 602A and, thereafter, cause the sound generator 202C to produce the sound 602C. In this context. block 306 involves one or more of the sensors 206A-E sequentially detecting the sound 602A and the sound 602C.

In a related embodiment, the sound 602A and the sound 602C may have different singular frequencies. Thus, block 306 may involve one or more of the sensors 206A-E simultaneously detecting the sound 602A and the sound 602C and discerning between them based on the known different frequencies. As one of skill in the art will understand in the context of this disclosure, any one or more sound generators at different locations and/or depths within the insulation could generate sound to yield data that reflects density of insulation over an area (or within a volume if the sound generators are located at different depths).

In a separate set of experiments, the variability of insulation density in a model insulation system was investigated by filling a 2 foot square by 6 inch deep sample box with insulation at a nominal 1.51 pounds per cubic foot (PCF) fill density. Samples were cored out using hole saws of various diameters, and the samples were weighed to provide a density of the cylindrical volume defined thereby. Data for these experiments are shown in the table below:

| Sample Size (inch) | Density (PCF) | Sample Density Avg (PCF) | % Difference |
|---|---|---|---|
| 2 | 1.51 | 1.08 | 28% |
| 2 | 1.51 | 1.08 | 28% |
| 2 | 1.51 | 1.13 | 25% |
| 3 | 1.51 | 1.25 | 17% |
| 3 | 1.51 | 1.21 | 19% |
| 3 | 1.51 | 1.23 | 18% |
| 4.5 | 1.51 | 1.33 | 11% |
| 4.5 | 1.51 | 1.30 | 14% |
| 4.5 | 1.51 | 1.29 | 14% |
| 6.5 | 1.51 | 1.53 | −2% |
| 6.5 | 1.51 | 1.55 | −3% |
| 6.5 | 1.51 | 1.55 | −3% |

Using a 2 inch diameter hole saw, the measured densities were 1.08 PCF, 1.08 PCF, and 1.13 PCF, corresponding to 28%, 28%, and 25% error with respect to the actual density of 1.51 PCF. Using a 3 inch diameter hole saw, the measured densities were 1.25 PCF, 1.21 PCF, and 1.23 PCF, corresponding to 17%, 19%, and 18% error with respect to the actual density of 1.51 PCF. Using a 4.5 inch diameter hole saw, the measured densities were 1.33 PCF, 1.30 PCF, and 1.29 PCF, corresponding to 11%, 14%, and 14% error with respect to the actual density of 1.51 PCF. And using a 6.5 inch diameter hole saw, the measured densities were 1.53 PCF, 1.55 PCF, and 1.55 PCF, corresponding to 2%, 3%, and 3% error with respect to the actual density of 1.51 PCF. The data exhibits that even for a known bulk density of insulation, local variations can skew measurements if the sensor and the sound generator are not far enough apart from each other (e.g., for this experimental device, approximately 4.5 inches gives about 10% error). Of course, the person of ordinary skill in the art will appreciate that in many cases, the measurement inaccuracies described above can be addressed through calibration based, e.g., on a particular type of insulation material and fill method; and different devices can be designed to provide desirable measurement accuracy at different spacings.

The table below shows experimental data for similar insulation density measurements performed using a 4.5 inch hole saw with fill densities of 1.0, 1.5 and 2.0 PCF.

| Sample Size (inch) | Box Density (PCF) | Sample Density Avg (PCF) | % Difference |
|---|---|---|---|
| 4.5 | 1.0 | 0.91 | 9% |
| 4.5 | 1.0 | 0.91 | 9% |
| 4.5 | 1.0 | 0.91 | 9% |
| 4.5 | 1.5 | 1.33 | 11% |
| 4.5 | 1.5 | 1.30 | 14% |
| 4.5 | 1.5 | 1.29 | 14% |
| 4.5 | 2.0 | 1.69 | 16% |
| 4.5 | 2.0 | 1.55 | 23% |
|  |  | Average | 13% |

For a known insulation density of 1.0 PCF, the determined experimental densities were 0.91, 0.91, and 0.91 PCF, with each trial corresponding to a 9% error. For a known insulation density of 1.5 PCF, the determined experimental densities were 1.33, 1.30, and 1.29 PCF, corresponding respectively to errors of 11%, 14%, and 14%. For a known insulation density of 2.0 PCF, the device determined experimental densities of 1.69 and 1.55 PCF, corresponding respectively to errors of 16% and 23%.

Figure 6:
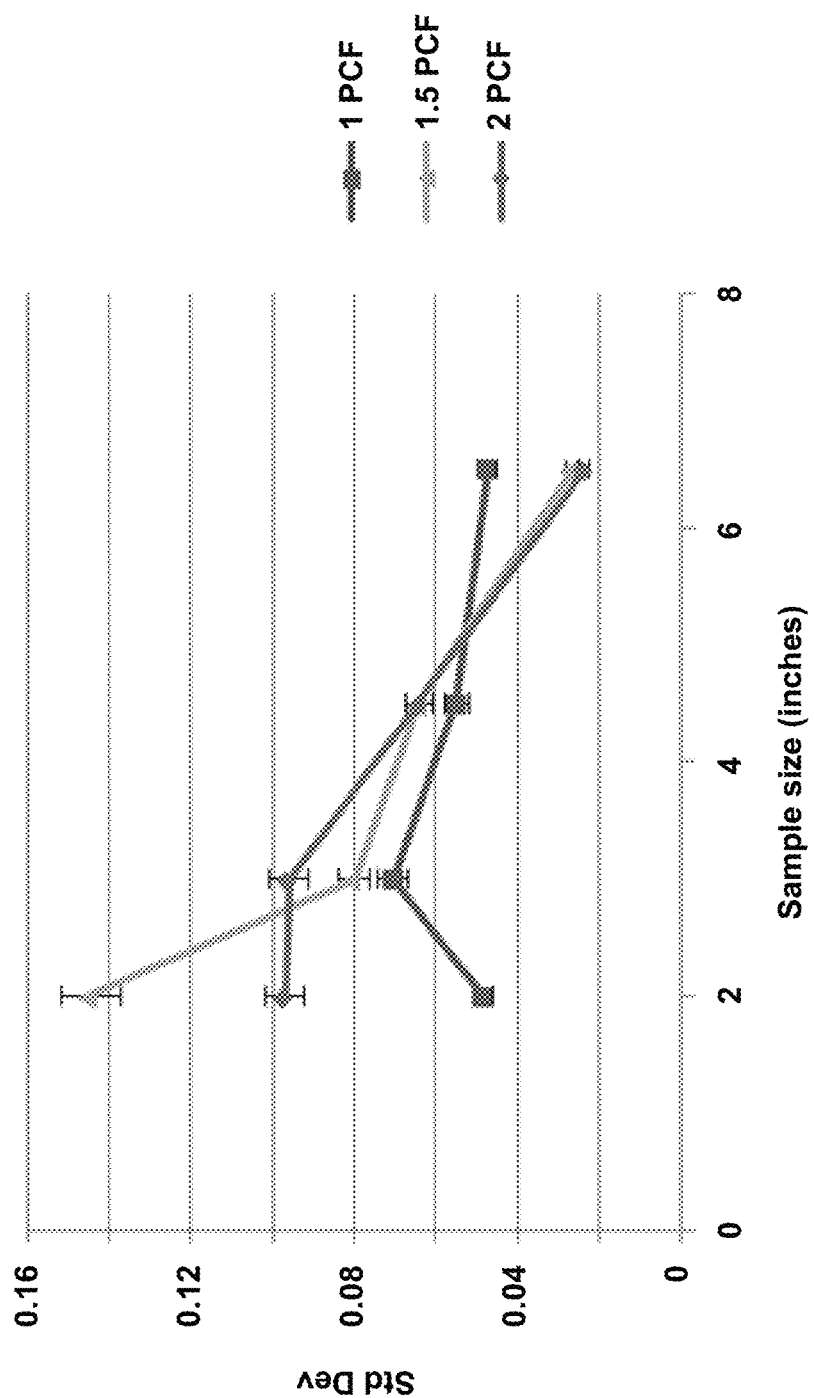
FIG. 6 shows experimental standard deviations of insulation density determined by an experimental setup with respect to sample size being removed and measured.

FIG. 6 is a graph of experimental standard deviations of insulation density determined via the hole saw method described above for a variety of sample sizes and nominal fill densities. With one exception in the case of insulation of known density 1 PCF, the data shows a positive correlation between increased variance and smaller spacing. Overall, the variance shown for all densities is relatively low for spacings of at least 4.5 inches.

Experimental data reflecting how accurate a device similar to the device 100 was at characterizing insulation density with respect to the respective spacing of structural members (sensors) from a sound generator (e.g., the distance 112 shown in FIG. 1) was collected. The device was used to experimentally determine the density of a portion of insulation material having a known density of 1.51 pounds per cubic foot (PCF). The experiments used a 5 kHz frequency generated by a Slim Line Micro speaker, 550 Hz-20 kHz, L×W×H=15 mm×11 mm×3.9 mm, PUI Audio, Inc., with analog omnidirectional microphones, 50 Hz-10 kHz, diameter=4 mm height=1.6 mm, from Soberton, Inc. The device used had a set of needles with speakers and microphones attached to them, with four needles (150 mm long×1.6 mm thick) in a box formation spaced 4" apart, with a sharp plastic stake in the center. Each one of the needles has a microphone attached 1.5" from the tip of the needle and the center stake has a small speaker attached at 1.5" from the tip.

Figure 7:
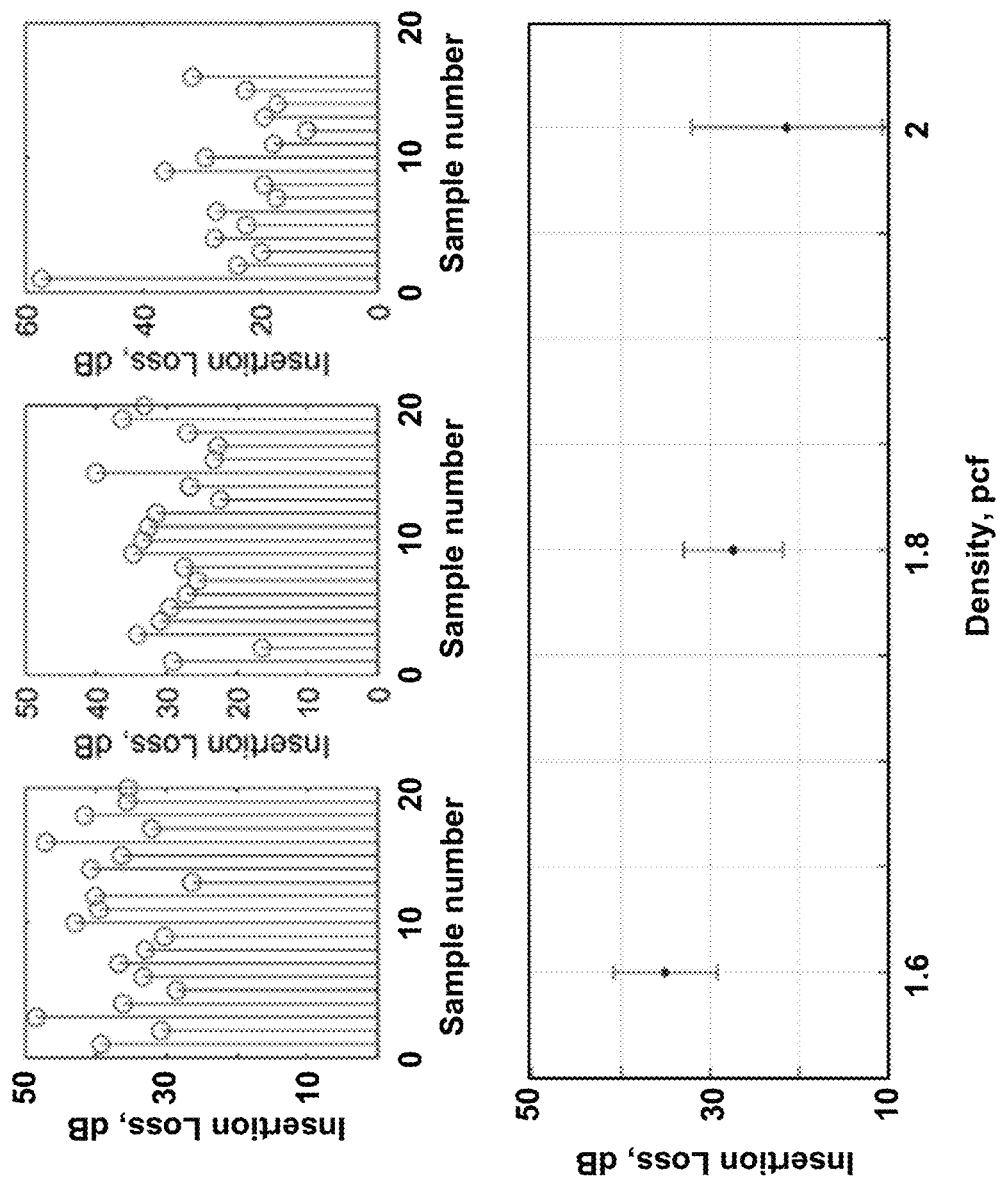
FIG. 7 shows variance in sound amplitude measurements obtained using a 5 kHz pure tone.

FIG. 7 shows how variance in sound amplitude measurements (which correlate with insulation density) obtained using a 5 kHz pure tone increases as the actual density of the insulation increases (e.g., from 1.6 PCF to 1.8 PCF, to 2.0 PCF).

Figure 8:
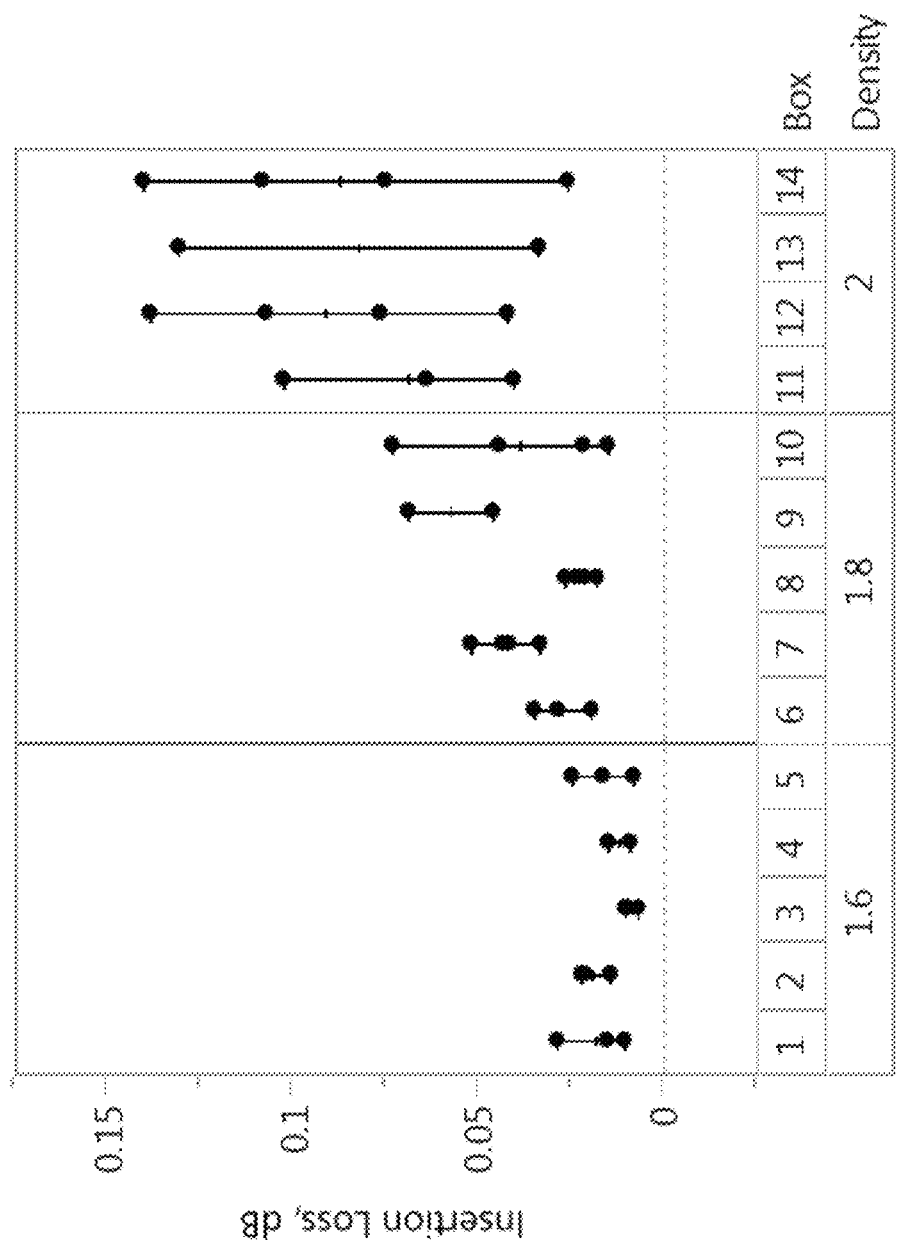
FIG. 8 shows variance in insertion loss in sound amplitude measurements obtained using a 5 kHz pure tone.

FIG. 8 similarly shows how the variance in insertion loss in sound amplitude measurements (which correlate with insulation density) obtained using a 5 kHz pure tone increases as the actual density of the insulation increases (e.g., from 1.6 PCF to 1.8 PCF, to 2.0 PCF).

Figure 9:
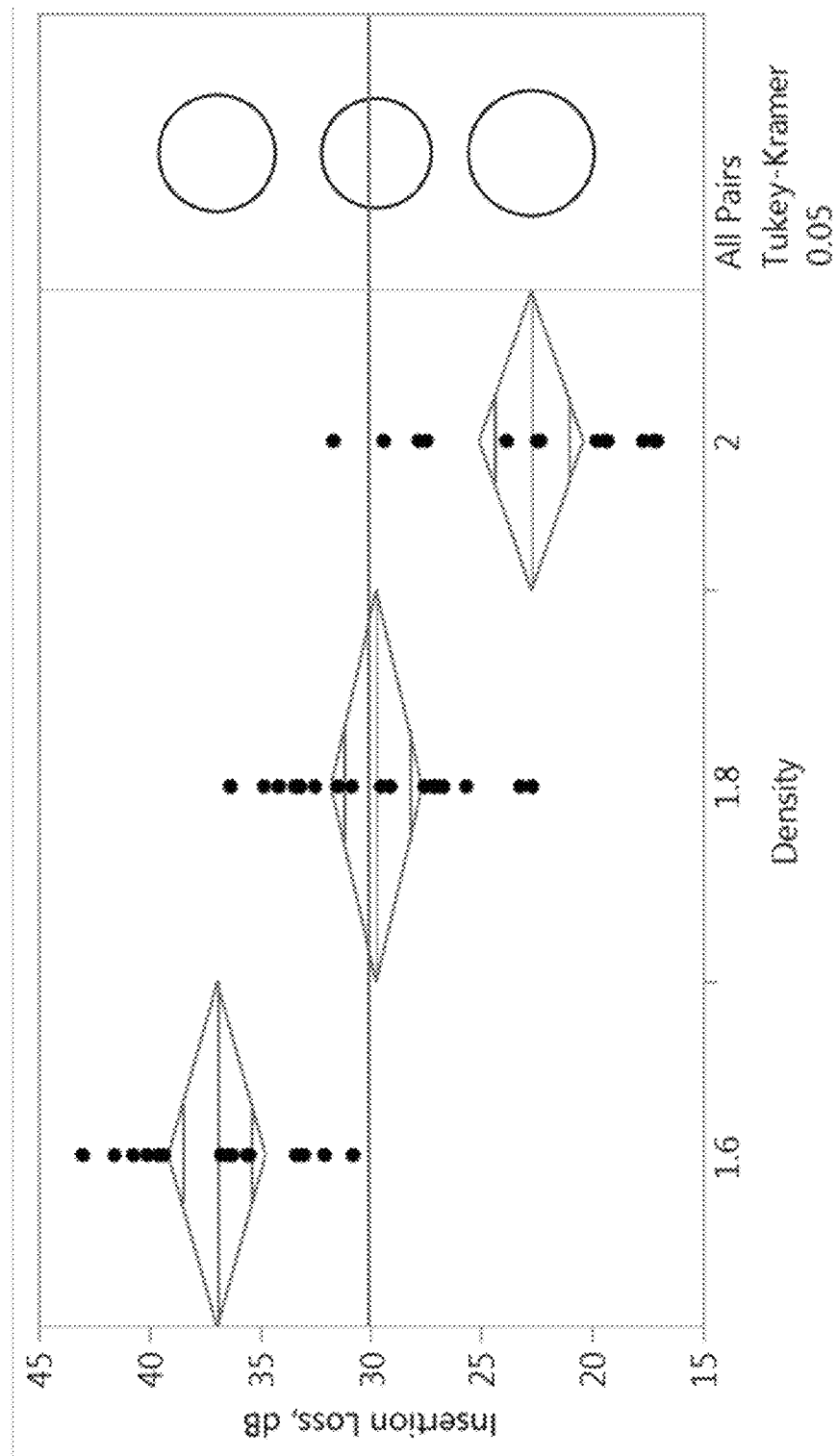
FIG. 9 shows results of a Tukey-Kramer comparison and an ANOVA analysis of density data.

FIG. 9 shows results of a Tukey-Kramer ANOVA analysis of the data shown in FIG. 8. The ANOVA analysis showed that the device is able to differentiate between the different densities with 95% confidence comparing the means of each data set using the Tukey-Kramer test. It was determined that a confidence level of 75% could be achieved with four measurements for each cavity and that a 90% confidence level could be achieved with eight measurements per cavity. Thus, the device can produce a density value with a resolution of 0.2 PCF.

The data shown in FIG. 9 unexpectedly indicated decreased sound attenuation with increased insulation density. It was determined that this was due to increased "flanking" effects that occurred at higher insulation densities when the insulation was characterized with a device similar to the device 100. More specifically, the insertion of structural members (e.g., structural members 104A-E) into the insulation created holes (e.g., voids) within the insulation that served as low-attenuation paths for sound travel. It was observed that, for higher densities of insulation, these holes created by insertion of the structural members were larger and therefore had a decreased attenuating effect on sound. Since the sound that travels through these holes do not propagate through the insulation, such sound will exhibit an amplitude that has not been attenuated by insulation, at least to a degree commensurate with the distance actually traveled by the sound.

FIG. 10A depicts a device 500 having structural members 504A, 504B, 504C, and 504D that are shown in a retracted state (i.e., stored within a base 510 of the device 500). The device 500 can have any of the features of the device 100 or the device 200 described above, with differences as described below. The device 500 includes a sound generator 502 embedded within the base 510 of the device 500. The sound generator 502 can have any of the features of the sound generators 102 or 202A-E. The structural members 504A-D can have any of the features of the structural members 104A-E or 204A-E.

The device 500 also includes sound sensors 506A, 506B, 506C, and 506D that can have the same features as the sound sensors 106A-D or 206A-E. The sound sensors 506A-D are coupled respectively to the structural members 504A-D. More specifically, the sound sensors 506A-D are respectively embedded within respective receptacles 516A, 516B, 516C, and 516D within the structural members 504A-D such that sound that is generated by the sound generator 502 and transmitted through insulation can be collected via an aperture (e.g., aperture 571C) within the structural members 504A-D. In other examples, the sound sensors of the device 500 are embedded within the base 510 so that the structural members 504A-D can collect sound and direct the sound through the structural members 504A-D to the sound sensors within the base 510.

The device 500 also includes a control system 508 and a user interface 514 that are structurally similar and function similarly to the control system 108 and the user interface 114, respectively.

As shown in FIG. 10A, the structural members 504A-D are configured to be stored within the base 510 of the device 500 (e.g., when the device 500 is not in use). More specifically, the structural members 504A-D are respectively configured to pivot with respect to the base 510 to be stored within the base 510. When the device 500 is ready for use, the structural members 504A-D can be pivoted away from the base 510 such that the structural members 504A-D are extended from the base 510 as shown in FIGS. 10B and 10C.

FIGS. 10B and 10C show the device 500 ready for use. Distal ends 519A, 519B, 519C, and 519D of the respective structural members 504A-D are configured to be inserted into insulation so that the device 500 can be used to determine insulation density in any compatible way described above.

Figure 11A:
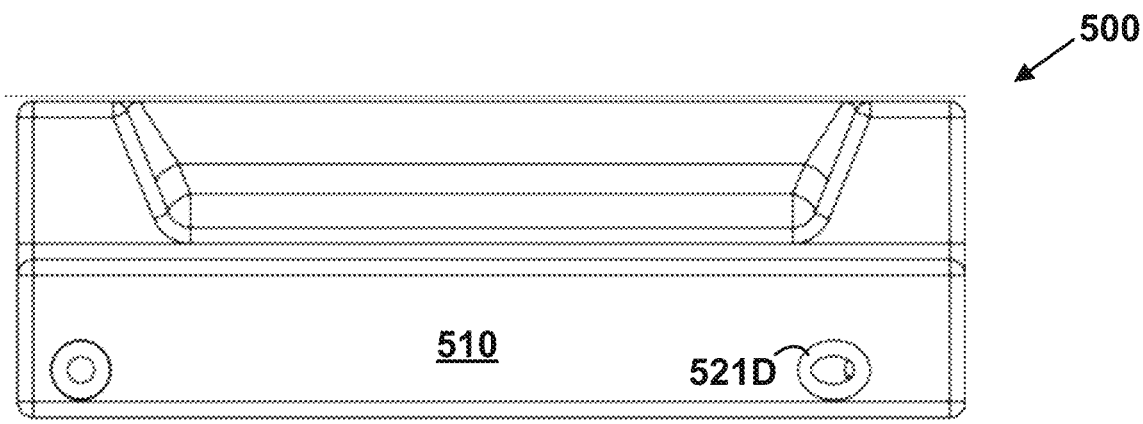
FIG. 11A is a side view of a device for determining the density of insulation, according to one embodiment of the disclosure.

FIG. 11A shows the device 500 having the structural members 504A-D stored within the base 510.

Figure 11B:
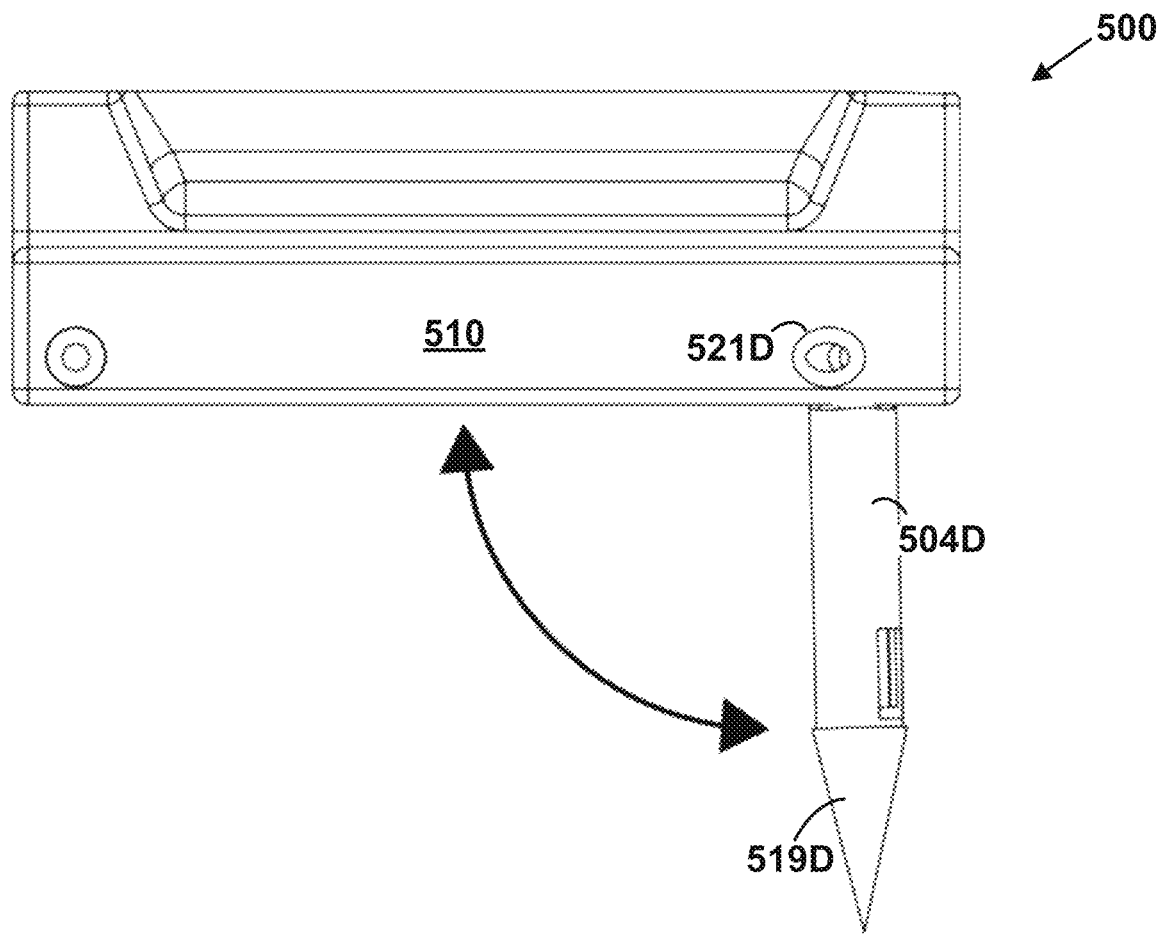
FIG. 11B is a side view of a device for determining the density of insulation, according to one embodiment of the disclosure.

FIG. 11B shows the device 500 with the structural member 504D in an extended state (i.e., pivoted away from the base 510). As shown, the structural member 504D is configured to pivot about a connection 521D toward or away from the base 510. The structural members 504A-C are similarly pivotably connected to the base 510.

Figure 12A:
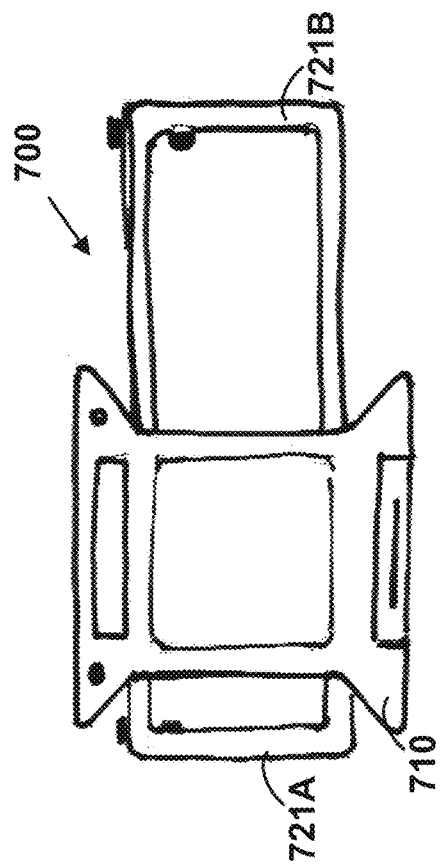
FIG. 12A is a rear view of a device for determining the density of insulation, according to one embodiment of the disclosure.

FIG. 12A is a rear view of a device 600 for determining the density of insulation. The device 600 can include any of the components and/or functionality of the devices 100, 200, or 500, with differences as described below. The device 600 includes a base 610 and support members 621A and 621B. The support members 621A and 621B are configured to retract toward the base 610 to reduce the profile of the device 600 when not in use. The support members 621A and 621B are also configured to extend away from the base 610 such that the support members 621A and 621B can be positioned against respective structures (e.g., wood studs) that form a cavity that contains insulation. As such, the support members 621A and 621B, in concert, can be configured to span a distance within a range of 16 inches to 28 inches, e.g., within a range of 16 inches to 26 inches, or within a range of 16 inches to 24 inches, so that the support members 621A and 621B can be placed against studs with spacings that are commonly found in the field.

Figure 12B:
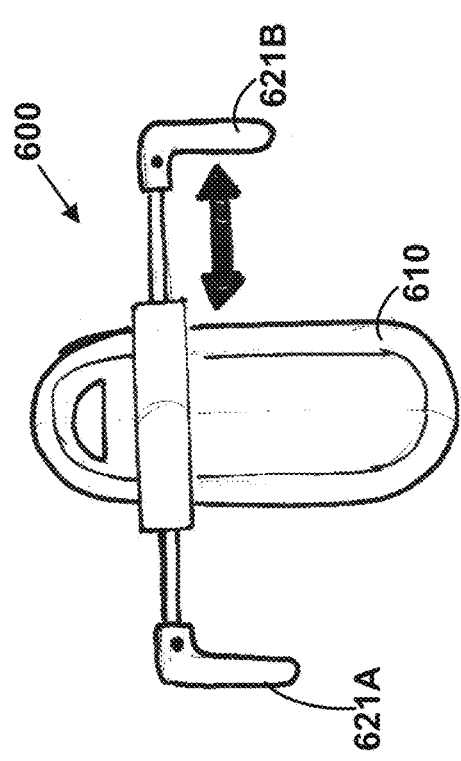
FIG. 12B is a rear view of a device for determining the density of insulation, according to one embodiment of the disclosure.

FIG. 12B is a rear view of a device 700 for determining the density of insulation. The device 700 can include any of the components and/or functionality of the devices 100, 200, 500, or 600 with differences as described below. The device 700 includes a base 710 and support members 721A and 721B. The support members 721A and 721B can have the same functionality as the structural members 621A and 621B.

Figure 12C:
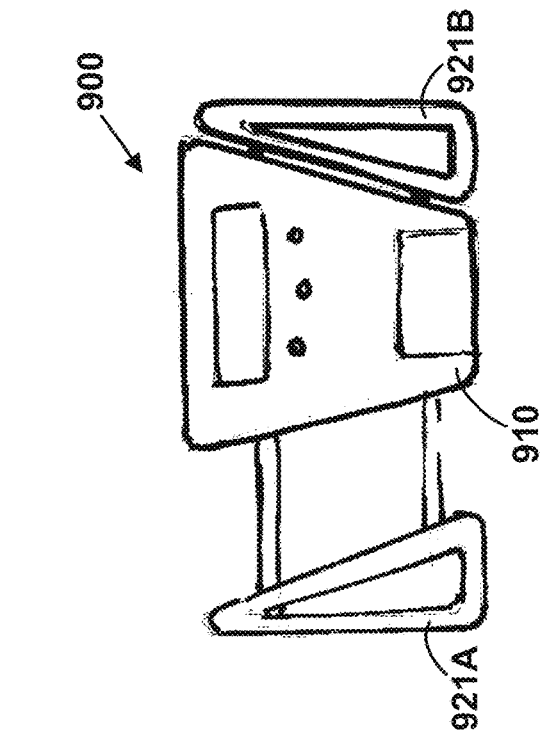
FIG. 12C is a rear view of a device for determining the density of insulation, according to one embodiment of the disclosure.

FIG. 12C is a rear view of a device 800 for determining the density of insulation. The device 800 can include any of the components and/or functionality of the devices 100, 200, 500, 600, or 700 with differences as described below. The device 800 includes a base 810 and support members 821A and 821B. The support members 821A and 821B can have the same functionality as the structural members 621A and 621B.

Figure 12D:
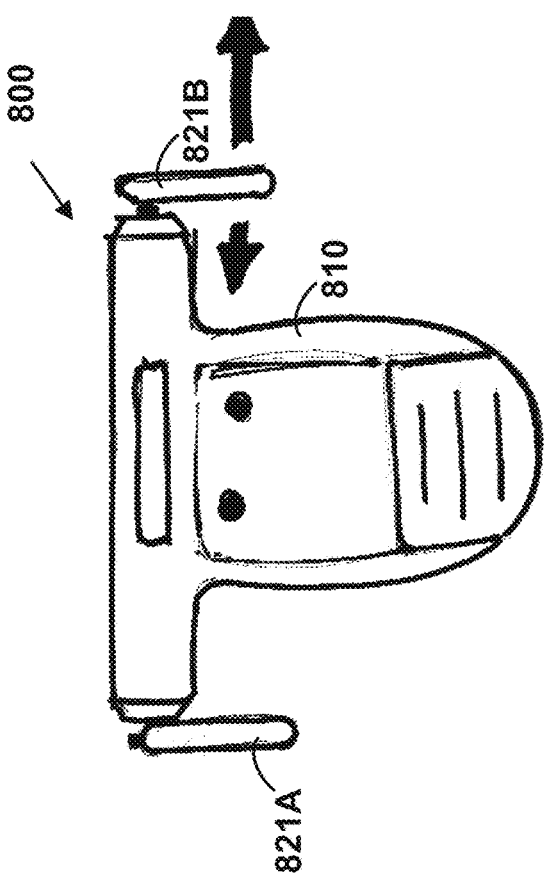
FIG. 12D is a rear view of a device for determining the density of insulation, according to one embodiment of the disclosure.

FIG. 12D is a rear view of a device 900 for determining the density of insulation. The device 900 can include any of the components and/or functionality of the devices 100, 200, 500, 600, 700, or 800 with differences as described below. The device 900 includes a base 910 and support members 921A and 921B. The support members 921A and 921B can have the same functionality as the structural members 621A and 621B.

Figure 13:
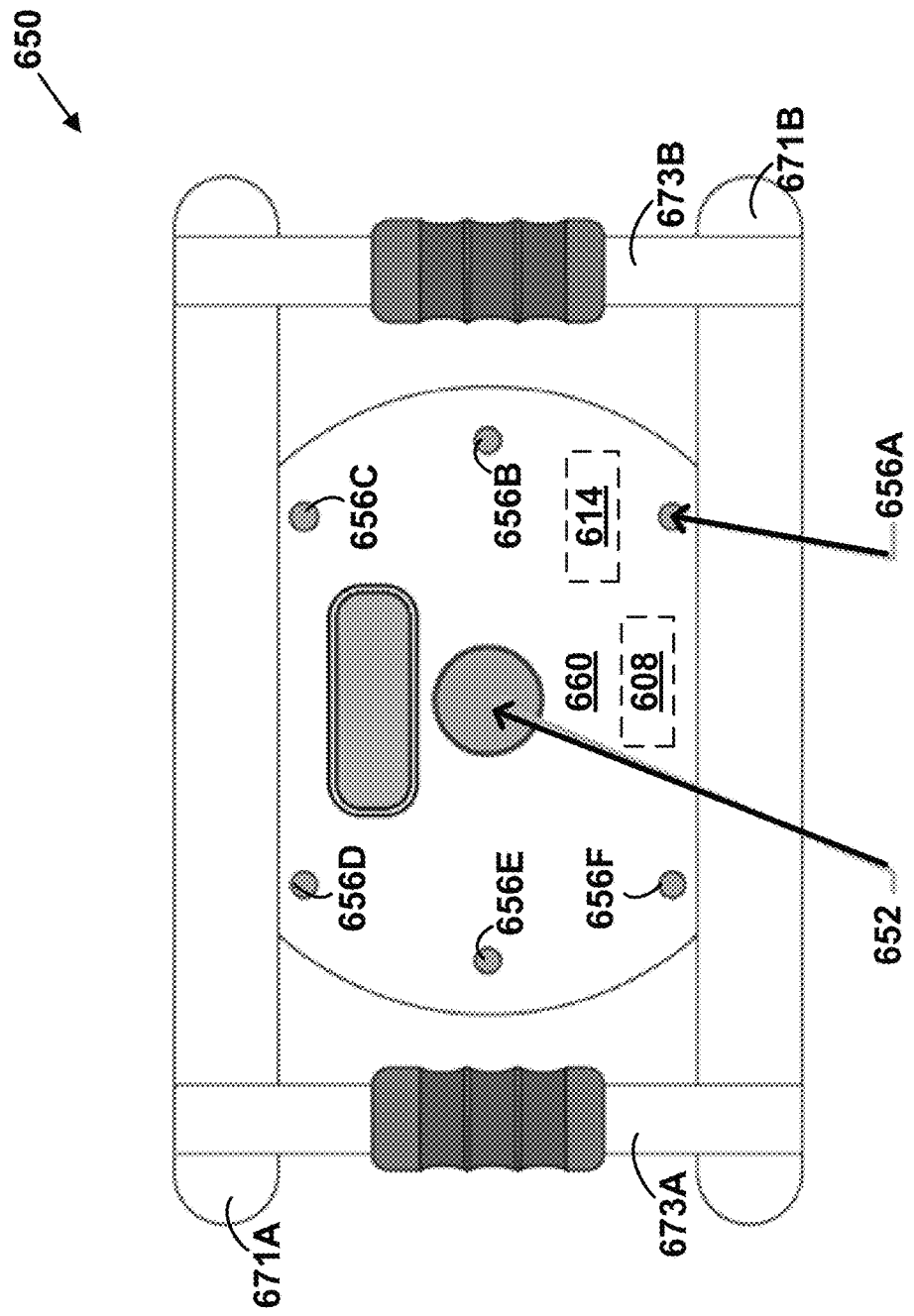
FIG. 13 is a rear view of a device for determining the density of insulation, according to one embodiment of the disclosure.

FIG. 13 is a rear view of a device 650 for determining the density of insulation. The device 650 can include any of the components and/or functionality of the devices 100, 200, 500, 600, 700, 800, or 900 with differences as described below. The device 650 includes support members 671A and 671B, handles 673A and 673B, a sound generator 652, sound sensors 656A, 656B, 656C, 656D. 656E, and 656F, and a base 660.

The base 660 houses a control system 608 and a user interface 614.

The base 660 also houses the sound generator 652 and the sound sensors 656A-F. The support members 671A and 671B are configured to be placed against respective structural members (e.g., studs) that form a cavity containing the insulation. The handles 673A and 673B each span between the support members 671A and 671B at opposite ends of the device 650 and are configured to move along with the support members 671A and 671B as the support members 671A and 671B are extended or retracted to line up with structural members of the cavity.

Figure 14:
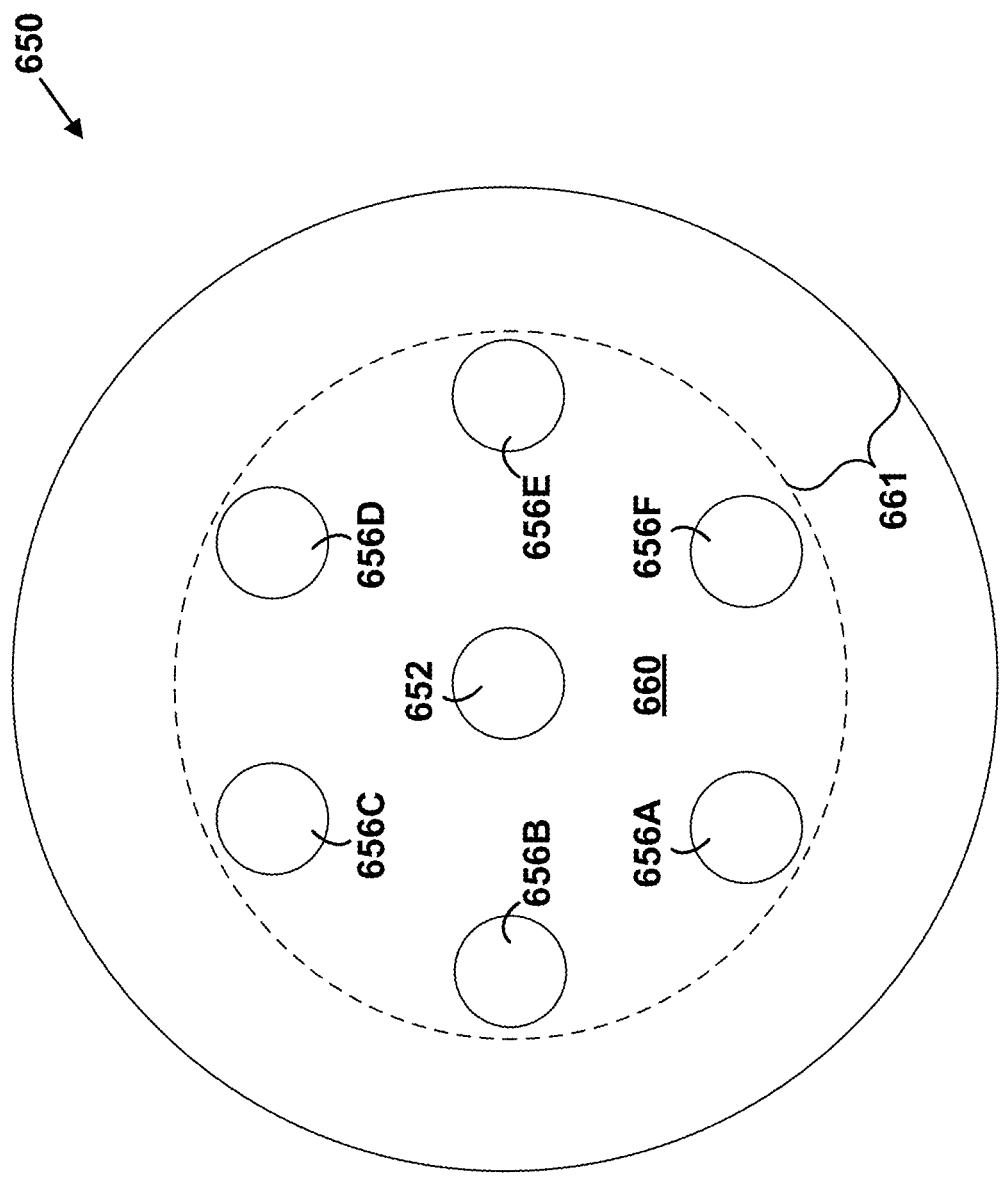
FIG. 14 is a front view of a device for determining the density of insulation, according to one embodiment of the disclosure.
Figure 15:
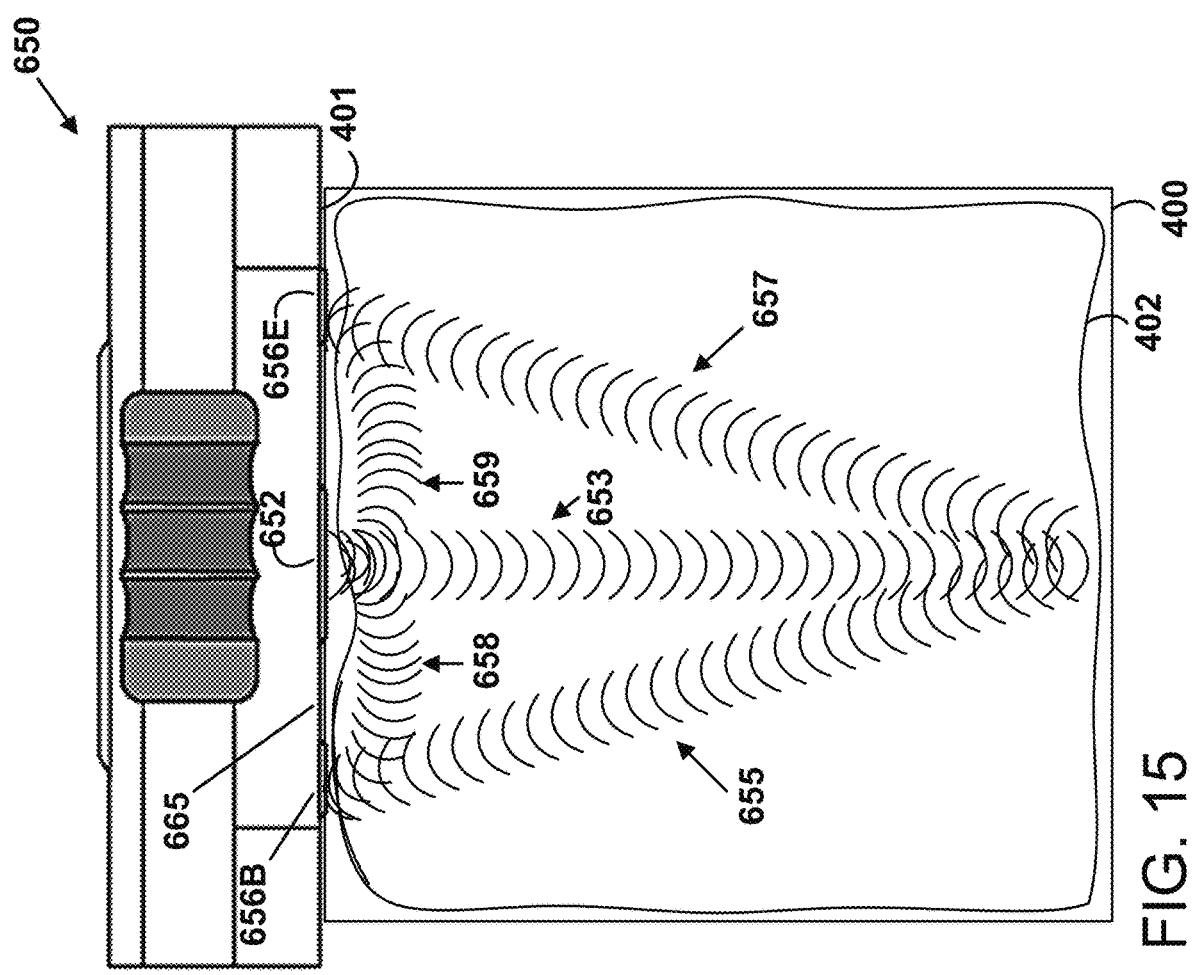
FIG. 15 depicts the use of a device for determining the density of insulation, according to one embodiment of the disclosure.

FIG. 14 is a front view of the device 650, depicting the base 660 that houses the sound generator 652 and the sound sensors 656A-F. The device 650 is configured such that the sound generator 652 and the sound sensors 656A-F can be placed against insulation that is to be characterized, as shown in FIG. 15. In some embodiments, the sound sensors 656A-F are each separated from the sound generator 652 by a distance within a range of 3.5 inches to 5.5 inches, e.g., within a range of 3.8 inches to 4.2 inches. The base 660 includes a region 661 that surrounds the sound sensors 656A-F. In some embodiments, the region 661 has a radial width of at least 2 inches.

FIG. 15 depicts the use of the device 650. The device 650 can be placed against the insulation 402 (e.g., against the barrier 401) to characterize the insulation 402. In the embodiment shown in FIG. 15, no components of the device 650 are generally inserted into the insulation 402 during operation of the device 650; rather, sound travels through the insulation between the sound generator 652 and the sound sensors 656B and 656E. In various embodiments of the devices and methods as otherwise described herein, there can be a number of paths between the sound generator and the one or more sound sensors. For example, the sound generator 652 can emit sound 653 that reflects from a back wall of the cavity 400 in the form of sound 655 and sound 657 that is detected by the respective sound sensors 656B and 656E. The sound generator can also emit sound 658 and 659 that travels through the insulation to sound sensors 656B and 656E. The received signals related to these two different types of paths can have different amplitudes, degrees of attenuation and delays, as the person of ordinary skill in the art would appreciate. As compared to the sound reflecting from the back wall, the sound that travels directly through the insulation to a sound detector will have a higher amplitude and a lower degree of attenuation but less delay. The devices and methods described herein can be configured to use either or both kinds of signals. For example, the sound generator can be configured to emit sound in a direction that provides more sound in the reflection path or more sound in the direct path. As the path length in the reflection path is typically much longer than the path length in the direct path, in many embodiments the attenuation in the reflection path can result in substantially no reflected signal received at the sound detector(s). And in cases where the reflection path does provide signal above the noise at a sound sensor, the signal from the reflection path can be separated from the direct path (i.e., based on delay time) and both signals used independently.

Figure 16:
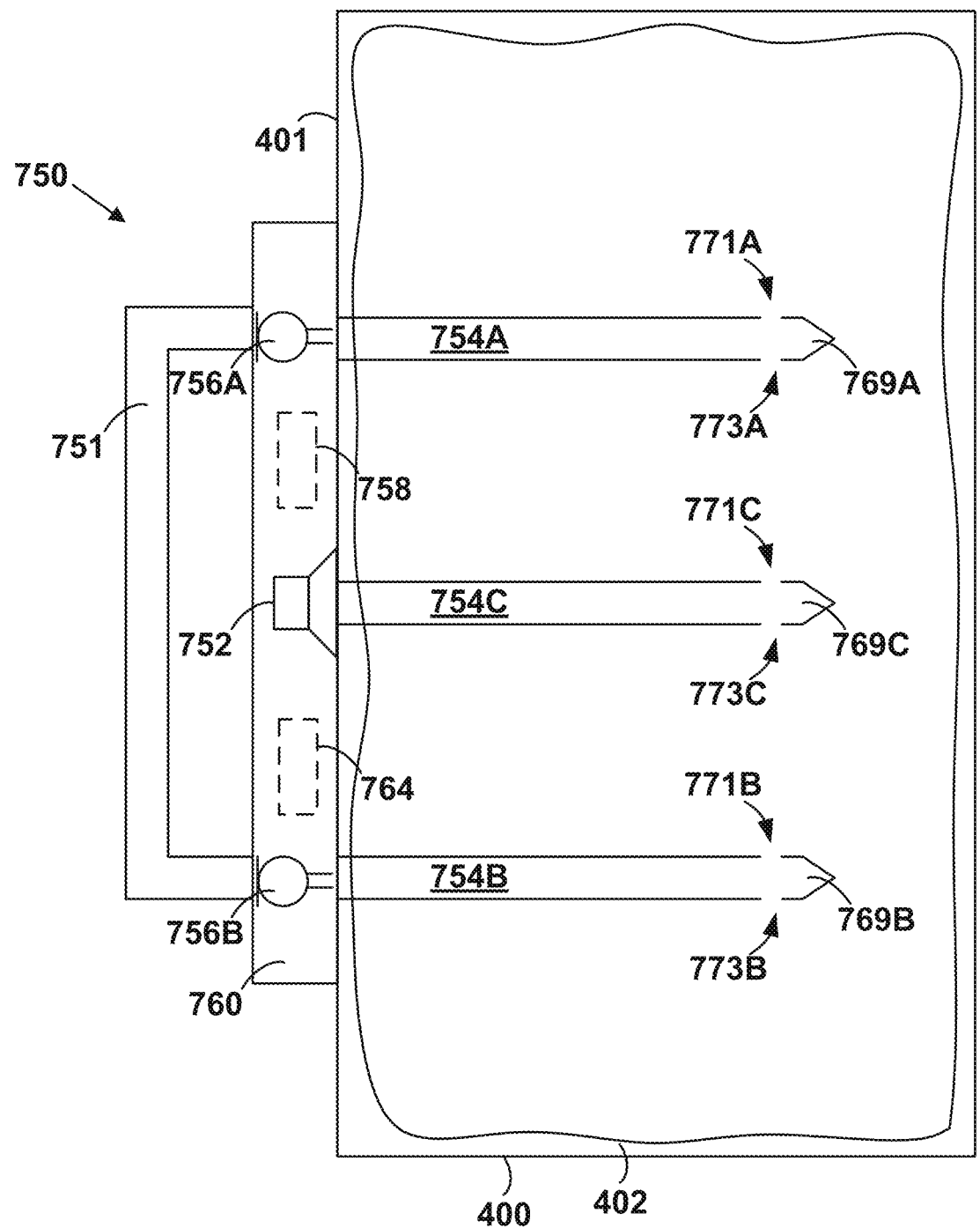
FIG. 16 is a side view of a device for determining the density of insulation, according to one embodiment of the disclosure.

In certain embodiments as otherwise described herein, the base of the devices includes a surface 665 that, in operation, constrains the cavity to a particular volume (i.e., by fixing a distance from the plate to a back wall of the cavity) in the area that is to be measured. This can, for example, be done by positioning the plate a given distance with respect to the back wall by positioning the support members against studs on either side of the cavity. For example, in the embodiment of FIG. 15, the volume of insulation 402 is made constant by the position of the surface 665 and the back wall 400. Notably, any bulging of the barrier 401 from insulation 402 is flattened between the barrier 401 and the back wall of the cavity 400. This allows the device to provide volume control for the cavity and eliminate volume and density variation from fill, especially in cases where a high density of insulation causes the barrier to bulge out FIG. 16 is a side view of a device 750 for determining the density of insulation. The device 750 can include any of the components and/or functionality of the devices 100, 200, 500, 600, 700, 800, 900, or 650 with differences as described below. The device 750 includes a base 760 having an attached handle 751. The base 760 houses a sound generator 752, sound sensors 756A and 756B, a control system 758, and a user interface 764.

The device 750 includes structural members 754A, 754B, and 754C. The structural member 754C is coupled to the base 760 near the sound generator 752 and is configured to be inserted into the insulation 402 that is to be characterized. As such, the sound generator 752 can generate sound that travels through the (e.g., hollow) structural member 754C and exits the structural member 754C through one or more of the apertures 771C or 773C near a distal end 769C of the structural member 754C.

The structural member 754A is coupled to the base 760 near the sound sensor 756A and is configured to be inserted into the insulation 402. The sound that is generated by the sound generator 752 and exits the structural member 754C can travel through the insulation 402 and through one or more of the apertures 771A or 773A within the structural member 754A. The sound collected by the structural member 754A can travel through the (e.g., hollow) structural member 754A to be detected by the sound sensor 756A.

The structural member 754B is coupled to the base 760 near the sound sensor 756B and is configured to be inserted into the insulation 402. The sound that is generated by the sound generator 752 and exits the structural member 754C can travel through the insulation 402 and through one or more of the apertures 771B or 773B within the structural member 754B. The sound collected by the structural member 754B can travel through the (e.g., hollow) structural member 754B to be detected by the sound sensor 756B.

Figure 17:
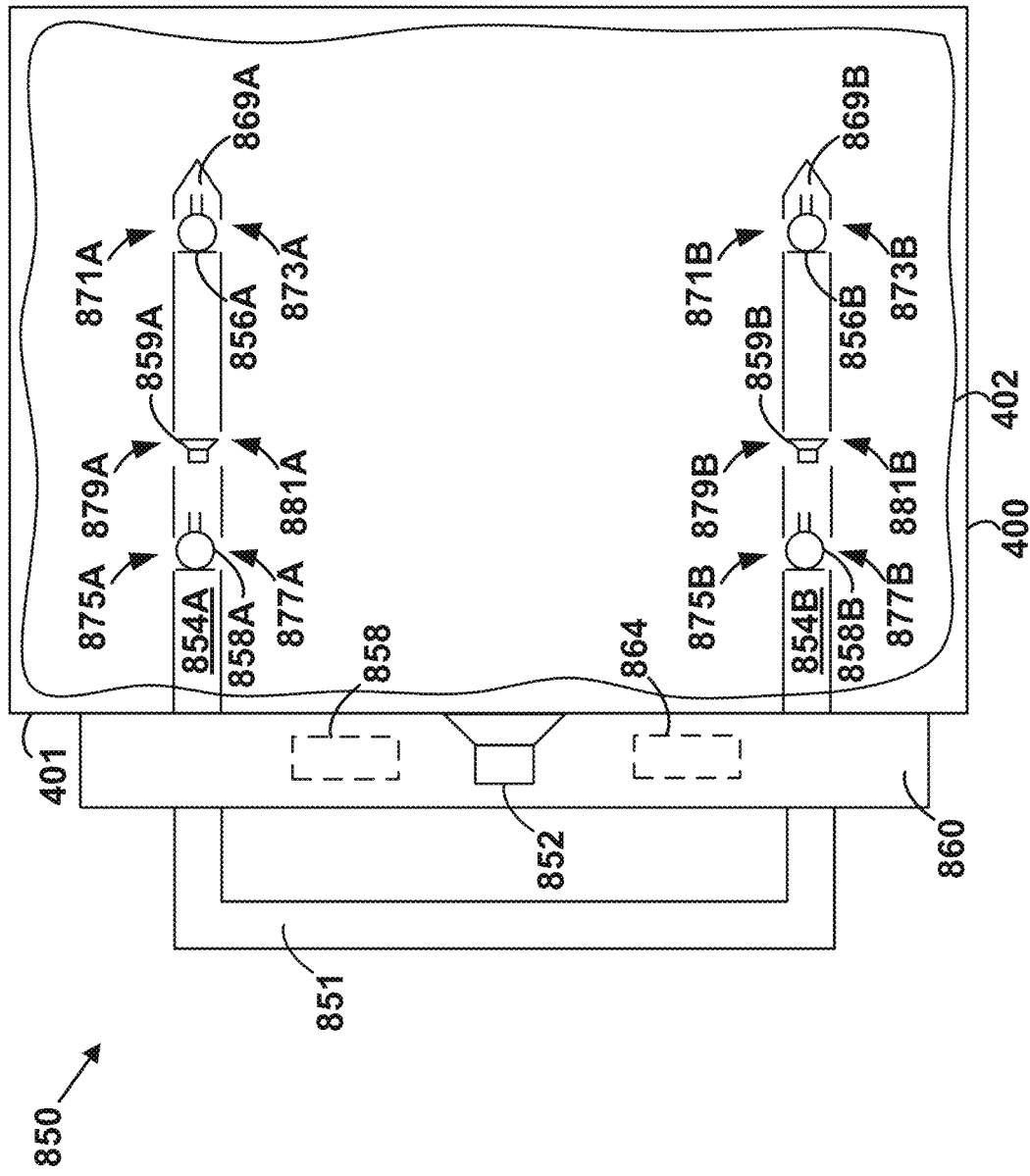
FIG. 17 is a side view of a device for determining the density of insulation, according to one embodiment of the disclosure.

FIG. 17 is a side view of a device 850 for determining the density of the insulation 402. The device 850 can include any of the components and/or functionality of the devices 100, 200, 500, 600, 700, 800, 900, 650, or 750 with differences as described below. The device 850 includes a base 860 having an attached handle 851. The base 860 houses a sound generator 852, a control system 858, and a user interface 864.

The sound generator 852 is configured to generate sound that travels through the insulation 402 to be detected by any of the sound sensors 858A, 856A, 858B, or 856B.

The device 850 also includes structural members 854A and 854B. The structural member 854A is coupled to the base 860 and is configured to be inserted into the insulation 402 as shown in FIG. 17. The structural member 854A houses a sound sensor 858A, a sound generator 859A, and a sound sensor 856A. The sound sensor 858A, the sound generator 859A, and the sound sensor 856A are located at different depths along the structural member 854A.

The sound sensor 858A is located next to apertures 875A and 877A within the structural member 854A. The sound generator 859A is located next to apertures 879A and 881A within the structural member 854A. The sound sensor 856A is located next to apertures 871A and 873A within the structural member 854A.

The sound generator 859A is configured to generate sound that exits the structural member 854A through one or more of the apertures 879A or 881A. The sound generated by the sound generator 859A can travel through the insulation 402 and be detected by any of the sound sensors of the device 850, for example, by the sound sensors 858A, 856A, 858B, or 856B. The structural member 854A can include a sound damping material between the sound generator 859A and the sound sensor 858A and between the sound generator 859A and the sound sensor 856A so that the sound detected by the sound sensors 858A and 856A primarily represent sound that has traveled through the insulation 402 and not sound that travels directly from the sound generator 859A to the sound sensors 858A or 856A through the structural member 854A.

The structural member 854B is coupled to the base 860 and is configured to be inserted into the insulation 402 as shown in FIG. 17. The structural member 854B houses a sound sensor 858B, a sound generator 859B, and a sound sensor 856B. The sound sensor 858B, the sound generator 859B, and the sound sensor 856B are located at different depths along the structural member 854B.

The sound sensor 858B is located next to apertures 875B and 877B within the structural member 854B. The sound generator 859B is located next to apertures 879B and 881B within the structural member 854B. The sound sensor 856B is located next to apertures 871B and 873B within the structural member 854B.

The sound generator 859B is configured to generate sound that exits the structural member 854B through one or more of the apertures 879B or 881B. The sound generated by the sound generator 859B can travel through the insulation 402 and be detected by any of the sound sensors of the device 850, for example, by the sound sensors 858A, 856A, 858B, or 856B. The structural member 854B can include a sound damping material between the sound generator 859B and the sound sensor 858B and between the sound generator 859B and the sound sensor 856B so that the sound detected by the sound sensors 858B and 856B primarily represent sound that has traveled through the insulation 402 and not sound that travels directly from the sound generator 859B to the sound sensors 858B or 856B through the structural member 854B.

Figure 18:
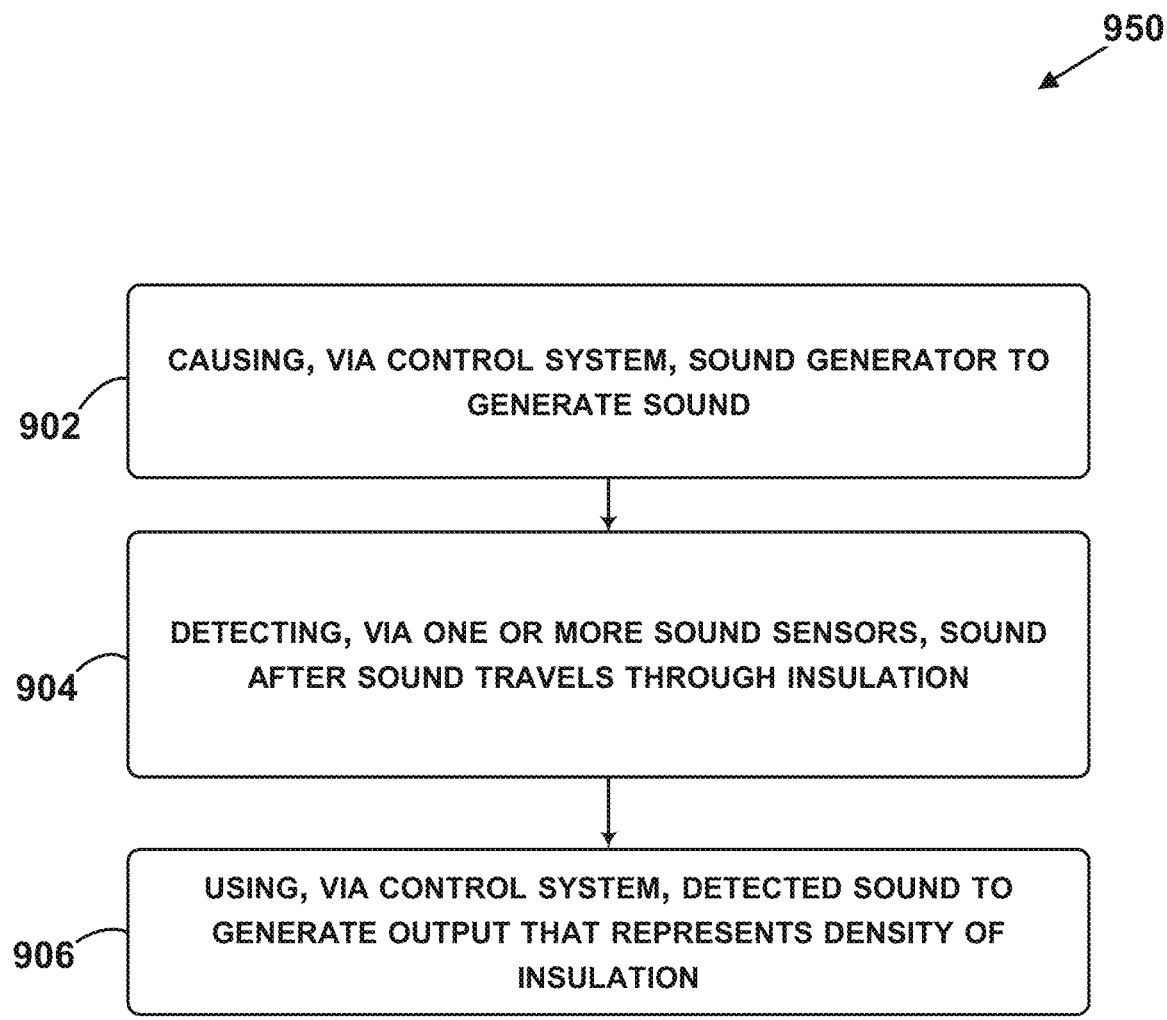
FIG. 18 is a block diagram of a method for determining the density of insulation, according to one embodiment of the disclosure.

FIG. 18 is a block diagram of a method 950 for determining the density of insulation (e.g., in a cavity) according to one embodiment of the disclosure. The method 950 can include any of the features of the method 300 with additional features and/or differences described below. The method 950 can be performed using any of the devices 100, 200, 500, 600, 700, 800, 900, 650, 750, or 850 to determine the density of insulation 402 in the cavity 400, as shown in FIGS. 4, 5, and 15-17, for example.

At block 902, the method 900 includes causing, via the control system, the sound generator to generate sound. Block 902 can be performed in any way that block 304 can be performed as described above, with additional features and/or differences described below.

Referring to FIG. 4 for example, the control system 108 can cause the sound generator 102 to generate the sound 501 while the sound generator 102 is within the insulation 402. In this example, the sound sensors 106A-D will generally be within the insulation 402 when the sound generator 102 generates the sound 501 for detection.

Referring to FIG. 5 for example, the control system 208 can also cause one or more of the sound generators 202A-E to generate sounds 602A-E while the sound generators 202A-E are within the insulation 402. In this example, the sound sensors 206A-E will generally be within the insulation 402 (e.g., at different depths within the insulation 402) when the sound generators 202A-E generate the sounds 602A-E for detection.

Referring to FIGS. 10A-C for example, the control system 508 can cause the sound generator 502 to generate sound while the sound generator 502 is outside of insulation under test. That is, the base 510 can be pressed against insulation such that the structural members 504A-D are inserted into the insulation. Thus, the sound sensors 506A-D will generally be within the insulation when the sound is generated by the sound generator 502.

Referring to FIGS. 13-15 for example, the control system 608 can cause the sound generator 652 to generate sound 653 while the sound generator 652 is outside of the insulation 402 under test. In this example, the sound sensors 656A-F will generally be outside of the insulation 402 when the sound generator 652 generates sound 653 for detection.

Referring to FIG. 16, the control system 758 can cause the sound generator 752 to generate sound while the sound generator 752 is outside of the insulation 402 under test. In this example, the sound sensors 756A-B will generally be outside of the insulation 402 when the sound generator 752 generates sound for detection.

Referring to FIG. 17, the control system 858 can cause the sound generator 852 to generate sound while the sound generator 852 is outside of the insulation 402 under test. Additionally, the control system 858 can cause the sound generators 859A and/or 859B to generate sound while the sound generators 859A and 859B are within the insulation 402. In this example, the sound sensors 858A, 856A, 858B, and 856B will generally be inside of the insulation 402 when the sound generators 852, 859A, and/or 859B generate sound for detection.

Some embodiments include inserting one or more structural members of a device into the insulation under test prior to causing one or more sound generators of the device to generate sound. Inserting the structural members to a suitable depth within the insulation will generally result in any sound generators or sound sensors that are coupled to the structural members of the device to be inserted into the insulation as well. Accordingly, sound generated by any sound generators of the device that are located within the insulation (e.g., at different depths within the insulation) can be collected by other structural members of the device (e.g., apertures within structural members) after such sound travels through a portion of the insulation. This collected sound can be detected by sound sensors of the device that are located within the insulation at different depths and/or sound sensors that are located in a base of the device outside of the insulation. In some embodiments, the device could include additional sound generators configured to be placed at multiple depths along a single structural member of the device.

Some method embodiments include, prior to causing a sound generator of the device to generate sound, positioning one or more support members of the device against two structures (e.g., studs) that form a cavity that contains the insulation, the two structures forming the cavity from opposite sides of the cavity. Referring to FIG. 13 for example, the support members 671A and 671B can be placed against studs that form the cavity 400 from opposite sides. That is, the support members 671A and 671B will generally span horizontally between two vertical studs during operation of the device. The support members 671A and 671B can be extended and/or retracted to fit the horizontal spacing between the vertical studs defining the cavity 400.

At block 904, the method 900 includes detecting, via the one or more sound sensors, the sound after the sound travels through the insulation. Block 904 can be performed in any way that block 306 can be performed as described above, with additional features and/or differences described below.

Referring to FIG. 4 for example, one or more of the sound sensors 106A-D (e.g., from within the insulation 402) can detect the sound 501 that is generated by the sound generator 102 (e.g., from within the insulation 402) after the sound 501 travels through the insulation 402.

Referring to FIG. 5 for example, one or more of the sound sensors 206A-E (e.g., from within the insulation 402) can detect the sounds 602A-E generated by the sound generators 202A-E (e.g., from within the insulation 402) after the sounds 602A-E travel through the insulation 402.

Referring to FIGS. 10A-C, one or more of the sound sensors 506A-D can detect (e.g., from within the insulation) the sound generated by the sound generator 502 (e.g., from outside of the insulation) after the sound travels through the insulation. That is, the base 510 can be pressed against insulation such that the structural members 504A-D are inserted into the insulation. Thus, the sound sensors 506A-D will generally be within the insulation when the sound is detected.

Referring to FIGS. 13-15 for example, one or more of the sound sensors 656A-F can detect (e.g., from outside the insulation 402) the sounds 655 and/or 657 generated by the sound generator 652. The sounds 655 and 657 represent reflections of the sound 653 after the sound 653 is generated by the sound generator 652, travels through the insulation 402, and impinges a back wall of the cavity 400.

Referring to FIG. 14 for example, one or more of the sound sensors 656A-F can detect sound that reflects from at least one structure within the cavity 400 and travels (e.g., inward) past a region 661 of the base 660 that surrounds the one or more sound sensors 656A-F. In some embodiments, the region 661 has a radial width of at least 2 inches.

Referring to FIG. 16 for example, one or more of the sound sensors 756A and 756B can detect (e.g., from outside the insulation 402) the sound that is generated by the sound generator 752 (e.g., from outside of the insulation 402) after the sound travels through the insulation 402. More specifically, the sound generated by the sound generator 752 can travel through the structural member 754C, through one or more of the apertures 771C and 773C, and through the insulation 402 to be collected by the structural member 754A (e.g., collected by the apertures 771A or 773A) or collected by the structural member 754B (e.g., collected by the apertures 771B or 773B). The structural members 754A and 754B can transfer any collected sound respectively to the sound sensors 756A and 756B.

Referring to FIG. 17 for example, one or more of the sound sensors 858A, 856A, 858B, and 856B can detect (e.g., from different depths inside the insulation 402) the sound that is generated by the sound generator 852 (e.g., from outside the insulation 402) and/or the sound that is generated by the sound generators 859A and 859B (e.g., from inside the insulation 402). More specifically, the sound generated by the sound generator 852 can travel through the insulation 402 to be collected by the structural member 854A (e.g., collected by the apertures 871A, 873A, 875A, or 877A) or collected by the structural member 854B (e.g., collected by the apertures 871B, 873B, 8758, or 877B). As such, sound collected by the apertures 875A and 877A can be detected by the sound sensor 858A, sound collected by the apertures 871A and 873A can be detected by the sound sensor 856A, sound collected by the apertures 875B and 877B can be detected by the sound sensor 858B, and sound collected by the apertures 871B and 873B can be detected by the sound sensor 856B.

At block 906, the method 900 includes using, via the control system, the detected sound to generate output that represents the density of the insulation. Block 906 can be performed in any way that block 308 can be performed as described above.

Figure 19:
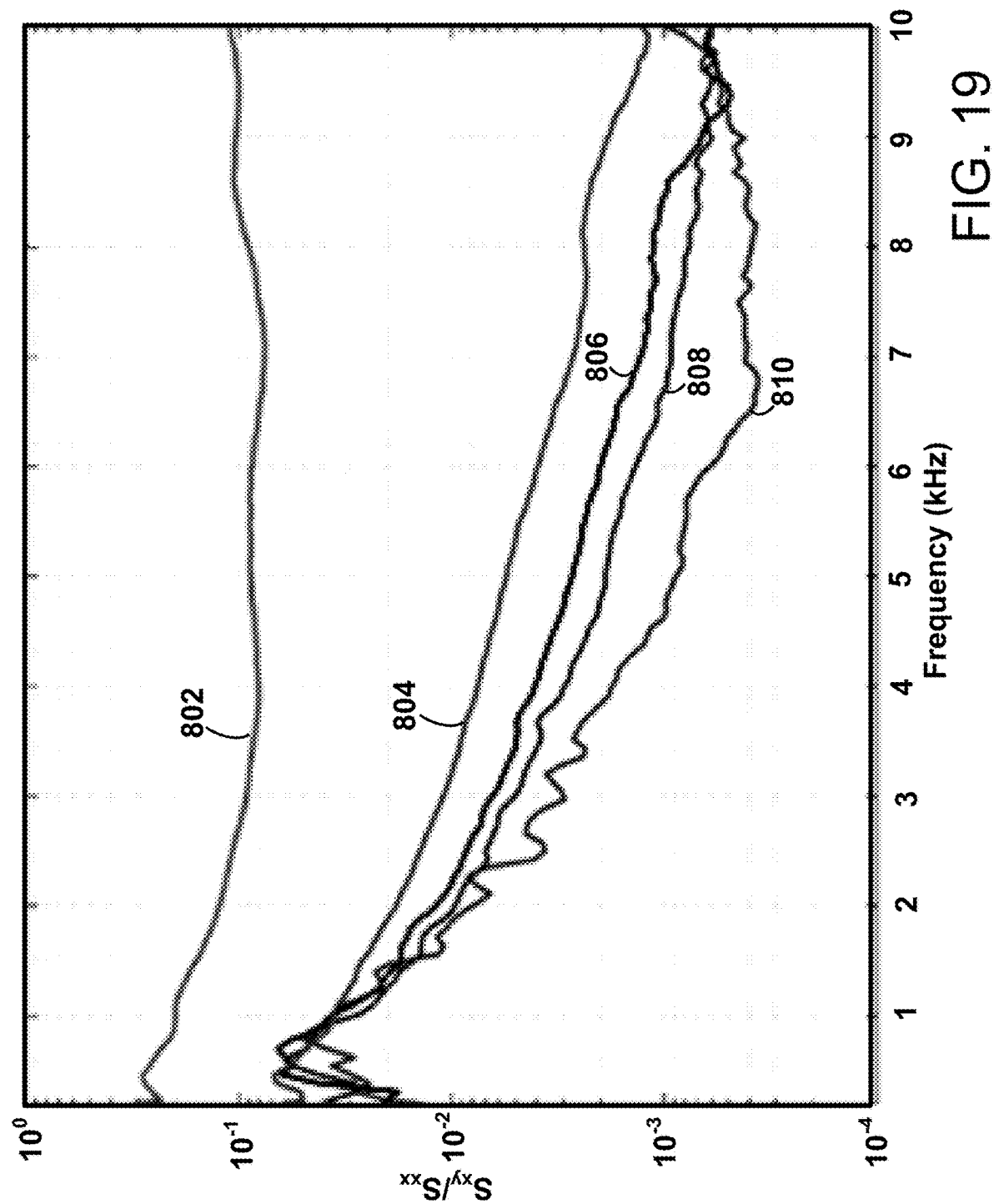
FIG. 19 shows experimental attenuation curves corresponding to five insulation densities.

FIG. 19 depicts experimental data obtained by a device similar to the device 650. The experimental data includes curves 802, 804, 806, 808, and 810 that correspond respectively to known insulation densities of 0.71 pounds per cubic foot (PCF), 1.06 PCF, 1.22 PCF, 1.37 PCF, and 1.60 PCF. The curves 802-810 show detected sound amplitude divided by the amplitude of the generated sound vs frequency of the sound for each of the five insulation densities. As shown, the curves 802-810 show that attenuation generally increases (and amplitude generally decreases) with increased insulation density, confirming that the device 650 is capable of obtaining useful and accurate results.

Figure 20:
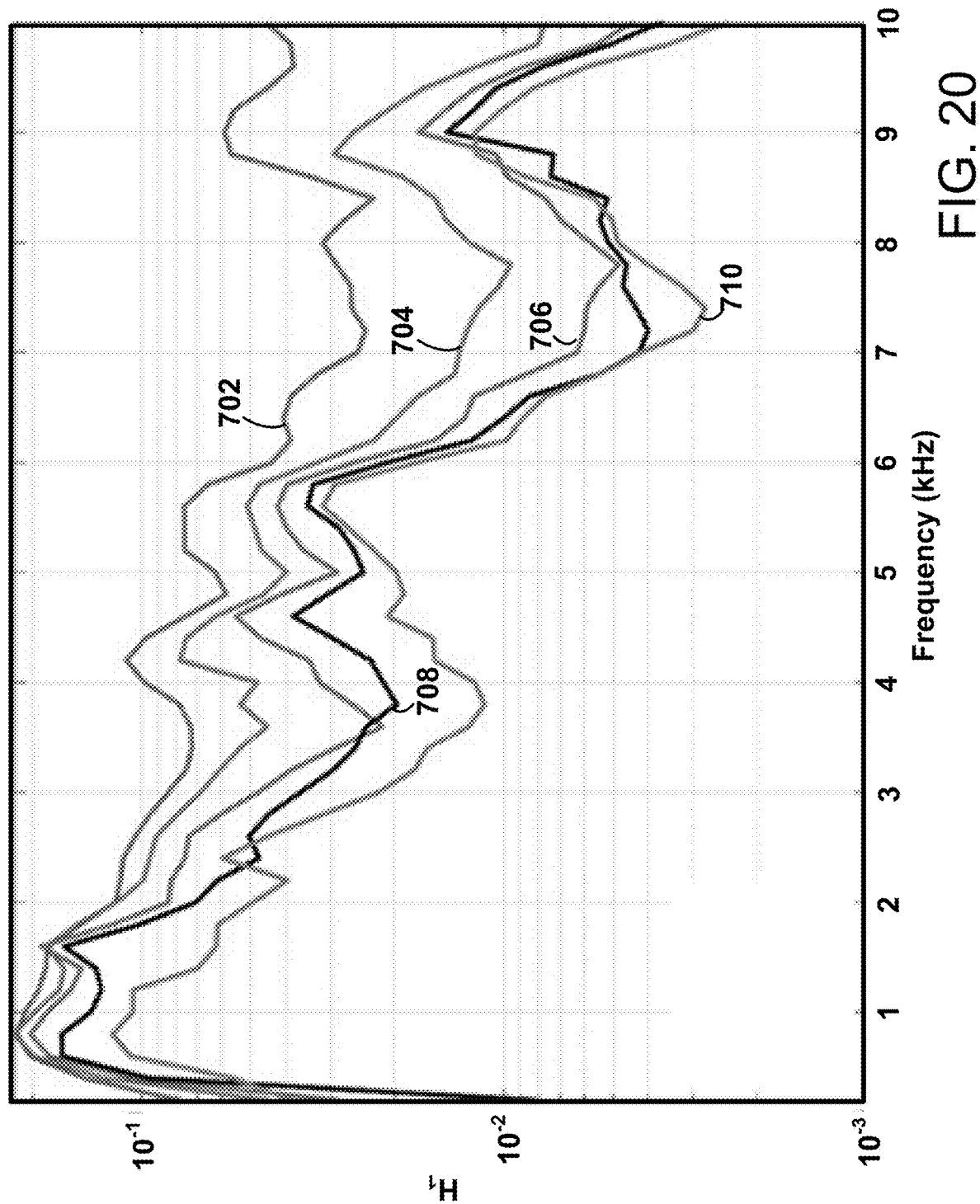
FIG. 20 shows experimental attenuation curves corresponding to five insulation densities.

FIG. 20 depicts another set of experimental data obtained by a device similar to the device 650. The experimental data includes curves 702, 704, 706, 708, and 710 that correspond respectively to known insulation densities of 0.92 PCF, 1.17 PCF, 1.33 PCF, 1.53 PCF, and 2.02 PCF. The curves 702-710 show detected sound amplitude divided by the amplitude of the generated sound vs frequency of the sound for each of the five insulation densities. As shown, the curves 702-710 also show that attenuation generally increases (and amplitude generally decreases) with increased insulation density.

Figure 21:
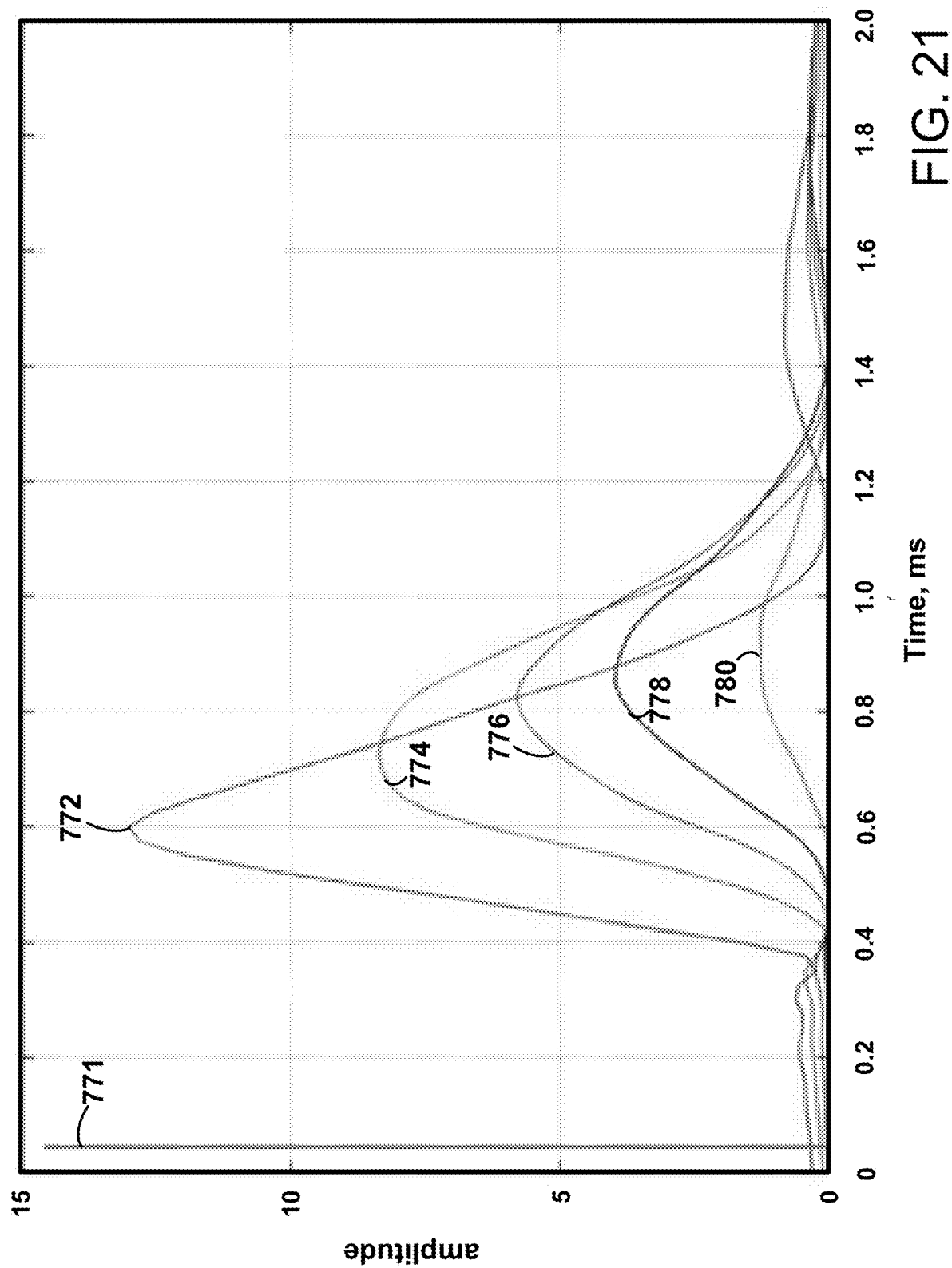
FIG. 21 shows experimental amplitude response curves corresponding to five insulation densities.

FIG. 21 depicts another set of experimental data obtained by a device similar to the device 650. The experimental data includes curves 772, 774, 776, 778, and 780 that correspond respectively to known insulation densities of 0.92 PCF, 1.17 PCF, 1.33 PCF, 1.53 PCF, and 2.02 PCF. The curve 771 represents the generated (input) sound in the form of an impulse (e.g., delta) function. The curves 772-780 show detected sound amplitude vs time for each of the five insulation densities. As shown, the curves 772-780 show that increasing insulation density corresponds with reduced detected amplitude (increased attenuation), increased dispersion (more frequency-based variation in time delay between sound generation and detection), and an overall increased time delay between sound generation and detection.

Figure 22:
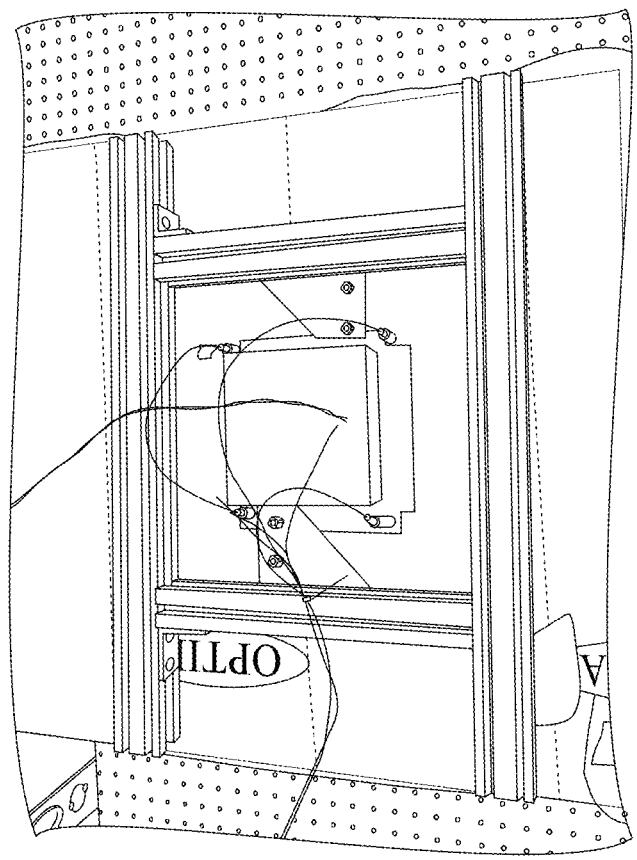
FIG. 22 is a photograph.
Figure 23:
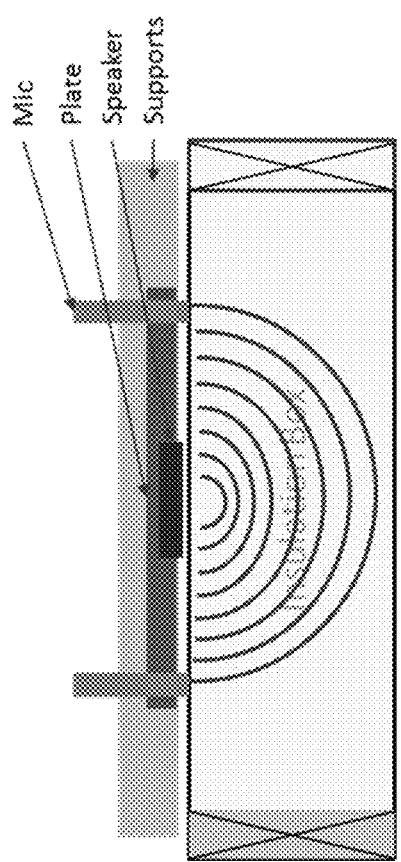
FIG. 23 is a drawing of a prototype device used in an experiment described herein.

In another set of experiments, the present inventors constructed a device shown in the photograph of FIG. 22 and the diagram of FIG. 23. For volume control, the device has a large acrylic plate that is pushed up against the studs with two wide bars on top and bottom of the device that can span a twenty-four-inch cavity width, contacting the studs on either side. This allows for control of the depth of the volume measured to ameliorate any issues with fabric bulging. Advantageously, the plate also addresses any issues with sound traveling from speaker to microphone through the device itself, as it provides a barrier to sound. Accordingly, in certain embodiments as otherwise described herein, the speaker and microphones are decoupled from the base to prevent direct mechanical vibrational signal transfer to the microphones. In various embodiments as otherwise described herein, the sound generator can be vibrationally isolated from the one or more sound detectors, e.g., by mounting the sound generator on a separate piece of a base or housing than the one or more sound sensors, or by isolating the sound generator, the one or more sound sensors, or both, using a foam or viscoelastic material (e.g., using rubber gasket).

Signal to noise ratio is an important issue because the insulation has good sound-attenuation properties, and so the signal emerging from the insulation can have a relatively low strength. This can be especially problematic on a jobsite where the noise level is high; a device is desirably able to distinguish the specific white noise signal from the surroundings. In this set of experiments, a higher power speaker (25 W) was used, with a high-pass filter being added to cut out low frequency noise when necessary.

Among others, three acoustic signals were contemplated for the devices and methods of this experiment: a pure tone, linear chirp and band limited noise. These different signals can provide advantages and disadvantages in terms of signal-to-noise ratio (SNR), bandwidth and detection in the presence of transient disturbances. For instance, with the pure tone, all of the acoustic energy is at a single frequency which can translate to good signal-to-noise (considering signals of the same pulse width), but in this case only a single frequency is being probed. One alternative can be the use of a swept sine (essentially switching the frequency of the pure tone in a non-continuous manner), but this can drastically increase the measurement time. One strategy to increase the SNR is to use signals that have a long duration and large bandwidth, which makes the chirp and band limited noise highly suitable for the intended application. In addition, pulse compression techniques for improving the SNR and removing unwanted signals can be implemented.

The present inventors contemplate a number of time and frequency analysis methods as metrics that are correlatable with the blown insulation density. For example, the change in the time domain amplitude of the signals has been contemplated along with frequency domain transfer functions. Methods to reduce the impact of noise on the input or measured signals through frequency domain analysis using the auto and cross spectral densities are also contemplated. One analysis method which has demonstrated strong correlation to the blown insulation density is the calculation of the impulse response of the system. Computation of the impulse response can be performed via the cross-correlation of the input (reference signal) and the measured output signal of the system. From the impulse response, the correlation amplitude and time delay of the pulse both correlate strongly with the blown insulation density.

In an environment such as the in-situ measurement conditions of this experiment, multiple peaks appear in the calculated impulse response due to multiple sources of reflection. Narrower and more distinct correlation peaks are favorable. FIG. 24 shows the cross-correlations of a sinewave, linear chirp, and pseudorandom noise. The correlation amplitudes have been normalized to represent the received voltage of the signal based on the emitted voltage. Note, there is difference in the normalization of the sinewave and chirp compared to the random noise resulting in a difference in the lower amplitude in this case. Clearly, the pseudo random noise results in the narrower and more distinct peak, and so, was chosen as the excitation signal.

Figure 25:
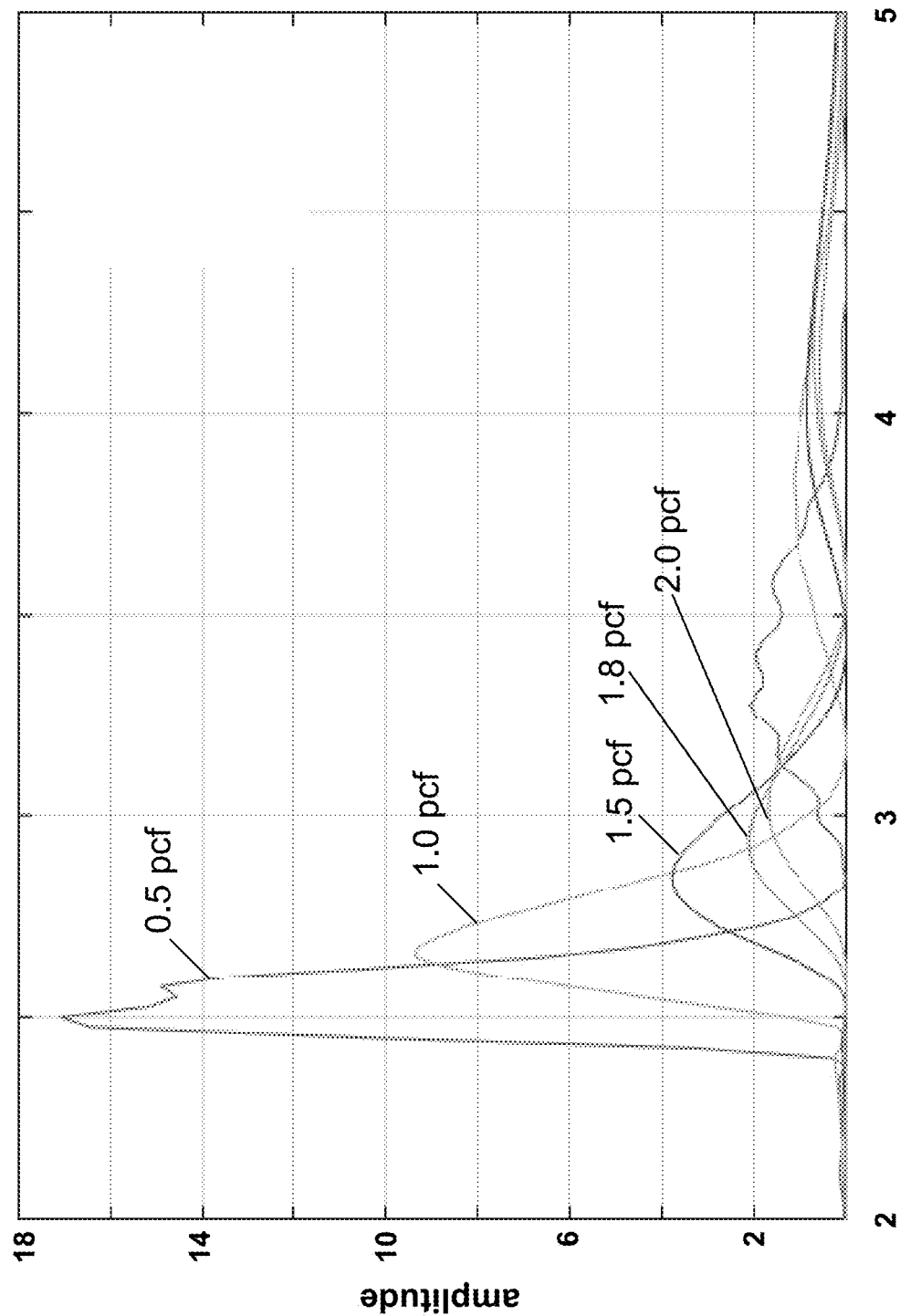
FIG. 25 shows impulse response data at different densities in an impedance tube showing a change in amplitude (y-axis) and delay (x-axis) for each density, calculated using the cross correlation of the signal excitation and response.

For this experiment, a band-limited white noise signal was chosen as the excitation. The frequency ranges from 100-10,000 Hz. A wide range was chosen to capture the interaction of the insulation with various wavelengths Experiments were performed to measure of insulation at different densities in an impedance tube. This acoustic measurement was used to calculate the speed of sound through the insulation at different densities and also the attenuation of that sound. FIG. 25 shows Impulse response data at different densities in an impedance tube showing a change in amplitude (y-axis) and delay (x-axis) for each density, calculated using the cross correlation of the signal excitation and response. As density increases the impulse response amplitude decreases and the impulse response delay increases. Following this relationship and using the known time of flight at specific densities, see the table below, the signal response can be distinguished from other extraneous noise or reflections within a cavity.

| Density (PCF) | TOF in material (ms) | Calculated sound speed (m/s) |
| --- | --- | --- |
| 0.5 | 0.49 | 275 |
| 1.0 | .64 | 210 |
| 1.5 | .84 | 160 |
| 1.8 | 0.91 | 147 |
| 2.0 | 1.01 | 132 |

Normalized amplitude of the impulse response and density were found to be related through the equation normalized amplitude=$1.05(10^{-0.672*density})$ while the time of flight (relative time delay of the impulse response) within the insulation followed the relationship, Time of flight=0.46*density+0.12. These relationships can be used as a guide for blown insulation density prediction, the person of ordinary skill in the art will appreciate that some variation is possible in real-world systems, which can be addressed by calibration.

Figure 26:
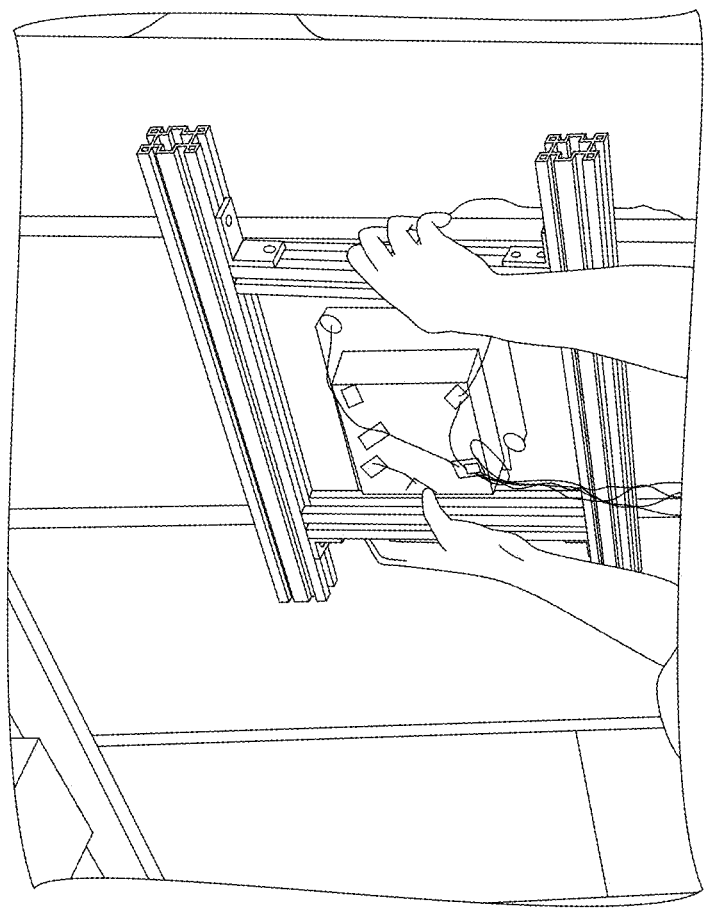
FIG. 26 is a photograph showing a measurement used in an experiment described herein.

The device was tested on a jobsite. For each cavity, there were anywhere from four to eight measurement locations with two measurements taken at each location. The first measurement in each cavity location was taken perpendicular to the studs as shown in FIG. 26 and the second after turning the device 45 degrees.

After the data was collected, a few density checks were performed in the room by cutting out sections of insulation and weighing them. The desired cavity density was between 1.8 to 2.0 PCF and the four recorded density checks were: 1.85, 2.32, 2.1, and 1.88 PCF.

Figure 27:
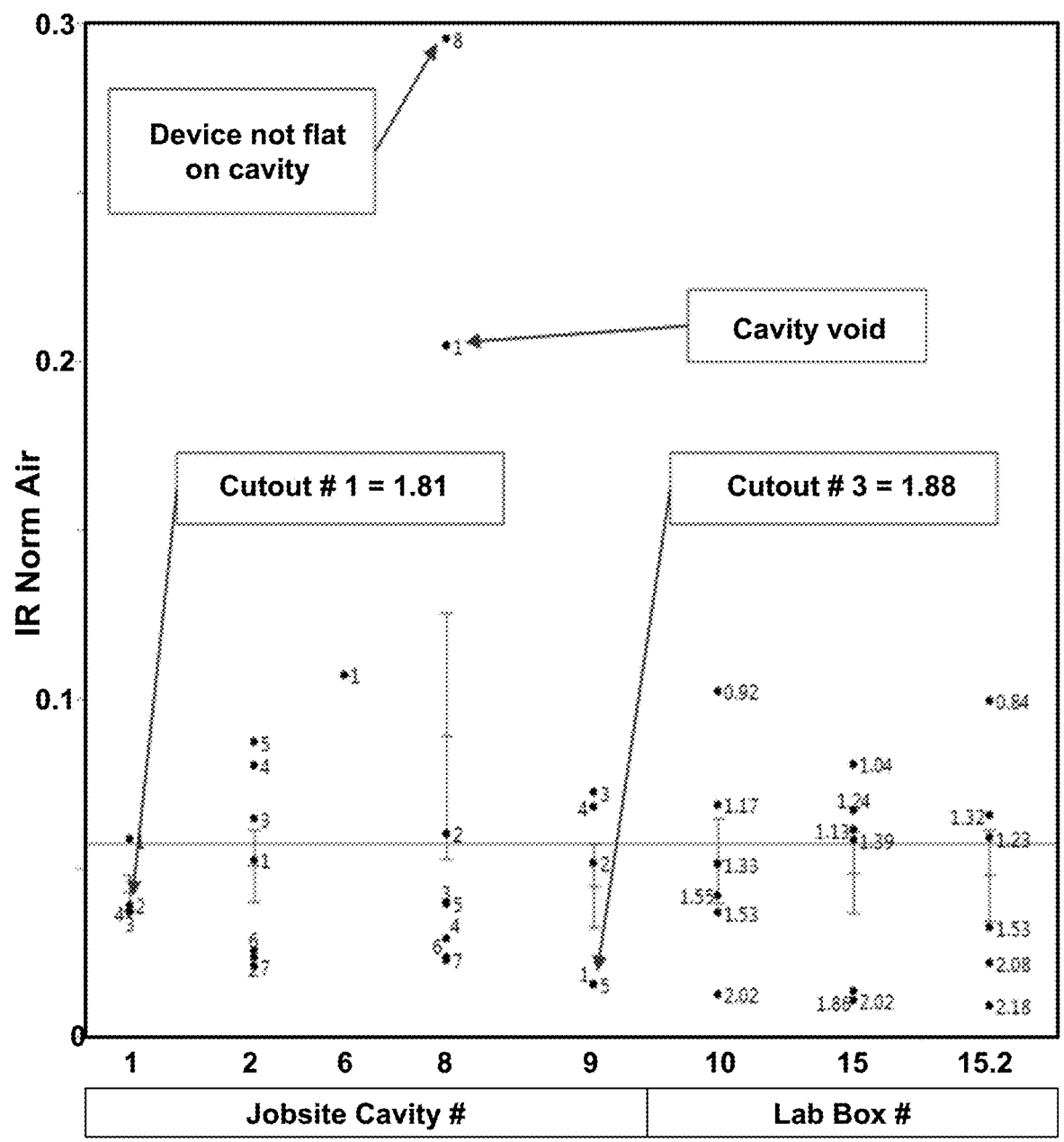
FIGS. 27 and 28 show amplitude and impulse delay data, respectively, generated during a jobsite experiment described herein.
Figure 28:
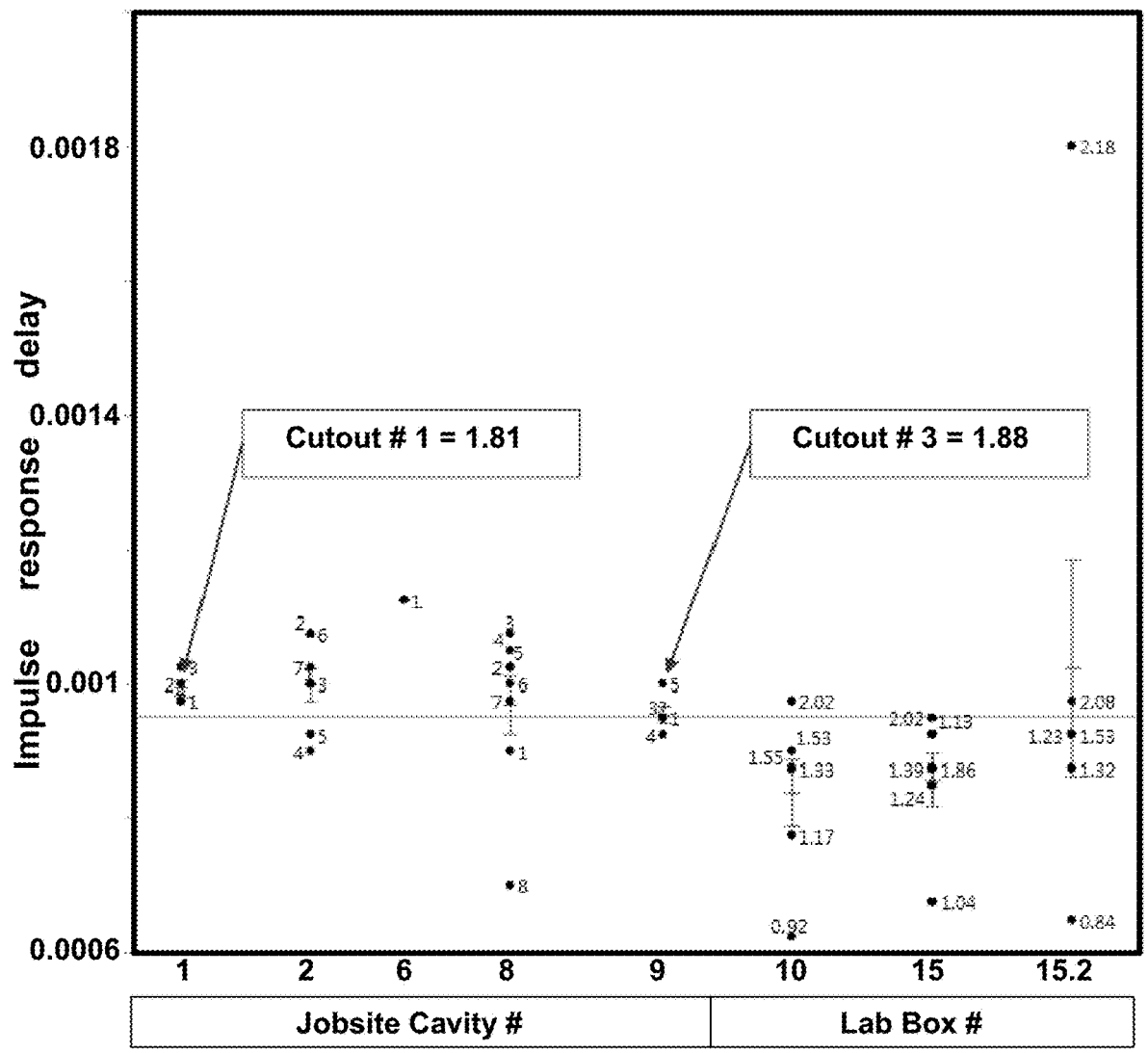

The jobsite data was analyzed with both the impulse response amplitude and delay metrics. FIG. 27 shows the jobsite amplitude data on the left side and data using the same device measuring known density lab boxes on the right. FIG. 28 shows similar impulse delay data; the data in FIG. 28 hover in the 1.8 PCF to 2.2 PCF, which correlates well with the cutout density checks that were performed.

To develop data for a statistical model, a 2×6 wood stud wall with 14 inches on center spacing was built in the lab. OPTIMA fabric (CertainTeed Corporation) was attached to the wall and filled with loosefill insulation. Once tested with the device, density checks could be performed in all measured areas. There were seven tested sections per cavity, approximately 9" high by 14" wide by 5.5" deep. The density of the cavity was unknown until after the density cutouts were performed on the wall but the walls were generally installed with two light cavities (<1.8 PCF) and two heavy cavities (>1.8 PCF).

The model discussed here is based off two fully filled test walls designated, the first wall and the second wall. The first wall had ten measurements per section and with seven sections/cavity and four data-points/measurement that gives two hundred and eighty data points for the first wall. A regression model was created using the cutout density data. To get ten measurements in a section the device was rotated approximately 36 degrees after each measurement to complete a full circle. The second lab wall just had one measurement/section and was used as a comparison to see how close the measurements came to the cutout densities when plugging the data into the model that was created with the first wall.

Figure 29:
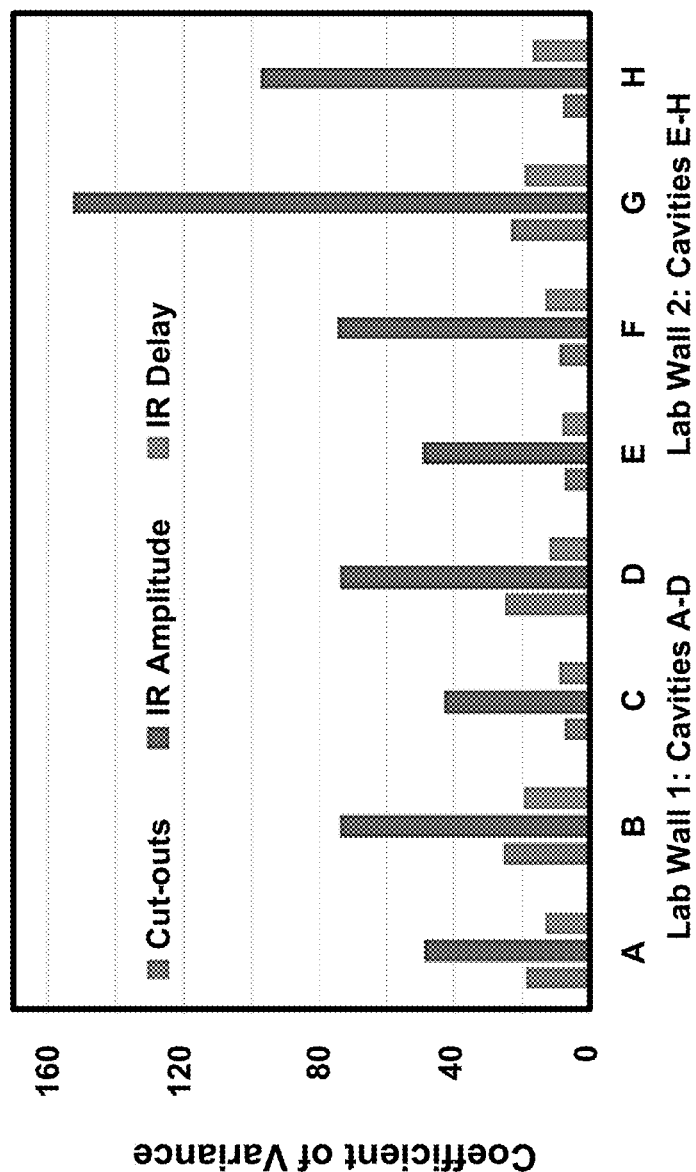
FIG. 29 shows the variance of amplitude and delay metrics compared to the actual cutout density for a given wall cavity.
Figure 30:
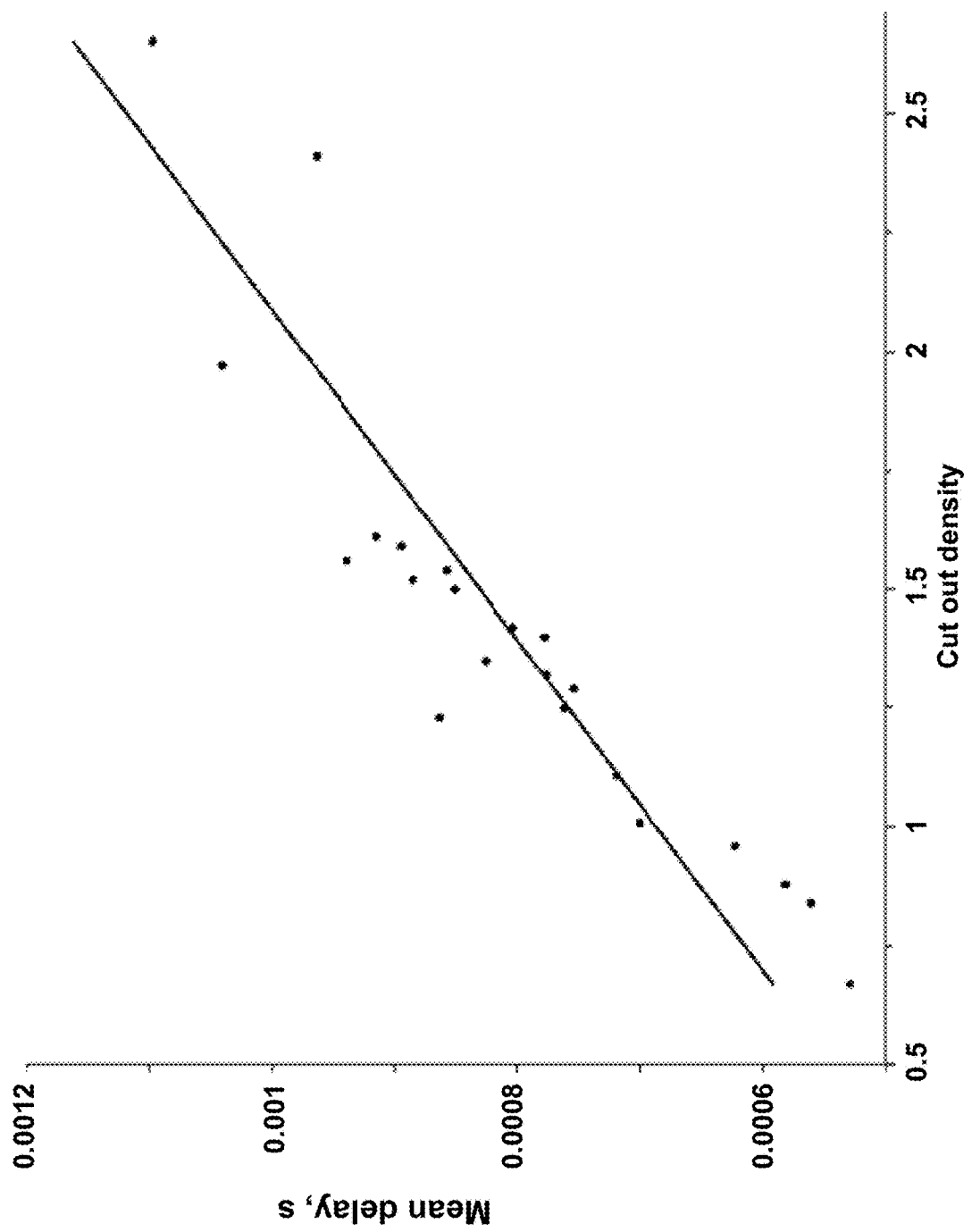
FIGS. 30 and 31 show correlations of delay and amplitude measurements, respectively, correlated with measured cut-out density.
Figure 31:
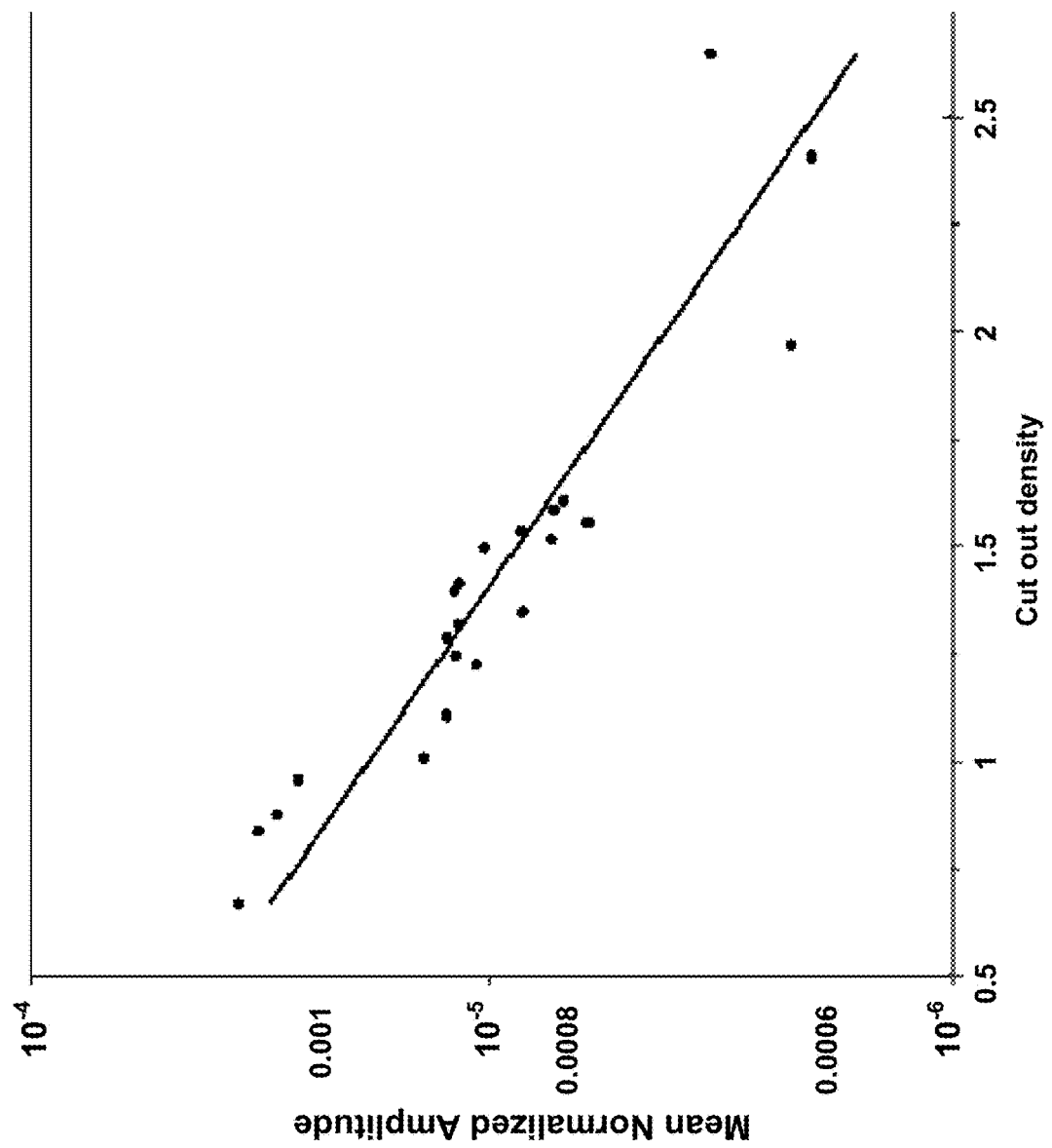

After collecting the measurement data, it was run through our data processing methods to produce both the impulse response (IR) amplitude and delay. FIG. 29 shows the variance of both metrics compared to the actual cutout density to confirm that device variation within the cavity is similar to the inherent variation in each cavity. The IR amplitude is consistently high compared to the cavity density variation and the IR delay has similar or better variation compared to the cutout density, making it more reliable. Each metric was correlated to the measured cutout density, as shown in FIGS. 30 (delay) and 31 (amplitude). This direct correlation comparison shows that there is a fair correlation between both metrics and the cutout densities. Notably more low density data (below 1.75 PCF) than high density data (greater than 1.75 PCF) was taken. FIG. 31 shows experimental data points from a filled insulation wall cavity using the device with a model that predicts if the measured location has a density above or below 1.8 PCF.

The model was created by taking the information gathered by microphone readings from the device on the first and second walls. The data was cleaned and the distribution of independent and dependent variables was studied for any trends and outliers. The cleaned data from the two walls was used to create logistic regression models, classifying wall cavities as pass or fail based on a cutoff density of 1.8 PCF using different combinations of independent variables. Initially, models created from first wall and second wall data were built and evaluated separately. Then the first wall model was tested by inputting the second wall data and comparing the predicted results to the cutout densities. This test would show the accuracy of the first wall model to predict the density of any wall. The main result of the model would then predict if a cavity passed or failed based on inputting the new data into the model.

Figure 32:
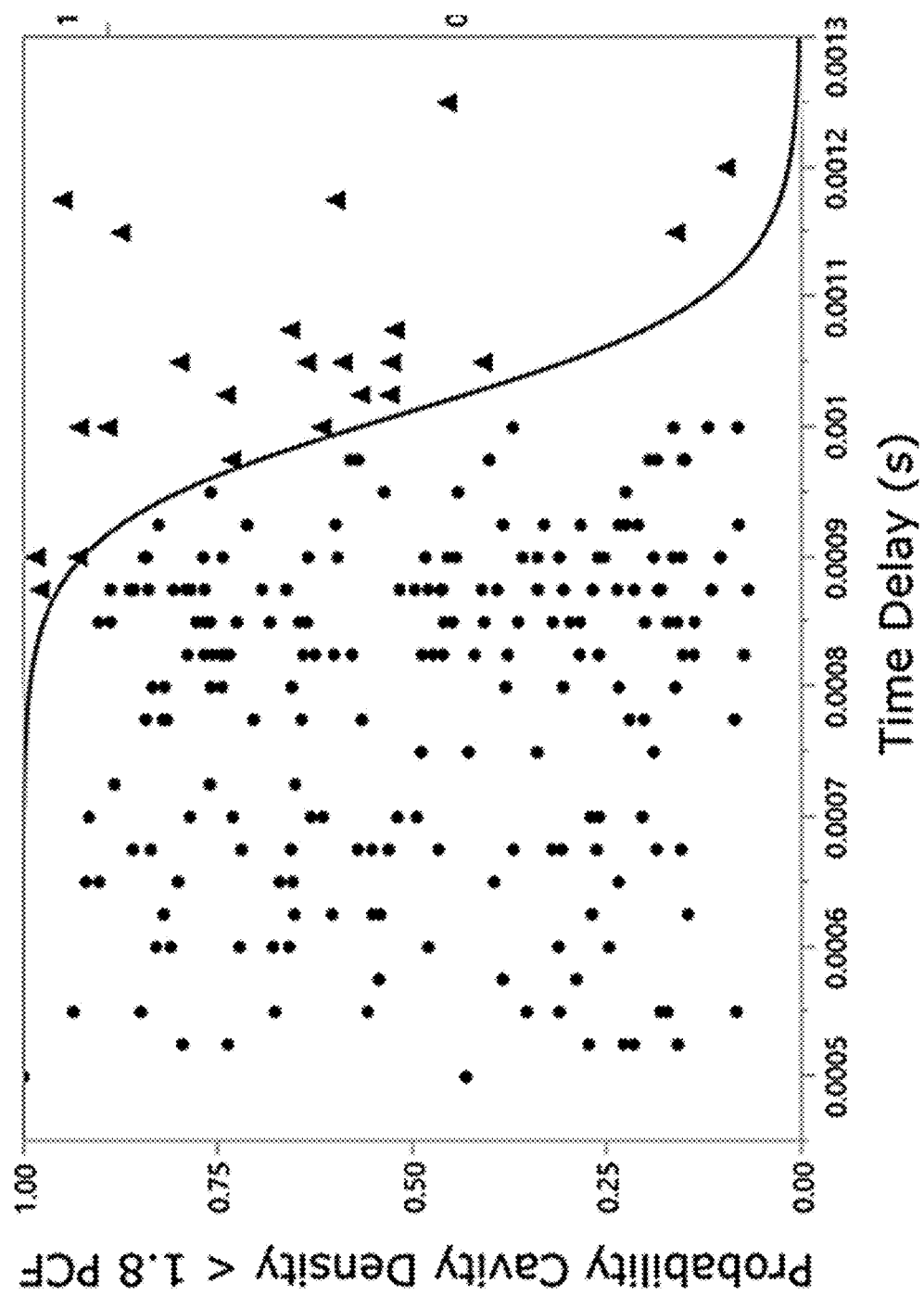
FIG. 32 shows experimental data points from a filled insulation wall cavity using the device with a model that predicts if the measured location has a density above or below 1.8 PCF.

FIG. 32 shows experimental data points from a filled insulation wall cavity using the device with a model that predicts if the measured location has a density above or below 1.8 PCF.

The following listing of numbered embodiments form additional aspects of the disclosure. They may be combined and permuted in any fashion and in any number that is not logically or technically inconsistent.

Embodiment 1

A device for determining the density of insulation, the device comprising:
  a sound generator
  one or more sound sensors configured to detect sound that is generated by the sound generator and transmitted through the insulation to the one or more sound sensors; and
  a control system configured to:
    cause the sound generator to generate the sound; and
    use the sound detected by the one or more sound sensors to generate output that represents the density of the insulation.

Embodiment 2

The device of embodiment 1, wherein the one or more sound sensors comprise two or more sound sensors.

Embodiment 3

The device of embodiment 1 or embodiment 2, wherein the sound generator comprises a speaker.

Embodiment 4

The device of embodiment 1 or embodiment 2, wherein the sound generator comprise a rod or plate configured to be driven at high frequency.

Embodiment 5

The device of any of embodiments 1-4, wherein the sound generator is configured to generate sound having frequencies at least within the range of 10 Hz to 100 kHz, e.g., at least within the range of 10 Hz to 50 kHz, or 10 Hz to 10 kHz, or 10 Hz to 5 kHz, or 10 Hz to 1 kHz, or 10 Hz to 500 Hz, or 50 Hz to 100 kHz, or 50 Hz to 50 kHz, or 50 Hz to 10 kHz, or 50 Hz to 5 kHz, or 50 Hz to 1 kHz, or 50 Hz to 500 Hz.

Embodiment 6

The device of any of embodiments 1-4, wherein the sound generator is configured to generate sound having frequencies at least within the range of 100 Hz to 100 kHz, e.g., at least within the range of 100 Hz to 50 kHz, or 100 Hz to 10 kHz, or 100 Hz to 5 kHz, or 100 Hz to 1 kHz, or 100 Hz to 500 Hz, or 500 Hz to 100 kHz, or 500 Hz to 50 kHz, or 500 Hz to 10 kHz, or 500 Hz to 5 kHz, or 1 kHz to 100 kHz, or 1 kHz to 50 kHz, or 1 kHz to 10 kHz, or 5 kHz to 100 kHz, or 5 kHz to 50 KHz, or 10 kHz to 100 kHz.

Embodiment 7

The device of any of embodiments 1-4, wherein the sound generator is configured to generate sound having frequencies at least within the range of 10 Hz to 10 kHz, e.g., at least within the range of 1 kHz to 6 kHz, within the range of 2 kHz to 6 kHz, within the range of 4 kHz to 5.5 kHz, or within the range of 4.8 kHz to 5.2 kHz.

Embodiment 8

The device of any of embodiments 1-7, wherein the sound generator is configured to generate sound such that at least 90%, e.g., at least 95%, or even at least 99% of the sound has a frequency within the stated range (i.e., as a fraction of total power).

Embodiment 9

The device of any of embodiments 1-8, wherein the sound generator is configured to generate sound having a duration within a range of 0.25 seconds to 3 seconds.

Embodiment 10

The device of any of embodiments 1-9, wherein the sound generator is configured to generate broadband noise over a frequency range spanning at least 1 kHz, e.g., at least 5 kHz.

Embodiment 11

The device of any of embodiments 1-10, wherein each of the one or more sound sensors comprises a microphone.

Embodiment 12

The device of any of embodiments 1-11, wherein each of the one or more sound sensors is separated from the sound generator by a distance within a range of 2.5 inches to 8 inches, e.g., within a range of 3 inches to 5 inches, within a range of 3.8 inches to 4.8 inches, or within a range of 4.2 inches to 4.8 inches.

Embodiment 13

The device of any of embodiments 2-12, wherein a first sensor of the two or more sound sensors is on a first side of the sound generator and a second sensor of the two or more sound sensors is on a second opposing side of the sound generator.

Embodiment 14

The device of any of embodiments 1-13, wherein the control system is configured to generate output that represents the density of the insulation using known characteristics of the insulation.

Embodiment 15

The device of embodiment 14, further comprising a user interface, wherein the control system is configured to:
receive input, from the user interface, representing the known characteristics of the insulation; and
use the received input to generate output that represents the density of the insulation.

Embodiment 16

The device of any of embodiments 1-15, further comprising one or more support members that are respectively configured to be positioned against two structures (e.g., studs) that form a cavity that contains the insulation while the device is in operation.

Embodiment 17

The device of embodiment 16, wherein the one or more support members are retractable and extendable.

Embodiment 18

The device of embodiment 16 or embodiment 17, wherein the one or more support members respectively span a distance within a range of 16 inches to 28 inches, e.g., within a range of 16 inches to 26 inches, or within a range of 16 inches to 24 inches.

Embodiment 19

The device of any of embodiments 1-18, further comprising one or more handles that respectively span between two support members of the one or more support members.

Embodiment 20

The device of any of embodiments 1-19, further comprising a base that houses the sound generator and the one or more sound sensors (e.g., such that the sound generator and the one or more sound sensors can be positioned against the insulation, or can be at equal spacings from the insulation).

Embodiment 21

The device of embodiment 20, wherein the base comprises a region that surrounds the one or more sound sensors, the region having a radial width of at least 2 inches.

Embodiment 22

The device of any of embodiments 1-21, further comprising a structural member that is configured to be inserted into the insulation and collect the sound for detection by the one or more sound sensors in the base.

Embodiment 23

The device of any of embodiments 1-22, wherein each of the one or more sound sensors is separated from the sound generator by a distance within a range of 3.5 inches to 5.5 inches, e.g., within a range of 3.8 inches to 4.2 inches.

Embodiment 24

The device of any of embodiments 2-23, further comprising a structural member that is configured to be inserted into the insulation, wherein the two or more sound sensors are coupled to the structural member at different depths along the structural member.

Embodiment 25

The device of embodiment 24, further comprising a sound damping material disposed within the structural member between the two or more sound sensors.

Embodiment 26

The device of embodiment 24, wherein the sound generator is positioned within the structural member between the two or more sound sensors, and wherein the sound damping material is disposed between the sound generator and the respective two or more sound generators.

Embodiment 27

The device of embodiment 26, further comprising apertures within the structural member, the apertures corresponding respectively to the sound generator and the two or more sound sensors.

Embodiment 28

The device of any of embodiments 2-19, further comprising two or more structural members, wherein the two or more sound sensors are coupled respectively to the two or more structural members.

Embodiment 29

The device of embodiment 28, wherein the two or more structural members are configured to be inserted into insulation such that the two or more sound sensors are positioned within the insulation.

Embodiment 30

The device of embodiment 28 or embodiment 29, wherein the two or more structural members are configured to be inserted into a cavity containing the insulation.

Embodiment 31

The device of any of embodiments 28-30, wherein the device is configured such that the sound generator can be inside the insulation while the two or more sound sensors are inside the insulation.

Embodiment 32

The device of embodiment 31, further comprising an additional structural member, wherein the sound generator is coupled to the additional structural member, and wherein the additional structural member is configured to be inserted into the insulation such that the sound generator is positioned within the insulation.

Embodiment 33

The device of embodiment 32, wherein the additional structural member comprises a receptacle within the additional structural member that is configured to hold the sound generator.

Embodiment 34

The device of any of embodiments 28-33, further comprising a base that couples the two or more structural members to each other such that the two or more sound sensors are held by the two or more structural members to have a substantially fixed spacing between the sound generator and the respective two or more sound sensors.

Embodiment 35

The device of any of embodiments 1-34, wherein at least one structural member of the device is configured to be stored within the base.

Embodiment 36

The device of embodiment 35, wherein the at least one structural member is configured to pivot with respect to the base such that the at least one structural member is stored within the base.

Embodiment 37

The device of embodiment 35 or embodiment 36, wherein at least one structural member of the device is configured to pivot with respect to the base such that the at least one structural member extends from the base.

Embodiment 38

The device of any of embodiments 24-38, wherein the two or more sound sensors are positioned closer to respective distal ends of the two or more structural members than the base.

Embodiment 39

The device of embodiment 38, wherein the two or more sound sensors are positioned within a cavity of the respective two or more structural members.

Embodiment 40

The device of any of embodiments 28-31 and 34-39, wherein the device is configured such that the sound generator can be outside the insulation while the two or more sound sensors are inside the insulation.

Embodiment 41

The device of any of embodiments 28-40, wherein each of the two or more structural members comprises a receptacle within the structural member that is configured to hold a respective sound sensor of the two or more sound sensors.

Embodiment 42

The device of embodiment 32 and embodiment 33, further comprising:
- a sound sensor coupled to the additional structural member, the sound sensor being configured to detect sound; and
- two or more sound generators coupled respectively to the two or more structural members.

Embodiment 43

The device of embodiment 42, wherein a first structural member of the two or more structural members is configured to position a first sound sensor of the two or more sound sensors and a second structural member of the two or more structural members is configured to position a second sound sensor of the two or more sound sensors such that the first sound sensor and the second sound sensor are positioned at different depths within the insulation.

Embodiment 44

The device of embodiment 42 or embodiment 43, wherein a first structural member of the two or more structural members is configured to position a first sound generator of the two or more sound generators and a second structural member of the two or more structural members is configured to position a second sound generator of the two or more sound generators such that the first sound generator and the second sound generator are positioned at different depths within the insulation.

Embodiment 45

The device of any of embodiments 28-44, wherein each of the two or more structural members extend beyond any sound generators or sound sensors that are coupled to the structural member, e.g., by at least 1.5 inches.

Embodiment 46

The device of any of embodiments 1-45, wherein the sound generator is vibrationally isolated from the one or more sound sensors.

Embodiment 47

The device of any of embodiments 1-46, further comprising a plate configured to push against insulation when the device is used in a density determination.

Embodiment 48

A method for using the device of any of embodiments 1-47 for determining the density of insulation, the method comprising:
- causing, via the control system, the sound generator to generate sound;
- detecting, via the one or more sound sensors, the sound after the sound travels through the insulation; and
- using, via the control system, the detected sound to generate output that represents
- the density of the insulation.

Embodiment 49

The method of embodiment 48, wherein the one or more sound sensors comprise two or more sound sensors.

Embodiment 50

The method of embodiment 48 or embodiment 49, wherein causing the sound generator to generate sound comprises causing the sound generator to generate white noise, brown noise, red noise, or pink noise.

Embodiment 51

The method of embodiment 48 or embodiment 49, wherein causing the sound generator to generate sound comprises causing the sound generator to generate sound having a single frequency.

Embodiment 52

The method of any of embodiments 48-51, wherein causing the sound generator to generate sound comprises causing the sound generator to generate sound having frequencies within the range of 10 Hz to 10 kHz, e.g., within the range of 1 kHz to 6 kHz, within the range of 2 kHz to 6 kHz, within the range of 4 kHz to 5.5 kHz, or within the range of 4.8 kHz to 5.2 kHz.

Embodiment 53

The method of any of embodiments 48-52, wherein causing the sound generator to generate sound comprises causing the sound generator to generate sound having a duration within the range of 0.25 seconds to 3 seconds.

Embodiment 54

The method of embodiment 46, wherein causing the sound generator to generate sound comprises causing the sound generator to generate sound having a duration of less than 2 seconds.

Embodiment 55

The method of embodiment any of embodiments 48-52, wherein causing the sound generator to generate sound comprises causing the sound generator to generate an impulse.

Embodiment 56

The method of any of embodiments 48-55, wherein each of the one or more sound sensors is separated from the sound generator by a distance within a range of 2.5 inches to 8 inches, e.g., within a range of 3 inches to 5 inches, within a range of 3.8 inches to 4.8 inches, or within a range of 4.2 inches to 4.8 inches.

Embodiment 57

The method of any of embodiments 48-56, wherein a first sensor of the two or more sound sensors is on a first side of the sound generator and a second sensor of the two or more sound sensors is on a second opposing side of the sound generator.

Embodiment 58

The method of any of embodiments 48-58, further comprising, prior to causing the sound generator to generate the sound, positioning one or more support members of the device against two structures (e.g., studs or joists) that form a cavity that contains the insulation, the two structures forming the cavity from opposite sides of the cavity.

Embodiment 59

The method of embodiment 58, wherein the studs or joists are separated from one another by in the range of 16-28 inches (on center), e.g., 16 inches or 24 inches.

Embodiment 60

The method of embodiment 58 or embodiment 59, further comprising extending the one or more support members from a base of the device prior to positioning the one or more support members against the two structures that form the cavity.

Embodiment 61

The method of embodiment 60, further comprising retracting the one or more support members toward the base of the device after detecting the sound.

Embodiment 62

The method of any of embodiments 48-61, further comprising:
  inserting a structural member of the device into the insulation; and
  collecting, via the structural member of the device, the sound after the sound travels through the insulation, wherein using the detected sound to generate the output comprises using the collected sound to generate the output.

Embodiment 63

The method of embodiment 63, wherein collecting the sound comprises collecting the sound via an aperture of the structural member.

Embodiment 64

The method of any of embodiments 48-61, further comprising inserting a structural member of the device into the insulation, wherein the two or more sound sensors are coupled to the structural member at different depths along the structural member.

Embodiment 65

The method of embodiment 64, wherein the sound generator is positioned within the structural member.

Embodiment 66

The method of embodiment 65, wherein the sound generator is positioned between the two or more sound sensors.

Embodiment 67

The method of any of embodiments 64-66, further comprising:
  collecting, via apertures in the structural member, the sound after the sound travels through the insulation, the apertures corresponding respectively to the two or more sound sensors,
  wherein using the detected sound to generate the output comprises using the collected sound to generate the output.

Embodiment 68

The method of any of embodiments 48-61, wherein the two or more sound sensors are coupled to two or more structural members of the device, the method further comprising:
  inserting the two or more structural members into the insulation such that the two or more sound sensors are positioned within the insulation,
  wherein detecting the sound comprises detecting the sound via the two or more sound sensors that are positioned within the insulation.

Embodiment 69

The method of embodiment 68, wherein inserting the two or more structural members into the insulation comprises inserting the two or more structural members into the cavity containing the insulation.

Embodiment 70

The method of any of embodiments 48-69, wherein causing the sound generator to generate the sound comprises causing the sound generator to generate the sound while the sound generator is inside the insulation.

Embodiment 71

The method of embodiment 70, wherein detecting the sound comprises detecting the sound while the one or more sound sensors are inside the insulation.

Embodiment 72

The method of any of embodiments 68-71, wherein the sound generator is coupled to an additional structural member of the device, the method further comprising inserting the additional structural member into the insulation such that the sound generator is positioned within the insulation.

Embodiment 73

The method of embodiment 72, wherein the additional structural member comprises a receptacle within the additional structural member that is configured to hold the sound generator.

Embodiment 74

The method of any of embodiments 68-73, wherein a base of the device couples the two or more structural members to each other such that the two or more sound sensors are held by the two or more structural members to have a substantially fixed spacing between the sound generator and the respective two or more sound sensors.

Embodiment 75

The method of any of embodiments 68-74, further comprising:
prior to causing the sound generator to generate the sound, pivoting a structural member of the device away from a base of the device to move a distal end of the structural member away from the base; and
inserting the pivoted structural member into the insulation,
wherein detecting the sound comprises detecting the sound after inserting the pivoted structural member into the insulation.

Embodiment 76

The method of embodiment 75, wherein the two or more sound sensors are positioned closer to respective distal ends of the two or more structural members than the base of the device.

Embodiment 76

The method of embodiment 77, wherein the two or more sound sensors are positioned within the respective two or more structural members.

Embodiment 77

The method of any of embodiments 68-76, wherein each of the two or more structural members comprises a receptacle within the structural member that is configured to hold a respective sound sensor of the two or more sound sensors.

Embodiment 78

The method of embodiment 68-77, wherein a first sound sensor of the two or more sound sensors and a second sound sensor of the two or more sound sensors are respectively positioned at different depths within the insulation while the sound is detected.

Embodiment 79

The method of any of embodiments 68-78, wherein a first sound generator and a second sound generator of the device are respectively positioned at different depths within the insulation while the sound is detected.

Embodiment 80

The method of any of embodiments 68-79, wherein each of the two or more structural members extend beyond any sound generators or sound sensors that are coupled to the structural member.

Embodiment 81

The device of embodiment 80, wherein each of the two or more structural members extend at least 1.5 inches beyond any sound generators or sound sensors that are coupled to the structural member.

Embodiment 82

The method of any of embodiments 48-64, 67-69, 74-78, 77, 80 and 81, wherein causing the sound generator to generate the sound comprises causing the sound generator to generate the sound while the sound generator is outside the insulation.

Embodiment 83

The method of any of embodiments 48-61, wherein the device comprises a base that houses the sound generator and the one or more sound sensors (e.g., such that the sound generator and the one or more sound sensors are positioned against the insulation during operation of the device or are at equal spacings from the insulation during operation of the device.

Embodiment 84

The method of embodiment 83, wherein detecting the sound comprises detecting sound that reflects from at least one structure within the cavity and travels past a region of the base that surrounds the one or more sound sensors, the region having a radial width of at least 2 inches.

Embodiment 85

The method of embodiment 83, wherein detecting the sound comprises detecting sound that reflects from at least one structure within the cavity (e.g., a back wall of the cavity).

Embodiment 86

The method of any of embodiments 48-85, wherein detecting the sound after the sound travels through the insulation comprises:
detecting a first portion of the sound with a first sound sensor of the one or more sound sensors, wherein the first portion of the sound travels in a first direction; and detecting a second portion of the sound with a second sound sensor of the one or more sound sensors, wherein the second portion of the sound travels in a second direction that is different from the first direction.

Embodiment 87

The method of embodiment 86, wherein using the detected sound to generate the output comprises using the detected first sound and the detected second sound to generate the output.

Embodiment 88

The method of any of embodiments 48-87, wherein causing the sound generator to generate sound comprises:
causing a first sound generator to produce a first sound and, thereafter, causing a second sound generator to produce a second sound,
wherein detecting the sound after the sound travels through the insulation comprises detecting the first sound and then detecting the second sound.

Embodiment 89

The method of embodiment 88, wherein using the detected sound to generate the output comprises using the detected first sound and the detected second sound to generate the output.

Embodiment 90

The method of any of embodiments 48-89, wherein causing the sound generator to generate sound comprises:
causing a first sound generator to produce a first sound having a single first frequency; and
causing a second sound generator to produce a second sound having a single second frequency that is different from the first frequency,
wherein detecting the sound comprises detecting the first sound and the second sound.

Embodiment 91

The method of embodiment 90, wherein using the detected sound to generate the output comprises using the detected first sound and the detected second sound to generate the output.

Embodiment 92

The method of any of embodiments 48-91, wherein causing the sound generator to generate sound comprises:
causing a first sound generator to produce a first sound at a first depth within the insulation; and
causing a second sound generator to produce a second sound at a second depth within the insulation,
wherein detecting the sound comprises detecting the first sound and the second sound.

Embodiment 93

The method of embodiment 92, wherein using the detected sound to generate the output comprises using the detected first sound and the detected second sound to generate the output.

Embodiment 94

The method of any of embodiments 88-93, wherein a signal used to generate the first sound is orthogonal to a signal used to generate the second sound.

Embodiment 95

The method of embodiment 94, wherein a first sound sensor is used to detect the first sound and a second sound sensor is used to detect the second sound.

Embodiment 96

The method of any of embodiments 48-95, wherein detecting the sound after the sound travels through the insulation comprises:
detecting a first portion of the sound at a first depth within the insulation; and
detecting a second portion of the sound at a second depth within the insulation.

Embodiment 97

The method of embodiment 96, wherein using the detected sound to generate the output comprises using the detected first portion of the sound and the detected second portion of the sound to generate the output.

Embodiment 98

The method of any of embodiments 48-97, wherein a plate of the device is positioned with respect to the cavity such that it constrains the cavity to a volume by fixing a distance from the plate to a back wall of the cavity in the measured area.

Embodiment 99

The method of embodiment 98, wherein the plate pushes against bulged-out insulation.

Embodiment 100

The method of any of embodiments 48-99, wherein using the detected sound to generate the output comprises using one or more signals that represent the detected sound to perform a coherence measurement, derive a transfer function (e.g., an H1 transfer function), or derive an impulse response.

Embodiment 101

The method of any of embodiments 48-100, wherein using the detected sound to generate the output comprises:
determining a first duration that elapses between the sound being generated by the sound generator and the sound being detected by a sensor of the one or more sound sensors; and
using the first duration to generate the output.

Embodiment 102

The method of any of embodiments 48-101, wherein using the detected sound to generate the output comprises:

determining a first degree of attenuation of the detected sound as it travels from the sound generator to a sensor of the one or more sound sensors; and using the first determined degree of attenuation to generate the output.

Embodiment 103

The method of embodiment 102, wherein using the degree of attenuation to generate the output comprises:

comparing the first degree of attenuation to a second reference degree of attenuation that corresponds to a duration that elapses between sound being emitted by the sound generator in open air or through the device and being detected by the sensor after the sound passes through the air and using results of the comparison to generate the output.

Embodiment 104

The method of any of embodiments 48-103, wherein using the detected sound to generate the output comprises:

determining a first amplitude of the detected sound as it travels from the sound generator to a sensor of the one or more sound sensors; and using the first amplitude to generate the output.

Embodiment 105

The method of embodiment 104, wherein using the degree of attenuation to generate the output comprises:

comparing the first amplitude to a second reference amplitude that corresponds to a duration that elapses between sound being emitted by the sound generator in open air or through the device and being detected by the sensor after the sound passes through the air; and using results of the comparison to generate the output.

Embodiment 106

The method of any of embodiments 48-105, wherein using the detected sound to generate the output comprises:

determining a degree of variability of the density of insulation; and using the determined degree of variability to generate the output.

Embodiment 107

The method of any of embodiments 48-106, wherein using the detected sound to generate the output comprises:

determining a spatial gradient of the density of insulation; and using the determined spatial gradient to generate the output.

Embodiment 108

The method of any of embodiments 48-107, wherein using the detected sound to generate the output comprises generating the output using known characteristics of the insulation.

Embodiment 109

The method of embodiment 108, further comprising:

receiving input, from a user interface of the device, representing the known characteristics of the insulation; and using the received input to generate the output.

Embodiment 110

The method of any of embodiments 48-109, wherein the one or more sound sensors are at least 1.5 inches away from any wall studs or holes in a vapor barrier when the sound is detected.

Embodiment 111

The device of any of embodiments 1-47, configured to perform a measurement as described with respect to any of embodiments 48-110.

Embodiment 112

The method of any of embodiments 48-110, performed using the device of any of embodiments 1-47.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A device for determining the density of insulation, the device comprising:
    a base
    a single sound generator coupled to the base;
    two or more sound sensors coupled to the base and configured to detect sound that is generated by the single sound generator and transmitted through the insulation to the two or more sound sensors; and
    a control system configured to:
        cause the sound generator to generate the sound; and
        use the sound detected by the two or more sound sensors to generate output that represents the density of the insulation,
    wherein a first sensor of the one or more sound sensors is on a first side of the sound generator and a second sensor of the one or more sound sensors is on a second opposing side of the sound generator.

2. The device of claim 1, wherein the sound generator comprises a speaker.

3. The device of claim 1, wherein the sound generator is configured to generate sound having frequencies at least within the range of 100 Hz to 100 kHz.

4. The device of claim 1, wherein the sound generator is configured to generate broadband noise over a frequency band spanning at least 5 kHz.

5. The device of claim 1, wherein each of the one or more sound sensors comprises a microphone.

6. The device of claim 1, wherein the control system is configured to generate output that represents the density of the insulation using known characteristics of the insulation.

7. The device of claim 6, further comprising a user interface, wherein the control system is configured to:
    receive input, from the user interface, representing the known characteristics of the insulation; and use the received input to generate output that represents the density of the insulation.

8. The device of claim 1, further comprising one or more support members that are respectively configured to be positioned against two structures that form a cavity that contains the insulation while the device is in operation.

9. The device of claim 1, further comprising a base that houses the sound generator and the one or more sound sensors, such that the sound generator and the one or more sound sensors can be positioned against the insulation, or can be at equal spacings from the insulation.

10. The device of claim 1, wherein the two or more sound detectors are disposed on the base, and further comprising a structural member that is configured to be inserted into the insulation and collect the sound for detection by the one of the two or more sound sensors in the base.

11. The device of claim 1, wherein the sound generator is vibrationally isolated from the two or more sound sensors by being mounted on a separate piece of the base than a piece on which each of the two or more sound detectors are mounted.

12. The device of claim 1, wherein the sound generator is vibrationally isolated from the two or more sound sensors by isolating the sound generator, the one or more sound sensors, or both, using a foam or viscoelastic material.

13. A method for determining the density of insulation, the method comprising:
providing a device comprising:
a base
a sound generator coupled to the base,
one or more sound sensors coupled to the base and configured to detect sound that is generated by the sound generator and transmitted through the insulation to the one or more sound sensors, and
a control system configured to:
cause the sound generator to generate the sound, and
use the sound detected by the one or more sound sensors to generate output that represents the density of the insulation;
causing, via the control system, the sound generator to generate a broadband sound over a frequency band spanning at least 5 kHz;
detecting, via the one or more sound sensors, the broadband sound after the broadband sound travels through the insulation; and
using, via the control system, the detected broadband sound to generate output that represents the density of the insulation.

14. The method of claim 13 wherein the one or more sound sensors comprise two or more sound sensors.

15. The method of claim 13, wherein causing the sound generator to generate broadband sound comprises causing the sound generator to generate an impulse of broadband sound, and wherein using the detected broadband sound to generate the output comprises determining an impulse response to the generated impulse, and using the impulse response to generate the output.

16. The method of claim 13, wherein using the detected sound to generate the output comprises:
determining a degree of attenuation of the detected sound as it travels from the sound generator to a sensor of the one or more sound sensors; and
using the determined degree of attenuation to generate the output.

17. The method of claim 13, wherein using the detected sound to generate the output comprises generating the output using known characteristics of the insulation.

18. The method of claim 17, further comprising:
receiving input, from a user interface of the device, representing the known characteristics of the insulation; and
using the received input to generate the output.

19. The method of claim 13, wherein the broadband sound is broadband noise.

20. A method for determining the density of insulation, the method comprising:
providing a device comprising:
a base
a sound generator housed by the base,
one or more sound sensors housed by the base and configured to detect sound that is generated by the sound generator and transmitted through the insulation to the one or more sound sensors, and
a control system configured to:
cause the sound generator to generate the sound, and
use the sound detected by the one or more sound sensors to generate output that represents the density of the insulation;
disposing the device such that the sound generator and the one or more sound sensors are positioned outside the insulation, and such that positioning one or more support members of the device are positioned against two structures that form a cavity that contains the insulation, the two structures forming the cavity from opposite sides of the cavity;
causing, via the control system, the sound generator to generate sound;
detecting, via the one or more sound sensors, the sound after the sound travels through the insulation; and
using, via the control system, the detected sound to generate output that represents the density of the insulation, wherein using the detected sound to generate the output comprises determining a first duration that elapses between the sound being generated by the sound generator and the sound being detected by a sensor of the one or more sound sensors, the first duration corresponding to a time during which the sound travels through the cavity, reflects off a back wall of the cavity, and is detected by the sensor, using the first duration to determine a first insulation density, and using the first insulation density to generate the output.

21. The method of claim 20, wherein the studs or joists are separated from one another by in the range of 16-28 inches on center.

22. The method of claim 20, wherein the sound generator and the one or more sound sensors are positioned against the insulation during operation of the device.

23. The method of claim 20, wherein a plate of the device is positioned with respect to the cavity such that it constrains the cavity to a volume by fixing a distance from the plate to the back wall of the cavity in the measured area.

24. The method of claim 23, wherein the plate pushes against bulged-out insulation.

25. The method of claim 20, wherein the one or more sound sensors include a plurality of sound sensors disposed about the sound generator.

* * * * *